(12) United States Patent
Takeuchi et al.

(10) Patent No.: US 11,030,831 B2
(45) Date of Patent: Jun. 8, 2021

(54) FUEL EFFICIENCY ESTIMATION SYSTEM, FUEL EFFICIENCY ESTIMATION METHOD, AND COMPUTER READABLE MEDIUM

(71) Applicant: Mitsubishi Electric Corporation, Tokyo (JP)

(72) Inventors: Tomoharu Takeuchi, Tokyo (JP); Norimitsu Nagashima, Tokyo (JP); Takeshi Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/323,881

(22) PCT Filed: Sep. 29, 2016

(86) PCT No.: PCT/JP2016/078943
§ 371 (c)(1),
(2) Date: Feb. 7, 2019

(87) PCT Pub. No.: WO2018/061162
PCT Pub. Date: Apr. 5, 2018

(65) Prior Publication Data
US 2019/0228600 A1 Jul. 25, 2019

(51) Int. Cl.
*G07C 5/08* (2006.01)
*G08G 1/00* (2006.01)
(Continued)

(52) U.S. Cl.
CPC ............ *G07C 5/085* (2013.01); *B60L 3/00* (2013.01); *G01C 21/26* (2013.01);
(Continued)

(58) Field of Classification Search
CPC .. G07C 5/08; G07C 5/085; B60L 3/00; G01C 21/26; G01M 17/007; G08G 1/00; Y02T 90/161
See application file for complete search history.

(56) References Cited

U.S. PATENT DOCUMENTS 6,055,488 A * 4/2000 Nakajima ............. B60C 23/061
702/96
8,972,145 B2 3/2015 Mahler et al.
(Continued)

FOREIGN PATENT DOCUMENTS

JP 9-73593 A 3/1997
JP 9-79663 A 3/1997
(Continued)

OTHER PUBLICATIONS

Author Unknown, "Purposes and Present Situations of Speed Control", National Police Agency, Traffic Bureau, Aug. 28, 2013, pp. 1-19, with partial English translation (21 pages total).
(Continued)

*Primary Examiner* — Hieu T Vo
(74) *Attorney, Agent, or Firm* — Birch, Stewart, Kolasch & Birch, LLP

(57) ABSTRACT

A fuel efficiency estimation system includes: a velocity profile calculation unit to calculate a velocity profile indicating a change in velocity of a motor vehicle traveling a traveling route; a velocity disturbance calculation unit to calculate, based on disturbance information indicating a disturbance event occurring on the traveling route and traveling history information collected from the motor vehicle traveling the traveling route, an attenuation factor, which is a ratio of attenuation of the velocity of the motor vehicle traveling the traveling route, as a velocity disturbance correction coefficient; and a fuel efficiency calculation unit to calculate fuel efficiency of the motor vehicle traveling
(Continued)

the traveling route by using the velocity profile and the velocity disturbance correction coefficient.

18 Claims, 32 Drawing Sheets

(51) Int. Cl.
    *G01M 17/007*      (2006.01)
    *B60L 3/00*      (2019.01)
    *G01C 21/26*      (2006.01)

(52) U.S. Cl.
    CPC ............ *G01M 17/007* (2013.01); *G08G 1/00* (2013.01); *Y02T 90/16* (2013.01)

(56) References Cited

U.S. PATENT DOCUMENTS

| | | |
|---|---|---|
| 2008/0208441 A1 | 8/2008 | Cheung |
| 2010/0114473 A1 | 5/2010 | Kono et al. |
| 2010/0145600 A1 | 6/2010 | Son et al. |
| 2011/0106419 A1 | 5/2011 | Kim |
| 2011/0153202 A1 | 6/2011 | Sengoku et al. |
| 2011/0160990 A1 | 6/2011 | Mineta |
| 2011/0160993 A1 | 6/2011 | Tsurutani et al. |
| 2011/0320115 A1 | 12/2011 | Oh et al. |
| 2012/0185162 A1 | 7/2012 | Ishido |
| 2012/0185169 A1 | 7/2012 | Sengoku et al. |
| 2013/0006508 A1 | 1/2013 | Li et al. |
| 2013/0013164 A1 | 1/2013 | Taguchi |
| 2014/0365105 A1 | 12/2014 | Kono et al. |
| 2018/0238696 A1* | 8/2018 | Takeda .................. G01C 21/26 |

FOREIGN PATENT DOCUMENTS

| | | |
|---|---|---|
| JP | 10-26535 A | 1/1998 |
| JP | 2001-183150 A | 7/2001 |
| JP | 2002-193027 A | 7/2002 |
| JP | 2004-248455 A | 9/2004 |
| JP | 2005-91112 A | 4/2005 |
| JP | 2005-184867 A | 7/2005 |
| JP | 2007-94703 A | 4/2007 |
| JP | 2009-31046 A | 2/2009 |
| JP | 2009-70101 A | 4/2009 |
| JP | 2009-110042 A | 5/2009 |
| JP | 2009-193425 A | 8/2009 |
| JP | 2010-48781 A | 3/2010 |
| JP | 2010-54385 A | 3/2010 |
| JP | 2010-107459 A | 5/2010 |
| JP | 2010-520454 A | 6/2010 |
| JP | 2010-164360 A | 7/2010 |
| JP | 2011-95251 A | 5/2011 |
| JP | 2011-232146 A | 11/2011 |
| JP | 2012-8113 A | 1/2012 |
| JP | 2013-72660 A | 4/2013 |
| JP | 2013-205346 A | 10/2013 |
| JP | 2014-32544 A | 2/2014 |
| JP | 2014-106068 A | 6/2014 |
| JP | 2014-106675 A | 6/2014 |
| WO | WO 2011/080881 A1 | 7/2011 |
| WO | WO 2011/101949 A1 | 8/2011 |
| WO | WO 2011/114582 A1 | 9/2011 |

OTHER PUBLICATIONS

International Search Report (PCT/ISA/210) issued in PCT/JP2016/078943, dated Jan. 10, 2017, with English translation.
International Search Report (PCT/ISA/210) issued in PCT/JP2016/078944, dated Jan. 10, 2017, with English translation.
International Search Report (PCT/ISA/210) issued in PCT/JP2016/078945, dated Jan. 10, 2017, with English translation.
Office Action issued in Japanese Patent Application No. 2017-516811, dated May 9, 2017, with English translation.
Office Action issued in Japanese Patent Application No. 2017-516818, dated May 9, 2017, with English translation.
Office Action issued in Japanese Patent Application No. 2017-516820, dated May 9, 2017, with English translation.
Office Action dated Feb. 5, 2021 in co-pending U.S. Appl. No. 16/324,046.

* cited by examiner

FUEL EFFICIENCY ESTIMATION SYSTEM, FUEL EFFICIENCY ESTIMATION METHOD, AND COMPUTER READABLE MEDIUM

TECHNICAL FIELD

The present invention relates to fuel efficiency estimation systems, fuel efficiency estimation methods, and fuel efficiency estimation programs, which estimate traveling fuel efficiency of a motor vehicle. In particular, the present invention relates to technology of estimating traveling fuel efficiency of a motor vehicle with high accuracy by estimating with a high accuracy a velocity profile indicating a change in actual traveling velocity when the motor vehicle travels a specific traveling route.

BACKGROUND ART

In recent years, EVs (Electric Vehicles), HEVs (Hybrid Electric Vehicles), and PHEVs (plug-in Hybrid Electric Vehicles) have become increasingly widespread. With these becoming widespread, for the purpose of an increase in distance that can be traveled by motor vehicles and an improvement in fuel efficiency, technical developments have been made for optimization of a traveling plan with low fuel efficiency, such as switching between electric driving and gasoline driving.

In making this traveling plan with low fuel efficiency, it is required to estimate motor-vehicle traveling fuel efficiency when traveling a specific traveling route.

A technique regarding technology for estimating motor-vehicle traveling fuel efficiency is disclosed in Patent Literature 1. A scheme is disclosed in Patent Literature 1, the scheme calculating a total predicted fuel efficiency for respective searched routes by using support map information such as arrangement of links configuring roads, road traffic information such as a predicted traveling time for each link in every time zone, and a fuel efficiency matrix representing a relation between fuel efficiency and vehicle information, meteorological information, traveling time zone, and traveling links as fuel efficiency factors influencing fuel efficiency.

CITATION LIST

Patent Literature

Patent Literature 1: JP 2010-054385

SUMMARY OF INVENTION

Technical Problem

In the scheme by Patent Literature 1, in consideration of geographic features of the roads, conditions are fragmented to perform fuel efficiency calculation process. This poses problems in which the process load regarding fuel efficiency calculation is extremely high and predictions on fuel efficiency on a real-time basis are difficult to make.

An object of the present invention is to estimate traveling fuel efficiency with high accuracy by appropriately reflecting an influence of disturbance in motor-vehicle traveling.

Solution to Problem

A fuel efficiency estimation system according to the present invention includes:

a velocity profile calculation unit to calculate a velocity profile indicating a change in velocity of a motor vehicle traveling a traveling route;

a velocity disturbance calculation unit to calculate, based on disturbance information indicating a disturbance event occurring on the traveling route and traveling history information collected from the motor vehicle traveling the traveling route, an attenuation factor, which is a ratio of attenuation of the velocity of the motor vehicle traveling the traveling route, as a velocity disturbance correction coefficient; and a fuel efficiency calculation unit to calculate fuel efficiency of the motor vehicle traveling the traveling route by using the velocity profile and the velocity disturbance correction coefficient.

Advantageous Effects of Invention

According to the fuel efficiency estimation system of the present invention, the velocity profile generation unit generates a velocity profile indicating a change in velocity of the motor vehicle traveling the traveling route. Also, the velocity disturbance calculation unit calculates an attenuation factor, which is a ratio of attenuation of the velocity of the motor vehicle traveling the traveling route, as a velocity disturbance correction coefficient, based on the disturbance information indicating a disturbance event occurring on the traveling route and the traveling history information collected from the motor vehicle traveling the traveling route. Also, the fuel efficiency calculation unit calculates fuel efficiency of a motor vehicle traveling the traveling route by using the velocity profile and the velocity disturbance correction coefficient. As described above, according to the present invention, the influence of disturbance on the traveling route can be represented by the ratio, and therefore it is possible to make highly-accurate estimation of traveling fuel efficiency appropriately reflecting the influence of disturbance.

DESCRIPTION OF EMBODIMENTS

Figure 1:
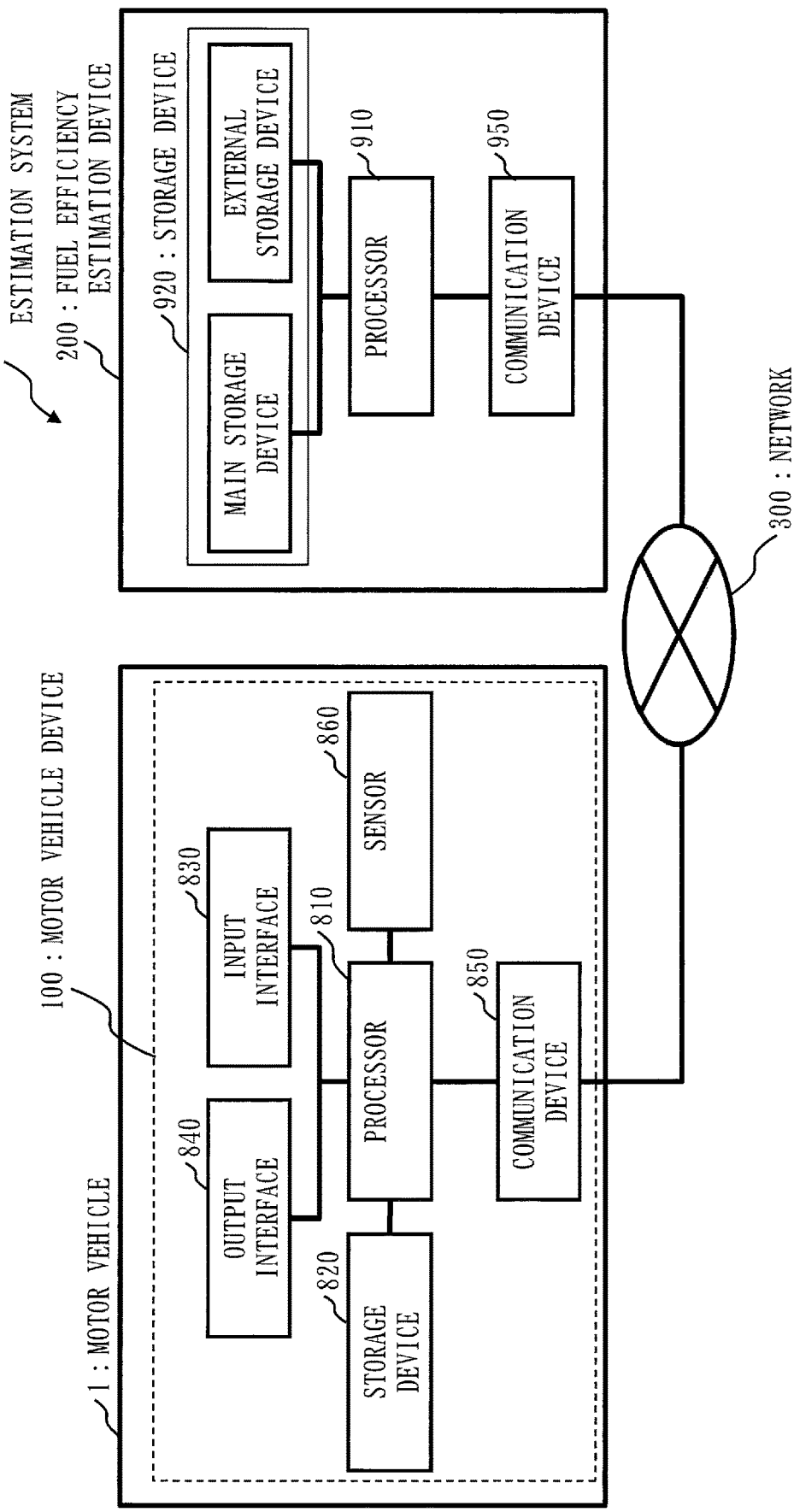
FIG. 1 illustrates an entire structure of a fuel efficiency estimation system 500 according to Embodiment 1.

In the following, embodiments of the present invention are described by using the drawings. In each drawing, identical or equivalent portions are provided with a same reference character. In the description of the embodiments, description of identical or equivalent portions is omitted or simplified as appropriate.

Embodiment 1

*Description of Structure*

Figure 2:
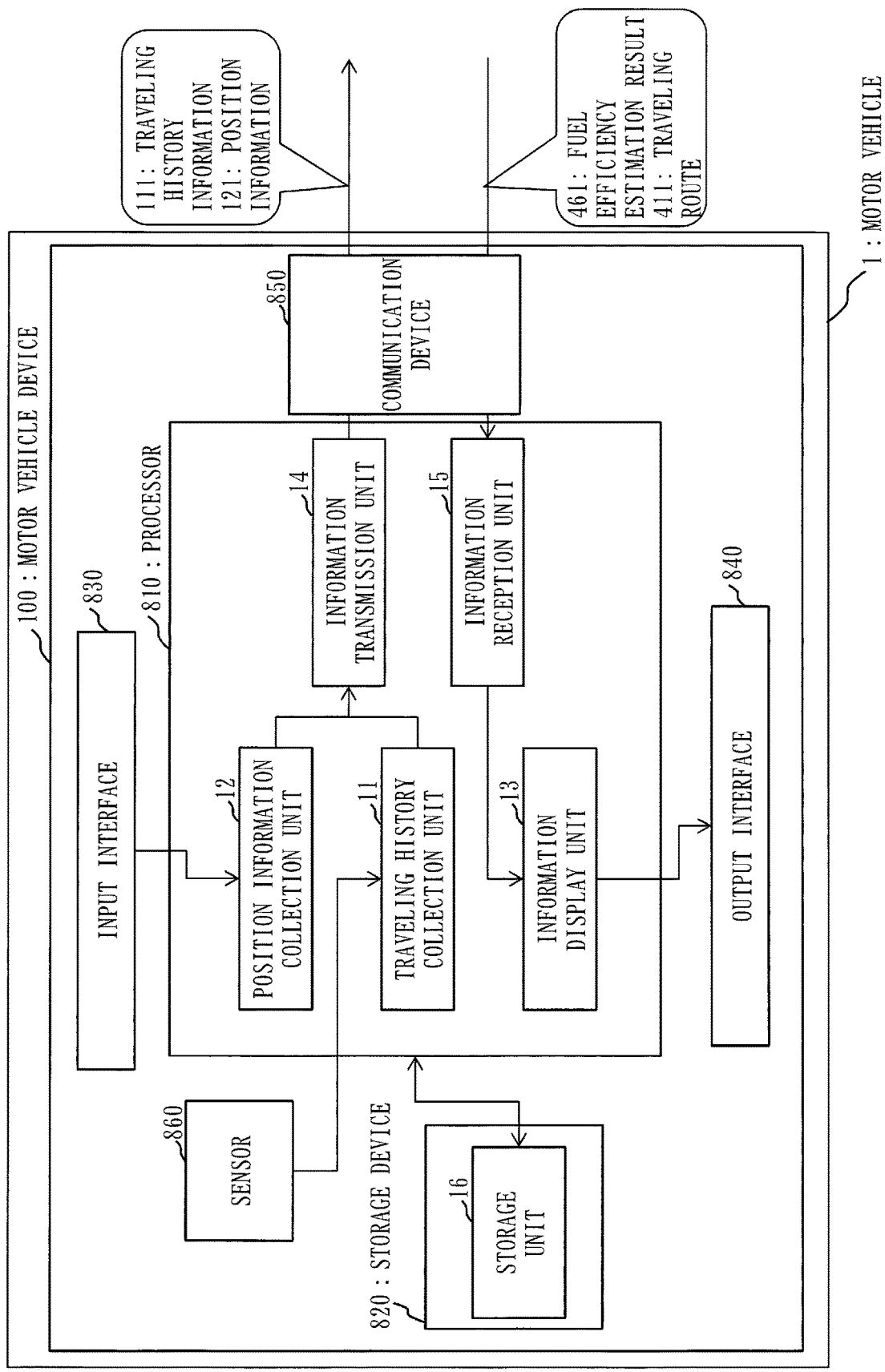
FIG. 2 illustrates a structure of a motor vehicle device 100 mounted on a motor vehicle 1 according to Embodiment 1.
Figure 3:
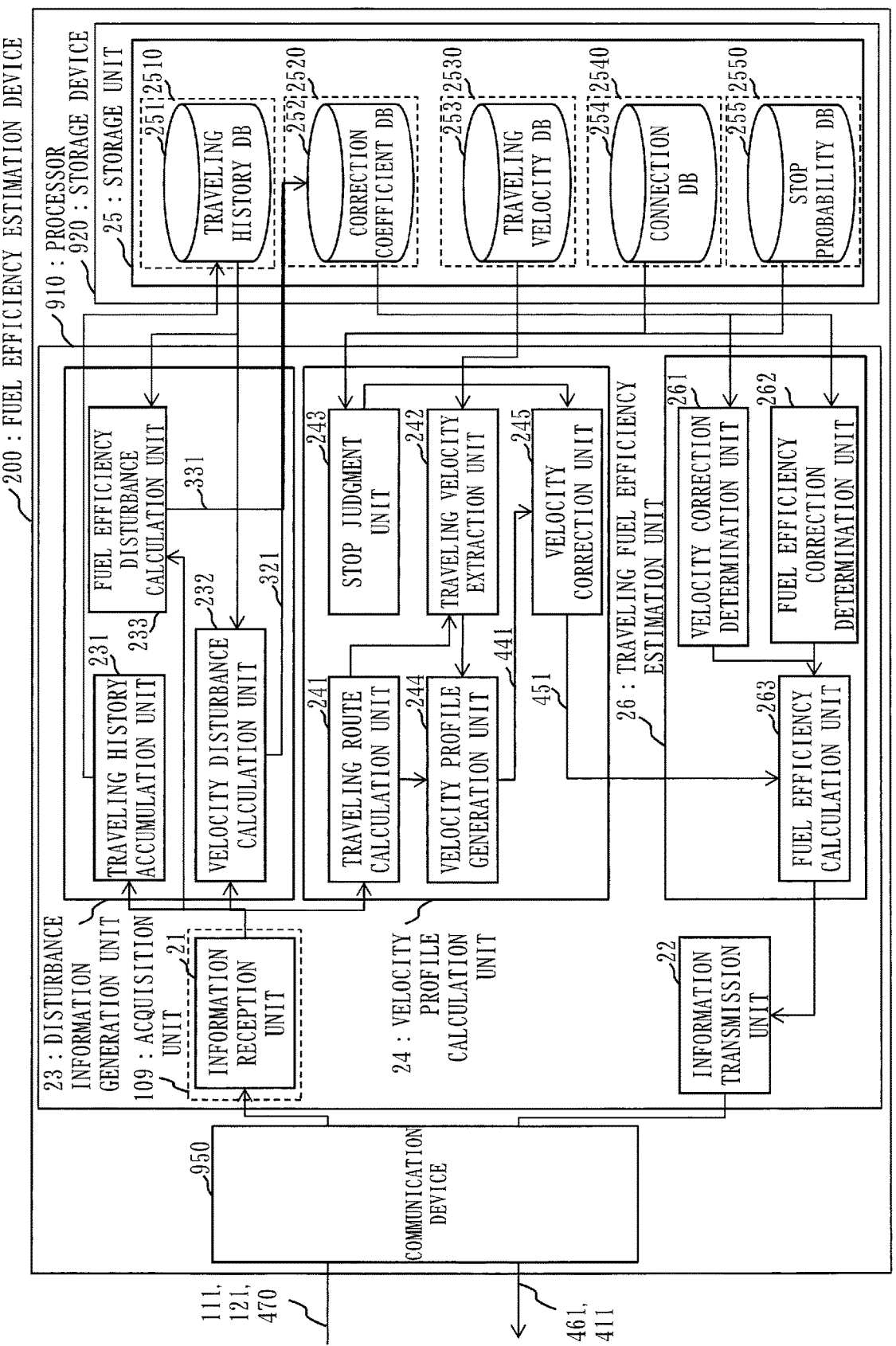
FIG. 3 illustrates a structure of a fuel efficiency estimation device 200 according to Embodiment 1.

FIG. 1 illustrates an entire structure of a fuel efficiency estimation system 500 according to the present embodiment. FIG. 2 illustrates a structure of a motor vehicle device 100 mounted on a motor vehicle 1 according to the present embodiment. FIG. 3 illustrates a structure of a fuel efficiency estimation device 200 according to the present embodiment. FIG. 1 also illustrates a hardware structure of each device configuring the fuel efficiency estimation system 500.

As illustrated in FIG. 1, the fuel efficiency estimation system 500 includes the motor vehicle device 100 mounted on the motor vehicle 1 as a fuel efficiency estimation target and the fuel efficiency estimation device 200 which communicates with the motor vehicle device 100 via a network 300.

The motor vehicle device 100 is a computer mounted on the motor vehicle 1. The motor vehicle 1 is a vehicle traveling a traveling route 411 by using fuel.

The fuel efficiency estimation device 200 is a computer. The fuel efficiency estimation device 200 estimates motor-vehicle traveling fuel efficiency of the motor vehicle 1 on a specific traveling route. In the following, the motor-vehicle traveling fuel efficiency is also referred to as traveling fuel efficiency or fuel efficiency. The fuel efficiency estimation device 200 is also referred to as a central server. The fuel efficiency estimation device 200 may be a substantial data server or may be configured in the cloud.

As illustrated in FIG. 2, the motor vehicle device 100 includes a processor 810 and other hardware such as a storage device 820, an input interface 830, an output interface 840, a communication device 850, and a sensor 860. The storage device 820 has a memory and an auxiliary storage device.

As illustrated in FIG. 2, the motor vehicle device 100 includes, as functional structures, a traveling history collection unit 11, a position information collection unit 12, an information display unit 13, an information transmission unit 14, an information reception unit 15, and a storage unit 16.

In the following description, the functions of the traveling history collection unit 11, the position information collection unit 12, the information display unit 13, the information transmission unit 14, and the information reception unit 15 of the motor vehicle device 100 are referred to as functions of "units" of the motor vehicle device 100.

The functions of the "units" of the motor vehicle device 100 are implemented by software.

The storage unit 16 is implemented by the storage device 820. Various types of information to be displayed via the output interface 840 on a display, position information 121 received from the input device via the input interface 830, the process results by the processor 810, and so forth are stored in the storage unit 16.

The sensor 860 collects traveling history information 111 such as a traveling position, traveling velocity, and traveling direction of the motor vehicle 1.

Also as illustrated in FIG. 3, the fuel efficiency estimation device 200 includes a processor 910 and other hardware such as a storage device 920 and a communication device 950. Note that the fuel efficiency estimation device 200 may include hardware such as an input interface or an output interface.

As illustrated in FIG. 3, the fuel efficiency estimation device 200 includes, as functional structures, an information reception unit 21, an information transmission unit 22, a disturbance information generation unit 23, a velocity profile calculation unit 24, a traveling fuel efficiency estimation unit 26, and a storage unit 25.

The disturbance information generation unit 23 includes a traveling history accumulation unit 231, a velocity disturbance calculation unit 232, and a fuel efficiency disturbance calculation unit 233.

The velocity profile calculation unit 24 includes a traveling route calculation unit 241, a traveling velocity extraction unit 242, a stop judgment unit 243, a velocity profile generation unit 244, and a velocity correction unit 245.

The traveling fuel efficiency estimation unit 26 includes a velocity correction determination unit 261, a fuel efficiency correction determination unit 262, and a fuel efficiency calculation unit 263.

A traveling history DB (database) 251, a correction coefficient DB 252, a traveling velocity DB 253, a connection DB 254, and a stop probability DB 255 are stored in the storage unit 25. Also values and results of the respective arithmetic operation processes at the fuel efficiency estimation device 200 are stored in the storage unit 25. The traveling history DB 251 is an example of a traveling history storage unit 2510. The correction coefficient DB 252 is an example of a correction coefficient storage unit 2520. The traveling velocity DB 253 is an example of a traveling velocity storage unit 2530. The connection DB 254 is an example of a connection storage unit 2540. The stop probability DB 255 is an example of a stop probability storage unit 2550.

In the following description, the functions of the information reception unit 21, the information transmission unit 22, the disturbance information generation unit 23, the velocity profile calculation unit 24, and the traveling fuel efficiency estimation unit 26 of the fuel efficiency estimation device 200 are referred to as functions of "units" of the fuel efficiency estimation device 200.

The functions of the "units" of the fuel efficiency estimation device 200 are implemented by software.

The storage unit 25 is implemented by the storage device 920.

In the following, a specific example of hardware of each of the motor vehicle device 100 and the fuel efficiency estimation device 200 is described.

The processor 810, 910 is connected to other hardware via a signal line to control the other hardware.

The processor 810, 910 is an IC (Integrated Circuit) for processing. The processor 810, 910 is specifically a CPU (Central Processing Unit) or the like.

The input interface 830 is a port connected to an input device such as a mouse, keyboard, or touch panel. The input interface 830 is specifically a USB (Universal Serial Bus) terminal. Note that the input interface 830 may be a port connected to a LAN (Local Area Network).

The output interface 840 is a port to which a cable of a display device such as a display is connected. The output interface 840 is, for example, a USB terminal or HDMI (registered trademark) (High Definition Multimedia Interface) terminal. The display is specifically an LCD (Liquid Crystal Display). In the motor vehicle device 100, the information display unit 13 causes information to be displayed on the display device such as a display of the motor vehicle 1 via the output interface 840. The information display unit 13 causes various types of information such as the traveling route 411 and a fuel efficiency estimation result 461 to be displayed on the display device via the output interface 840 for display and transmission to a driver.

The communication device 850, 950 includes a receiver and a transmitter. Specifically, the communication device 850, 950 is a communication chip or NIC (Network Interface Card). The communication device 850, 950 functions as a communication unit which communicates data. The receiver functions as a reception unit which receives data, and the transmitter functions as a transmission unit which transmits data. The communication device 850, 950 transmits and receives various types of information such as the traveling history information 111, the position information 121, cartographic information 450, congestion information 472, event information 473, weather information 474, warning alert information 475, the traveling route 411, and the fuel efficiency estimation result 461.

The storage devices 820 and 920 each have a main storage device and an external storage device.

The external storage device is specifically a ROM (Read Only Memory), flash memory, or HDD (Hard Disk Drive). The main storage device is specifically a RAM (Random Access Memory). The storage unit 16, 25 may be implemented by the external storage device, may be implemented by the main storage device, or may be implemented by both of the main storage device and the external storage device. Any method of implementing the storage unit 16, 25 can be taken.

In the external storage device, a program for achieving the functions of the "units" of each device is stored. This program is loaded onto the main storage device, is read to the processor 810, 910, and is executed by the processor 810, 910. In the external storage device, an OS (Operating System) is also stored. At least part of the OS is loaded onto the main storage device, and the processor 910, 810 executes the program for achieving the functions of the "units" of each device while executing the OS.

Each device may include a plurality of processors replacing the processor 810, 910. The plurality of these processors share execution of the program for achieving the functions of the "units". Each of these processors is an IC for processing, like the processor 810, 910.

Information, data, a signal value, and a variable value indicating the result of the process by the functions of the "units" of each device is stored in the main storage device, the external storage device, or a register or cache memory of the processor 810, 910. In each of FIG. 2 and FIG. 3, arrows connecting each unit and the respective storage units represent that each unit stores the process result in the storage unit or each unit reads information from the storage unit. Also, arrows connecting the respective units represent flows of control.

The program for achieving the functions of the "units" of each device may be stored in a portable recording medium such as a magnetic disc, flexible disc, optical disc, compact disc, Blu-ray (registered trademark) disc, or DVD (Digital Versatile Disc).

Note that a program for achieving the functions of the "units" of the fuel efficiency estimation system 500 is also referred to as a fuel efficiency estimation program 520. Also, a thing called a fuel efficiency estimation program product is a storage medium and storage device having the fuel efficiency estimation program 520 recorded thereon, and has loaded thereon a computer-readable program, irrespective of what visual format it takes.

*Description of Functional Structures*

First, the functional structure of the motor vehicle device 100 is described.

The traveling history collection unit 11 collects the traveling history information 111 indicating traveling history of the motor vehicle 1 by using the sensor 860.

The position information collection unit 12 receives, from the driver, information about an origin and a destination in the traveling of the motor vehicle 1 as the position information 121. The position information collection unit 12 accepts the position information 121 from the driver via the input interface 830.

The information display unit 13 causes the traveling route 411 calculated by the fuel efficiency estimation device 200 from the position information 121 and the fuel efficiency estimation result 461 of the motor vehicle 1 on the traveling route 411 to be displayed on the display device via the output interface 840.

The information transmission unit 14 transmits the position information 121 including the origin and the destination and the traveling history information 111 indicating the traveling history of the motor vehicle 1 via the communication device 850 to the fuel efficiency estimation device 200.

The information reception unit 15 receives the traveling route 411 and the fuel efficiency estimation result 461 via the communication device 850.

Next, the functional structure of the fuel efficiency estimation device 200 is described.

The information reception unit 21 receives the traveling history information 111 and the position information 121 transmitted from the motor vehicle device 100 via the communication device 950. Also, the information reception unit 21 receives the cartographic information 450, the congestion information 472, the event information 473, the weather information 474, and the warning alert information 475, which are infrastructure information 470, via the communication device 950. The cartographic information 450 is specifically a digital road map. The warning alert information 475 is specifically information such as warning and alert information. The congestion information 472 is road congestion information.

The information transmission unit 22 transmits the traveling route 411 and the fuel efficiency estimation result 461 in the traveling route 411 via the communication device 950 to the motor vehicle device 100.

The disturbance information generation unit 23 calculates a velocity disturbance correction coefficient 321 and a fuel efficiency disturbance correction coefficient 331 based on the traveling history information 111, the cartographic information 450, the congestion information 472, the event information 473, the weather information 474, and the warning alert information 475, which are received by the information reception unit 21, and stores the velocity disturbance correction coefficient 321 and the fuel efficiency disturbance correction coefficient 331 in the storage unit 25.

Here, the velocity disturbance correction coefficient 321 is an attenuation factor of the traveling velocity in consideration of at least any of road congestion and event disturbance for each link, which is a road section between nodes on the digital road map. The velocity disturbance correction coefficient 321 is also referred to as road congestion and event disturbance.

Also, the fuel efficiency disturbance correction coefficient 331 is a deterioration ratio of fuel efficiency for each link in consideration of weather disturbance. The fuel efficiency disturbance correction coefficient 331 is also referred to as weather disturbance. The velocity disturbance correction coefficient 321 and the fuel efficiency disturbance correction coefficient 331 are also collectively referred to as a disturbance correction coefficient.

Note that a link indicates a road section between nodes on the digital road map. Also, a node on the digital road map indicates an intersection, another node in road network representation, or the like. The link is one example of each of a plurality of road sections configuring a road.

The velocity profile calculation unit 24 calculates a velocity profile indicating a change in velocity of the motor vehicle traveling the traveling route 411. The velocity profile calculation unit 24 calculates the traveling route 411 based on the position information 121 and the cartographic information 450 received by the information reception unit 21. Then, by using a traveling velocity at normal time for a link included in the traveling route 411, a stop probability at an intersection included in the traveling route 411, and connection information about traffic signals included in the traveling route 411, the velocity profile calculation unit 24 calculates a velocity profile for traveling of the motor vehicle on the traveling route 411.

By using the velocity profile for the traveling route 411 calculated by the velocity profile calculation unit 24, the velocity disturbance correction coefficient 321, and the fuel efficiency disturbance correction coefficient 331, the traveling fuel efficiency estimation unit 26 calculates traveling fuel efficiency of the motor vehicle on the traveling route 411 as the fuel efficiency estimation result 461.

Each functional structure of the disturbance information generation unit 23 is described.

The traveling history accumulation unit 231 accumulates the traveling history information 111 in the traveling history DB 251 of the storage unit 25.

The velocity disturbance calculation unit 232 calculates an attenuation factor, which is a ratio of attenuation of the velocity of the motor vehicle traveling the traveling route 411, as the velocity disturbance correction coefficient 321, based on disturbance information indicating a disturbance event occurring on the traveling route 411 and the traveling history information 111 collected from the motor vehicle traveling the traveling route 411. The velocity disturbance calculation unit 232 calculates the velocity disturbance correction coefficient 321 based on at least the congestion information indicating a congestion situation of the traveling route 411 as the disturbance information. In the present embodiment, the velocity disturbance calculation unit 232 calculates the velocity disturbance correction coefficient 321 based on at least the congestion information and the event information indicating an event occurring on the traveling route 411 as the disturbance information. Specifically, the velocity disturbance calculation unit 232 calculates an attenuation factor of the traveling velocity from traveling at normal time for each link by road congestion situation and by event occurrence situation, based on the traveling history information 111 accumulated in the traveling history DB 251. The velocity disturbance calculation unit 232 stores, as the velocity disturbance correction coefficient 321, the calculated attenuation factor of the traveling velocity from traveling at normal times for each link in the correction coefficient DB 252 of the storage unit 25.

The fuel efficiency disturbance calculation unit 233 calculates a deterioration ratio, which is a ratio of deterioration of fuel efficiency of the motor vehicle traveling on the traveling route 411 as the fuel efficiency disturbance correction coefficient 331, based on the disturbance information and the traveling history information 111. The fuel efficiency disturbance calculation unit 233 calculates the fuel efficiency disturbance correction coefficient 331 based on at least the weather information indicating weather on the traveling route 411 as the disturbance information. In the present embodiment, the fuel efficiency disturbance calculation unit 233 calculates the fuel efficiency disturbance correction coefficient 331 based on at least the weather information and the warning alert information indicating a warning or an alert for the traveling route 411 as the disturbance information. Specifically, the fuel efficiency disturbance calculation unit 233 calculates a fuel efficiency deterioration ratio from traveling at normal time for each link by weather information and by warning or alert information, based on the traveling history information 111 accumulated in the traveling history DB 251. The fuel efficiency disturbance calculation unit 233 stores, as the fuel efficiency disturbance correction coefficient 331, the calculated fuel efficiency deterioration ratio from traveling at normal time for each link in the correction coefficient DB 252 of the storage unit 25.

The disturbance event is an event which influences the velocity and fuel efficiency of the motor vehicle traveling the traveling route 411, such as congestion, an event, weather, warning, or alert occurring on the traveling route 411. The disturbance information indicating the disturbance event is specifically information such as congestion information, event information, weather information, or warning alert information.

Each functional structure of the velocity profile calculation unit 24 is described.

The traveling route calculation unit 241 acquires the position information 121 received by the information reception unit 21. The position information 121 includes the origin and the destination. The position information 121 and the cartographic information 450 are examples of traveling route information indicating a traveling route. Also, the information reception unit 21 is an example of an acquisition unit 109 which acquires the position information 121 as traveling route information. The traveling route calculation unit 241 calculates the traveling route 411 in movement from the origin to the destination based on the position information 121 and the cartographic information 450. The traveling route calculation unit 241 outputs the traveling route 411 to the traveling velocity extraction unit 242.

The traveling velocity extraction unit 242 extracts, from the traveling velocity DB 253, a link traveling velocity indicating a traveling velocity at normal time for a link on the digital road map. Here, a link indicates a road section between nodes on the digital road map. Also, a node on the digital road map indicates an intersection, another node in road network representation, or the like. The link is one example of each of a plurality of road sections configuring a road. In the traveling velocity DB 253, link traveling velocities calculated in advance are stored.

The stop judgment unit 243 acquires a stop probability at an intersection that is present on the traveling route 411 where the motor vehicle may stop and connection information indicating connected/disconnected operation between a traffic signal installed at the intersection and a traffic signal installed at an intersection adjacent thereto. The stop judgment unit 243 judges intersection stop/nonstop for all intersections on the traveling route 411 based on the connection information stored in the connection DB 254 and the stop probability stored in the stop probability DB 255. The stop judgment unit 243 is also referred to as an intersection stop judgment unit.

In the connection DB 254, connection information about traffic signals at the respective intersections on the roads nationwide is stored. In the stop probability DB 255, stop probabilities at the respective intersections on the road nationwide are stored.

The velocity profile generation unit 244 generates a velocity profile 441 indicating a change in velocity of the motor vehicle traveling the traveling route 411. The velocity profile 441 is a velocity profile with intersection nonstop. Based on an acquisition date and time when the information reception unit 21 as the acquisition unit 109 acquires the position information 121 and the traveling velocity for each of road sections (links) configuring the traveling route 411, the velocity profile generation unit 244 generates the velocity profile 441 when the traveling route 411 is traveled with date and time attributes of the acquisition date and time. The velocity profile generation unit 244 couples all link traveling velocities on the traveling route 411 together in the order of passing by traveling, thereby generating the velocity profile 441 with intersection nonstop.

The velocity correction unit 245 corrects the velocity profile 441 based on stop/nonstop at the intersection that is present on the traveling route 411. The velocity correction unit 245 corrects the velocity profile 441 with intersection nonstop calculated by the velocity profile generation unit 244 to generate a velocity profile 451 in consideration of intersection stop. The velocity correction unit 245 adds an acceleration/deceleration change due to intersection stop based on the stop judgment result at all intersections on the traveling route 411 calculated by the stop judgment unit 243 to generate the velocity profile 451 in consideration of intersection stop. The velocity correction unit 245 is also referred to as an intersection velocity correction unit.

Each functional structure of the traveling fuel efficiency estimation unit 26 is described.

The velocity correction determination unit 261 determines a velocity disturbance correction coefficient for use in traveling fuel efficiency estimation at the velocity profile 451 calculated at the velocity profile calculation unit 24. The velocity correction determination unit 261 extracts the velocity disturbance correction coefficient 321 at the estimation date and time from the correction coefficient DB 252, and determines it as a velocity disturbance correction coefficient. The velocity disturbance correction coefficient is used to optimally correct the traveling velocity in the velocity profile 451 in accordance with at least a road congestion situation or an event occurrence situation on the traveling route 411 at the estimation date and time.

The fuel efficiency correction determination unit 262 determines a fuel efficiency disturbance correction coefficient 612 for use in traveling fuel efficiency estimation at the velocity profile 451 calculated at the velocity profile calculation unit 24. The fuel efficiency correction determination unit 262 extracts the fuel efficiency disturbance correction coefficient 331 at the estimation date and time from the correction coefficient DB 252, and determines it as a fuel efficiency disturbance correction coefficient. The fuel efficiency disturbance correction coefficient is used to make an optimum fuel efficiency disturbance correction at the estimation date and time in accordance with weather conditions at the estimation date and time for the traveling route 411.

By using the velocity profile 451, the velocity disturbance correction coefficient, and the fuel efficiency disturbance correction coefficient, the fuel efficiency calculation unit 263 estimates fuel efficiency of the motor vehicle traveling the traveling route 411. Note that the fuel efficiency calculation unit 263 may calculate fuel efficiency of the motor vehicle traveling the traveling route 411 by using only the velocity profile 451 and the velocity disturbance correction coefficient. Specifically, the fuel efficiency calculation unit 263 calculates fuel efficiency of the motor vehicle traveling the traveling route 411 based on the velocity profile 451 in consideration of intersection stop corrected by the velocity correction unit 245. The fuel efficiency calculation unit 263 is also referred to as an estimation fuel efficiency calculation unit. Based on the velocity profile 451 in consideration of intersection stop calculated at the velocity correction unit 245, by using the velocity disturbance correction coefficient and the fuel efficiency disturbance correction coefficient, the fuel efficiency calculation unit 263 calculates fuel efficiency in motor-vehicle traveling on the traveling route 411, and outputs it as the fuel efficiency estimation result 461 to the information transmission unit 22.

\*\*\*Description of Operation\*\*\*

Next, operations of a fuel efficiency estimation method 510 and the fuel efficiency estimation program 520 of the fuel efficiency estimation system 500 according to the present embodiment are described.

<Disturbance Information Generation Process S110 by Fuel Efficiency Estimation Device 200>

Figure 4:
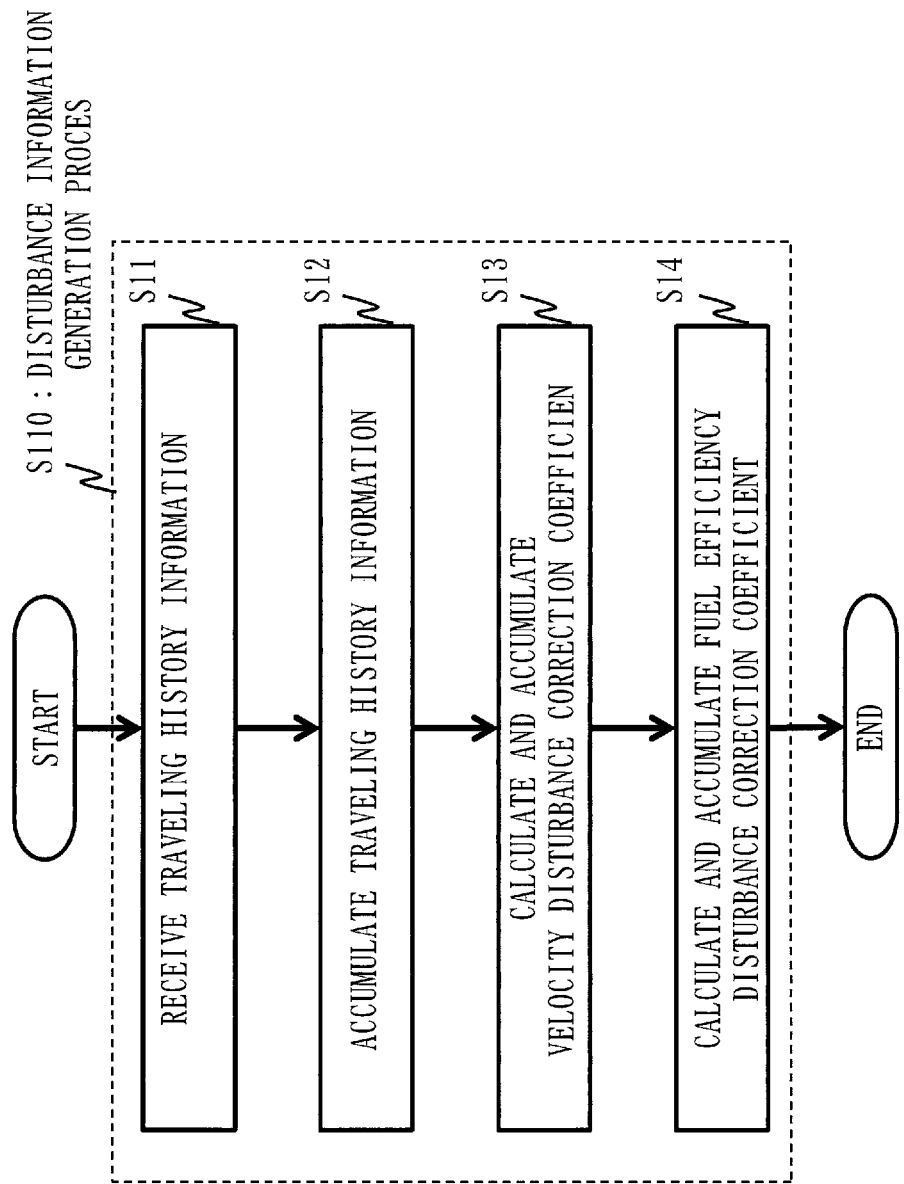
FIG. 4 is a flowchart of a disturbance information generation process S110 by a disturbance information generation unit 23 of the fuel efficiency estimation device 200 according to Embodiment 1.

FIG. 4 is a flowchart of a disturbance information generation process S110 by the disturbance information generation unit 23 of the fuel efficiency estimation device 200 according to the present embodiment. The disturbance information generation process S110 is performed entirely at the fuel efficiency estimation device 200 as a central server. The disturbance information generation process S110 is sequentially performed when the information reception unit 21 receives the traveling history information 111 from the motor vehicle device 100 at step S11.

At step S11, the information reception unit 21 receives the traveling history information 111 from the motor vehicle device 100 mounted on the motor vehicle 1.

At step S12, the traveling history accumulation unit 231 classifies the traveling history information 111 received from the motor vehicle device 100 in accordance with road congestion information, event information, weather information, and warning alert information for accumulation in the traveling history DB 251.

At step S13, the velocity disturbance calculation unit 232 calculates the velocity disturbance correction coefficient 321 based on the traveling history information 111 accumulated in the traveling history DB 251 and the congestion information 472 and the event information 473 acquired from the infrastructure information 470. The velocity disturbance calculation unit 232 accumulates the calculated velocity disturbance correction coefficient 321 in the correction coefficient DB 252.

At step S14, the fuel efficiency disturbance calculation unit 233 calculates the fuel efficiency disturbance correction coefficient 331 based on the traveling history information 111 accumulated in the traveling history DB 251 and the weather information 474 and the warning alert information 475 acquired from the infrastructure information 470. The fuel efficiency disturbance calculation unit 233 accumulates the calculated fuel efficiency disturbance correction coefficient 331 in the correction coefficient DB 252. The warning alert information 475 includes information such as warning and alert information.

Also, in the disturbance information generation process S110, each of the processes at step S12, step S13, and step S14 may be in a mode of being each processed independently. Here, the process at step S14 is assumed to be performed after at least the process at step S12 is performed once or more. On the other hand, the processes at step S12 and step S13 are assumed to be able to be performed even if other processes are not performed once.

Also, when the respective processes in the disturbance information generation process S110 are performed independently, the respective processes at step S12, step S13, and step S14 may be offline processes. In the offline processes, for example, the process at step S12 is performed once a day, the process at step S13 is performed once a month, the process at step S14 is performed once a month. In this manner, a process execution interval is required to be appropriately set in consideration of the process load to be applied to the fuel efficiency estimation device 200.

Figure 5:
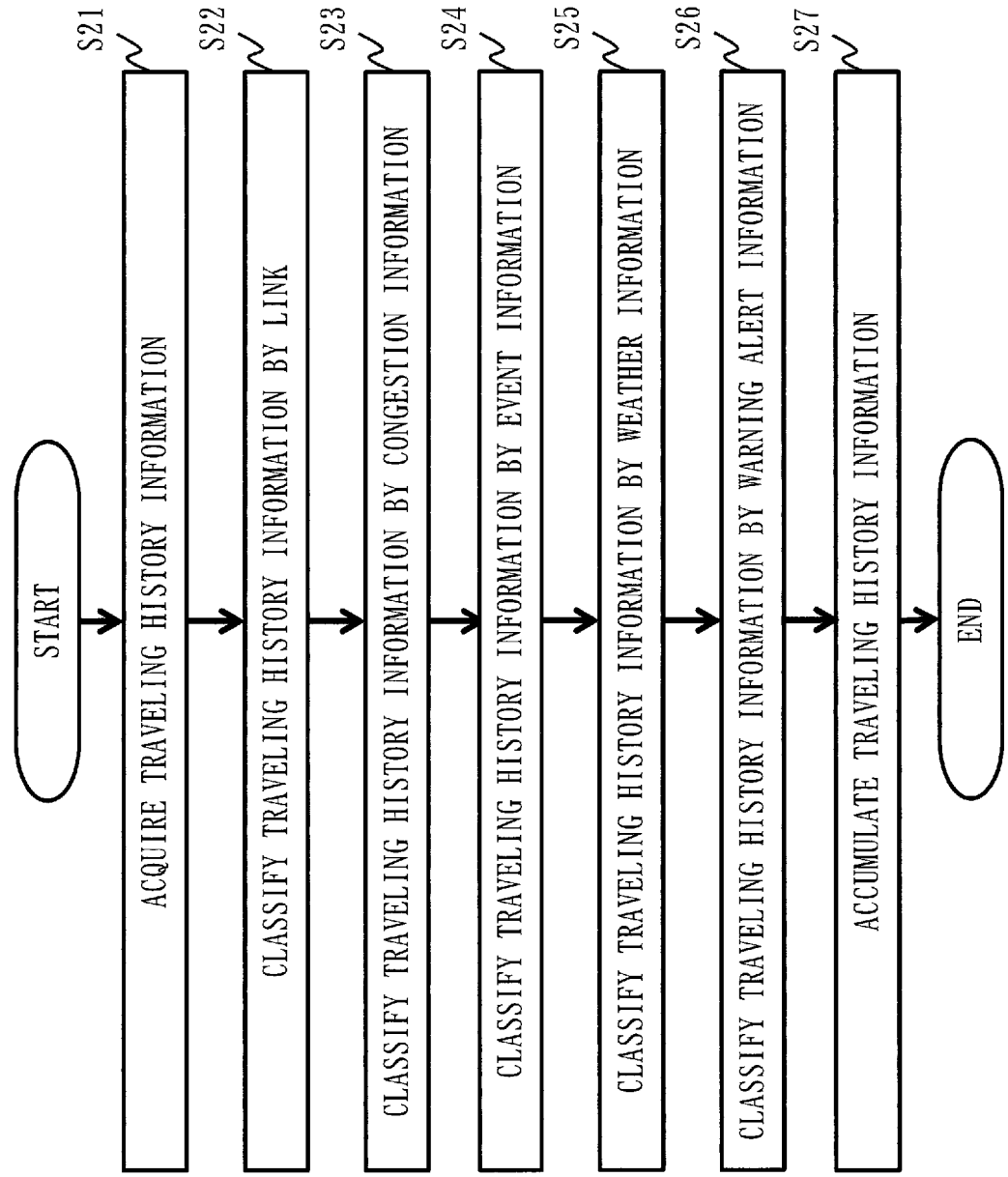
FIG. 5 is a flowchart of a traveling history accumulation unit 231 according to Embodiment 1.

FIG. 5 is a flowchart of the traveling history accumulation unit 231 according to the present embodiment. FIG. 5 illustrates details of the process at step S12 of FIG. 4.

At step S21, the traveling history accumulation unit 231 acquires the traveling history information 111 from the information reception unit 21. Here, the traveling history information 111 includes at least a traveling position, traveling velocity, traveling direction, and traveling date and time information. Also, the traveling history information 111 can be information-divided by link and by date and time. Here, the traveling history information 111 may have a link, acceleration, gradient, and so forth. Furthermore, the traveling history information 111 may include congestion information, event information, weather information, and warning alert information at the same time. Alternatively, simultaneously with reception of the traveling history information 111, the traveling history accumulation unit 231 may acquire the congestion information 472, the event information 473, the weather information 474, and the warning alert information 475 from the infrastructure information 470.

Note that "by date and time" specifically refers to classification by date and time attribute such as time, day of the week, or season. Classification by time specifically refers to classification at thirty-minute intervals, one-hour intervals, or the like. Classification by season specifically refers to "by month". A division interval of time and season can improve estimation accuracy of traveling fuel efficiency of the motor vehicle as fragmentation proceeds. On the other hand, the division interval of date and time may be increased in accordance with the process load on the fuel efficiency estimation device 200 and the number of motor vehicles capable of transmitting the traveling history information 111.

At step S22, the traveling history accumulation unit 231 classifies the traveling history information 111 by link. By classifying the traveling history information 111 by link, it is possible to more accurately represent a degree of influence on a traveling velocity or traveling fuel efficiency varied for each link. However, the present process can be omitted in consideration of the load situation of the fuel efficiency estimation device 200. Even in that case, the tendency of the degree of influence on the traveling velocity or traveling fuel efficiency is basically the same for each external situation at the time of traveling, and therefore the degree of influence can be represented while certain accuracy is ensured.

At step S23, the traveling history accumulation unit 231 classifies the traveling history information 111 classified by link, by road congestion information. Specifically, as classification of the congestion information, classification is made at three stages of smooth/congested/heavily congested, which are used in VICS (registered trademark, Vehicle Information and Communication System: road traffic information communication system) and so forth.

At step S24, the traveling history accumulation unit 231 classifies the traveling history information 111 classified by link, by event information. Specifically, as classification by event information, classification is made by using the presence or absence of a sporadic event considered to influence road congestion, such as information about whether a road regulation is present and information about whether an event is held.

At step S25, the traveling history accumulation unit 231 classifies the traveling history information 111 classified by link, by weather information. Specifically, as classification by weather information, classification is made based on information about a weather forecast published by the meteorological agency, that is, information about sunny/cloudy/rainy/snowy.

At step S26, the traveling history accumulation unit 231 classifies the traveling history information 111 classified by link, by waring alert information. Specifically, as classification by warning alert information, classification is made based on information about a warning and an alert published by the meteorological agency, that is, information about lightning/storm/dense fog.

At step S27, the traveling history accumulation unit 231 accumulates the traveling history information 111 by link classified by road congestion information, by event information, by weather information, and by warning alert information in the traveling history DB 251. Here, the traveling history accumulation unit 231 may simultaneously accumulate statistical information such as the number of pieces of data accumulated.

As described above, in the traveling history DB 251, the traveling history information 111 is stored as being classified by disturbance event. That is, the traveling history accumulation unit 231 classifies the traveling history information 111 for each link as a road section, and then classifies it for each disturbance event and accumulates it in the traveling history DB 251.

Figure 6:
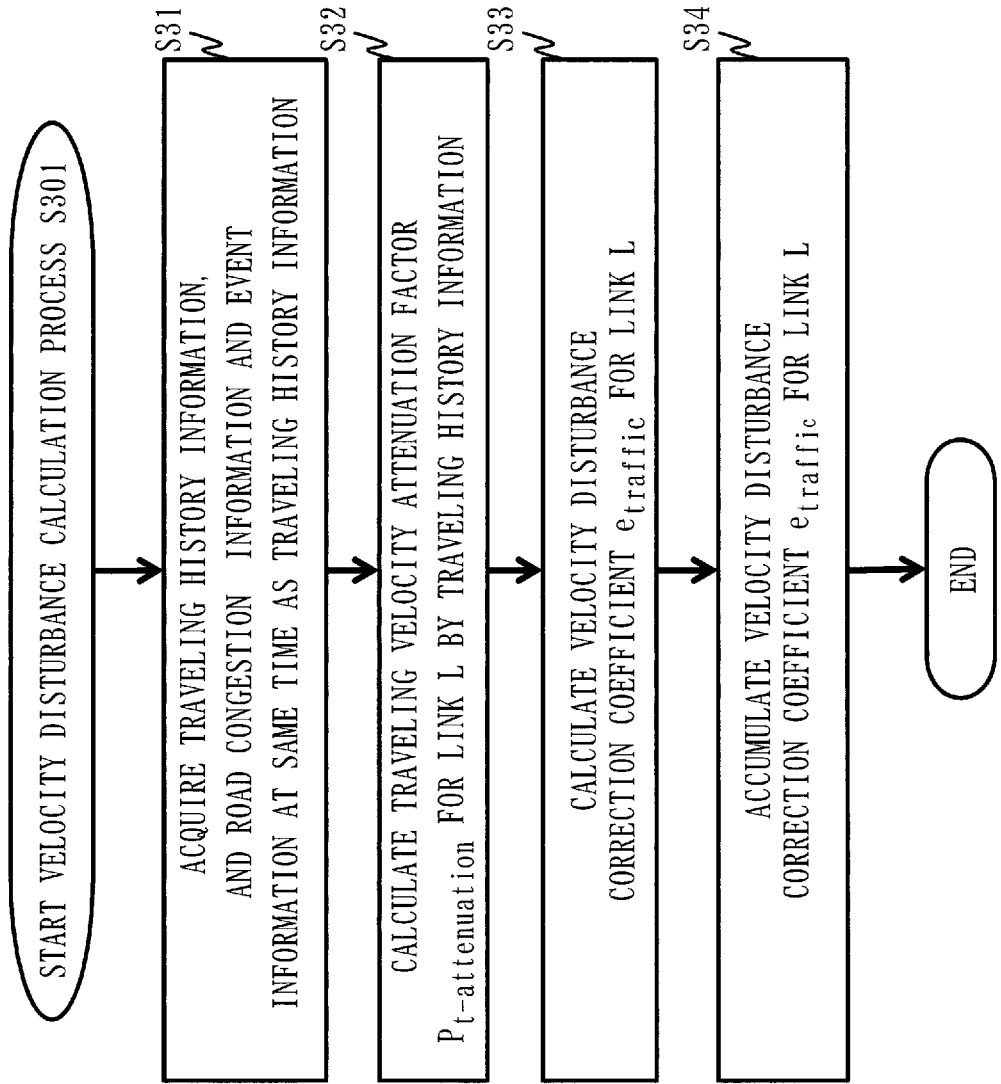
FIG. 6 is a flowchart of a velocity disturbance calculation unit 232 according to Embodiment 1.

FIG. 6 is a flowchart of a velocity disturbance calculation process S301 by the velocity disturbance calculation unit 232 according to the present embodiment. FIG. 6 illustrates details of the process of step S13 of FIG. 4. Here, the case is described in which the velocity disturbance correction coefficient 321 for the link L is calculated.

At step S31, the velocity disturbance calculation unit 232 acquires the traveling history information 111 for the link L stored in the traveling history DB 251 and the road congestion information and the event information as disturbance information at the same time as this traveling history information 111. Here, the traveling history information 111 has at least a traveling velocity and traveling date and time information. Also, the traveling history information 111 may include congestion information and event information. In that case, the velocity disturbance calculation unit 232 acquires only the traveling history information 111.

At step S32, the velocity disturbance calculation unit 232 calculates, from the extracted traveling history information 111 for the link L, a traveling velocity attenuation factor $P_{t\text{-}attenuation}$ when compared with traveling at normal time, by congestion information and by event information. Here, as traveling at normal time, for example, an average link traveling velocity when the congestion information indicates smooth and the event information indicates none is used. When the average link traveling velocity at normal time in traveling this link L is taken as $V_{normal}(L)$ and when the congestion information is b and the event information is c, a link traveling velocity for the link L in an n-th traveling history information 111 is taken as $V_{t\text{-}attenuation}(L, b, c, n)$. When the road congestion information is b and the event information is c, the traveling velocity attenuation factor $P_{t\text{-}attenuation}(L, b, c, n)$ is as in an expression (1).

FORMULA 1

$$P_{t\text{-}attenuation}(L, b, c, n) = \frac{V_{t\text{-}attenuation}(L, b, c, n)}{V_{normal}(L)} \quad (1)$$

At step S33, by using the calculated traveling velocity attenuation factor $P_{t\text{-}attenuation}(L, b, c, n)$, the velocity disturbance calculation unit 232 calculates a velocity disturbance correction coefficient $e_{traffic}(L, b, c)$ for the link L by road congestion information and by event information. Here, when $N_{bc}$ pieces of traveling history information for the link L are present and when the road congestion information is b and the event information is c, the velocity disturbance correction coefficient $e_{traffic}(L, b, c)$ is as in an expression (2).

FORMULA 2

$$e_{traffic}(L, b, c) = \frac{1}{N_{bc}} \sum_{n}^{N_{bc}} P_{t\text{-}attenuation}(L, b, c, n) \quad (2)$$

Lastly at step S34, the velocity disturbance calculation unit 232 accumulates the calculated velocity disturbance correction coefficient $e_{traffic}$ for the link L in the correction coefficient DB 252.

By the above process, representation by the attenuation factor can absorb variations and differences of the disturbance influence on the traveling velocity of the motor vehicle depending on different drivers and different road shapes and motor-vehicle types, leading to collection, accumulation, and calculation as single statistical information.

To more improve estimation accuracy for the velocity disturbance correction coefficient $e_{traffic}$, cartographic information such as the length of each link (narrowness between intersections) and road gradients may be added to the road congestion information b and the event information c for calculation and consideration for each case. This consideration for each case is determined in consideration of the load and the processing speed of a processing server.

As described above, the velocity disturbance calculation unit 232 calculates the velocity disturbance correction coefficient based on the traveling history information 111 classified by disturbance event and stored in the traveling history DB 251 and the disturbance information.

Figure 7:
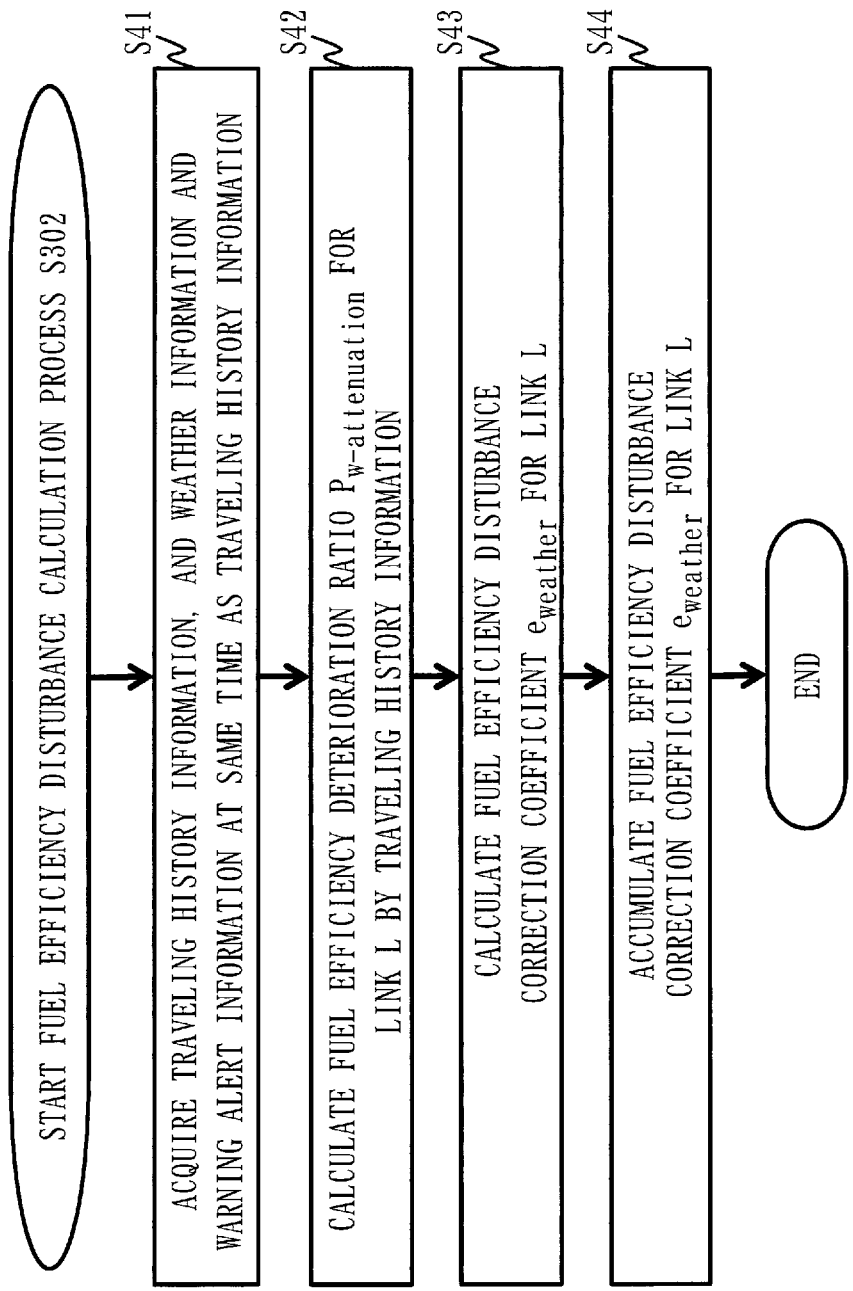
FIG. 7 is a flowchart of a fuel efficiency disturbance calculation unit 233 according to Embodiment 1.

FIG. 7 is a flowchart of a fuel efficiency disturbance calculation process S302 by the fuel efficiency disturbance calculation unit 233 according to the present embodiment. The present process illustrates details of the process at step S14 of FIG. 4. Here, the case is described in which the fuel efficiency disturbance correction coefficient 331 for the link L is calculated.

At step S41, the fuel efficiency disturbance calculation unit 233 acquires the traveling history information 111 for the link L stored in the traveling history DB 251 and the weather information and the warning alert information as disturbance information at the same time as this traveling history information 111. Here, the traveling history information 111 has at least a traveling velocity, actual fuel efficiency, traveling date and time information. Also, the weather information and the warning alert information may be included in the traveling history information 111. In that case, the fuel efficiency disturbance calculation unit 233 acquires only the traveling history information 111.

At step S42, the fuel efficiency disturbance calculation unit 233 calculates, from the extracted traveling history information 111 for the link L, a traveling fuel efficiency deterioration ratio $P_{w\text{-}attenuation}$ when compared with traveling at normal time, by weather information and by waring alert information at the time of traveling. Here, as traveling at normal time, for example, average traveling fuel efficiency when the weather is sunny and there is no warning alert information is taken as $F_{normal}(L)$. Also, average traveling fuel efficiency for the link L in an n-th piece of the traveling history information 111 when the weather information is d and the warning alert information is g is taken as $F_{w\text{-}attenuation}(L, d, g, n)$. Here, when the weather information is d and the warning alert information is g, a traveling fuel efficiency deterioration ratio $P_{w\text{-}attenuation}(L, d, g, n)$ is as in an expression (3).

FORMULA 3

$$P_{w\text{-}attenuation}(L, d, g, n) = \frac{F_{w\text{-}attenuation}(L, d, g, n)}{F_{normal}(L)} \quad (3)$$

At step S43, by using the calculated traveling fuel efficiency deterioration ratio $P_{w\text{-}attenuation}(L, d, g, n)$, the fuel efficiency disturbance calculation unit 233 calculates a fuel efficiency disturbance correction coefficient $e_{weather}(L, d, g)$ for the link L, by weather information and by warning alert information at the time of traveling. Here, when $N_{dg}$ pieces of the traveling history information 111 for the link L are present and when the weather information is d and the warning alert information is g at the time of traveling, the fuel efficiency disturbance correction coefficient $e_{weather}(L, d, g)$ is as in an expression (4).

FORMULA 4

$$e_{weather}(L, d, g) = \frac{1}{N_{dg}} \sum_{n}^{N_{dg}} P_{w\text{-}attenuation}(L, d, g, n) \quad (4)$$

Lastly at step S44, the fuel efficiency disturbance calculation unit 233 accumulates the calculated fuel efficiency disturbance correction coefficient $e_{weather}$ for the link L in the correction coefficient DB 252.

Representation by the fuel efficiency deterioration ratio can absorb variations and differences of the disturbance influence on the traveling fuel efficiency of the motor vehicle depending on different drivers and different road shapes and motor-vehicle types, leading to collection, accumulation, and calculation as single statistical information.

To more improve estimation accuracy for the fuel efficiency disturbance correction coefficient $e_{weather}$, road information such as curvature of traveling links and road surface situation, that is, on-road or off-road, may be added to the weather information d and the warning alert information g at the time of traveling for calculation and consideration for each case. This consideration for each case is determined in consideration of the load and the processing speed of a processing server.

As described above, the fuel efficiency disturbance calculation unit 233 calculates the fuel efficiency disturbance correction coefficient based on the traveling history information 111 classified by disturbance event and stored in the traveling history DB 251 and the disturbance information.

<Velocity Profile Calculation Process S120 by Fuel Efficiency Estimation Device 200>

Figure 8:
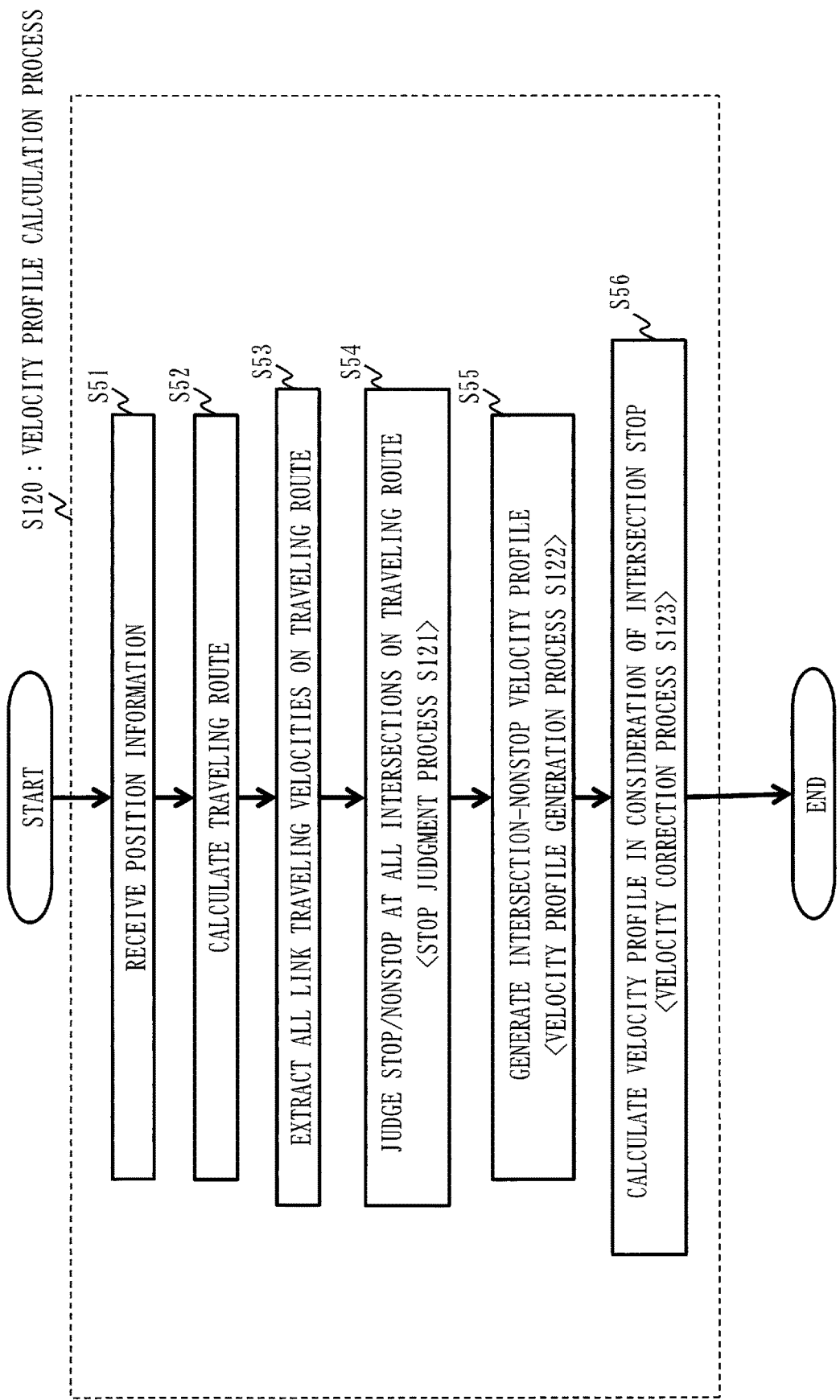
FIG. 8 is a flowchart of a velocity profile calculation process S120 by a velocity profile calculation unit 24 of the fuel efficiency estimation device 200 according to Embodiment 1.

FIG. 8 is a flowchart of a velocity profile calculation process S120 by the velocity profile calculation unit 24 of the fuel efficiency estimation device 200 according to the present embodiment. The velocity profile calculation process S120 is performed at the fuel efficiency estimation device 200 as a central server. The velocity profile calculation process S120 is sequentially performed when the information reception unit 21 receives the position information 121 including the origin and the destination from the motor vehicle 1 (step S51). Note that, in the following, description is exemplarily made to the case in which an acquisition date and time (time $t_0$, day of the week $w_0$, season $s_0$) when the information reception unit 21 as the acquisition unit 109 acquires the position information 121 as traveling route information is taken as an estimation date and time for estimation of traveling fuel efficiency of the motor vehicle 1.

At step S52, the traveling route calculation unit 241 calculates a traveling route X of the motor vehicle based on the position information 121 including the origin and the destination received from the motor vehicle 1.

At step S53, the traveling velocity extraction unit 242 extracts, from the traveling velocity DB 253, a link traveling velocity $V(L_k, t_k, w_k, s_k)$ $(1 \le k \le n+1)$ for all passage links on the traveling route X.

At step S54, the stop judgment unit 243 judges intersection stop/nonstop $S(i_1)$ to $S(i_m)$ for all intersections $i_1$ to $i_m$ on the traveling route X. The process at step S54 is an example of a stop judgment process S121 in which, based on a stop probability P at an intersection i that is present on the traveling route X where the motor vehicle may stop and connected/disconnected operation between a traffic signal installed at the intersection i and a traffic signal installed at an intersection adjacent to the intersection i, stop/nonstop of the motor vehicle at the intersection i is judged.

At step S55, by using the link traveling velocity $V(L_k, t_k, w_k, s_k)$ $(1 \le k \le n)$ extracted by the traveling velocity extraction unit 242, the velocity profile generation unit 244 calculates an intersection-nonstop velocity profile $V_{profile\text{-}nonstop}(X)$ in traveling the traveling route X. That is, based on the acquisition date and time (time $t_0$, day of the week $w_0$, season $s_0$) and the link traveling velocity $V(L_k, t_k, w_k, s_k)$ $(1 \le k \le n)$ for all passage links on the traveling route X, the velocity profile generation unit 244 generates a velocity profile when the traveling route X is traveled at the date and time with the same date and time attributes as those of the acquisition date and time. The process at step S55 is an example of a velocity profile generation process S122 of generating the intersection-nonstop velocity profile $V_{profile\text{-}nonstop}(X)$ indicating a change in velocity of the motor vehicle traveling on the traveling route X.

At step S56, the velocity correction unit 245 reproduces, on the intersection-nonstop velocity profile $V_{profile\text{-}nonstop}(X)$ calculated by the velocity profile generation unit 244, an acceleration/deceleration occurring due to intersection stop by the intersection stop/nonstop $S(i_1)$ to $S(i_m)$ judged at the stop judgment unit 243, and calculates the velocity profile $V_{profile}(X)$ in consideration of intersection stop. The process at step S56 is an example of a velocity correction process S123 of correcting the intersection-nonstop velocity profile $V_{profile\text{-}nonstop}(X)$ to velocity profile $V_{profile}(X)$ in consideration of intersection stop based on stop/nonstop at the intersections judged in the stop judgment process S121.

Here, as a scheme for use in calculation of the traveling route X in the process at step S52, a scheme such as Dijkstra method for use in current car navigation or the like may be used. Also, when a plurality of traveling routes can be thought from the origin to the destination, the process of FIG. 8 is repeatedly performed as many as the number of traveling routes.

Figure 9:
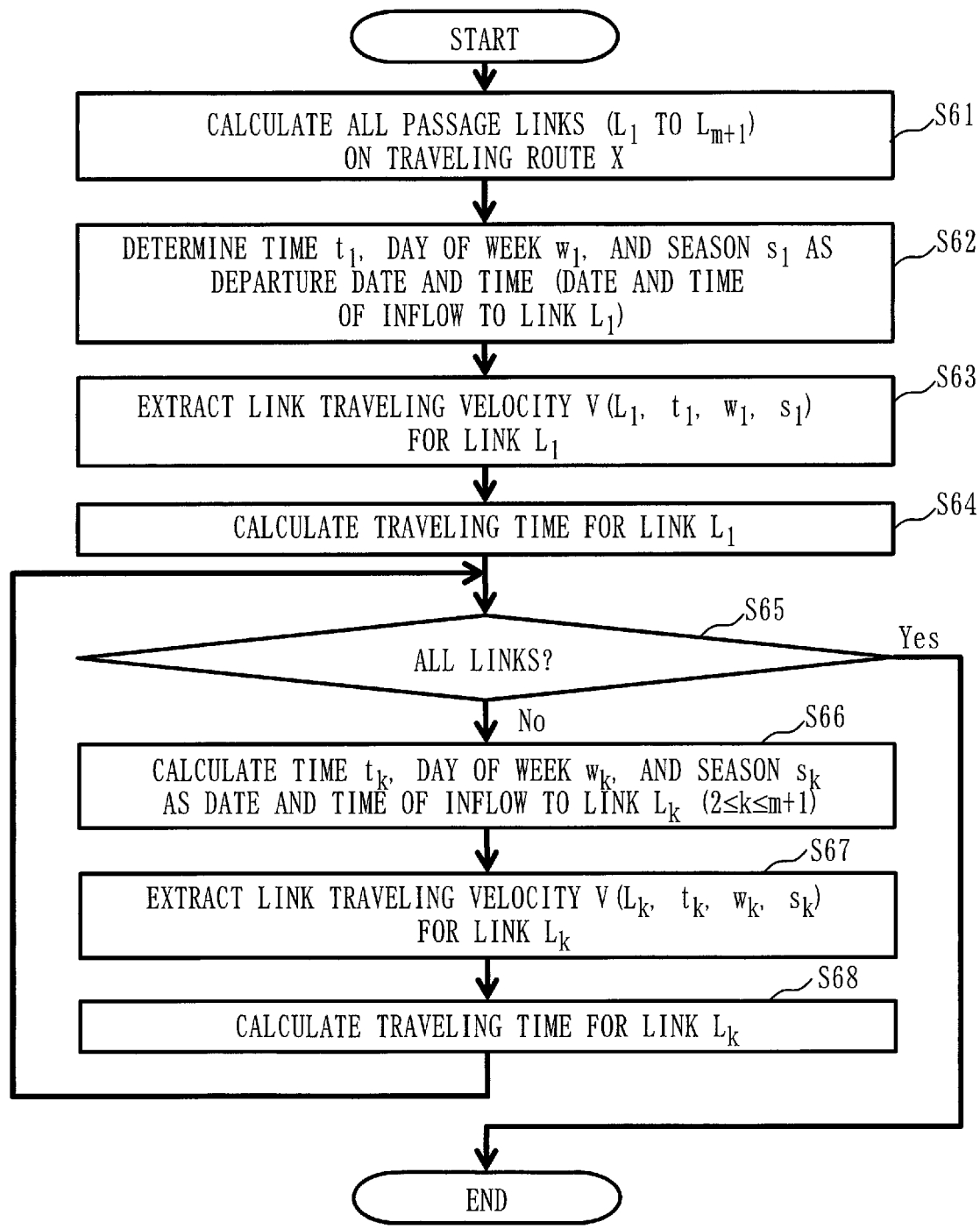
FIG. 9 is a flowchart of a traveling velocity extraction unit 242 according to Embodiment 1.

FIG. 9 is a flowchart of the traveling velocity extraction unit 242 according to the present embodiment. FIG. 9 illustrates details of the process at step S53 of FIG. 8.

At step S61, the traveling velocity extraction unit 242 calculates all links ($L_1$ to $L_{m+1}$) on the traveling route X calculated by the traveling route calculation unit 241. Here, in calculating all links on the traveling route, the traveling velocity extraction unit 242 performs extraction based on the cartographic information 450, and takes the links as $L_1$, $L_2, \ldots, L_{m+1}$ in the order of passing.

At step S62, the traveling velocity extraction unit 242 determines a time $t_1$, day of the week $w_1$, and season $s_1$, as a departure date and time in traveling the traveling route X, that is, a date and time of inflow to the link $L_1$ to be first traveled on the traveling route X. Here, when a date and time when the position information 121 is received (time $t_0$, day of the week $w_0$, season $s_0$) is taken as a date and time for estimation of traveling fuel efficiency of the motor vehicle, $t_1=t_0$, $w_1=w_0$, and $s_1=s_0$ hold. Also, any time and date ($t_\phi$, $w_\phi$, $s_\phi$) other than the date and time when the position information 121 is received is taken as a date and time for estimation of traveling fuel efficiency of the motor vehicle, $t_1=t_\phi$, $w_1=w_\phi$, and $s_1=s_\phi$ hold.

Next at step S63, the traveling velocity extraction unit 242 extracts, from the traveling velocity DB 253, a link traveling velocity $V(L_1, t_1, w_1, s_1)$ for the link $L_1$ at the time $t_1$, the day of the week $w_1$, and the season $s_1$.

At step S64, the traveling velocity extraction unit 242 calculates a traveling time $T_1$ in traveling on the link $L_1$. Here, when the link length of the link $L_1$ is taken as $X_1$, the traveling time $T_1$ for the link $L_1$ is calculated from the product of the link traveling velocity $V(L_1, t_1, w_1, s_1)$ and the link length $X_1$.

At step S65, the traveling velocity extraction unit 242 judges whether extraction of the link traveling velocity has been completed for all links. If extraction of the link traveling velocity has been completed for all links, the process ends. If there is a link for which extraction of the link traveling velocity has not been completed, the process proceeds to step S66.

At step S66, for a link $L_k$ ($2 \leq k \leq m+1$) for which extraction of the link traveling velocity has not been completed, the traveling velocity extraction unit 242 determines a time $t_k$, day of the week $w_k$, and season $s_k$ as a date and time of inflow to the link $L_k$. Here, calculation is performed based on the traveling time $T_{k-1}$ for the link $L_{k-1}$ calculated in the process at step S64 or step S68. The time $t_k$, the day of the week $w_k$, and the season $s_k$ are determined by taking a date and time passing from a time $t_{k-1}$, day of the week $w_{k-1}$, and season $s_{k-1}$, which are a date and time of inflow to the link $L_{k-1}$, by $T_{k-1}$ as a date and time of inflow to the link $L_k$.

Next at step S67, the traveling velocity extraction unit 242 extracts the link traveling velocity $V(L_k, t_k, w_k, s_k)$ for the link $L_k$ at the time $t_k$, the day of the week $w_k$, and the season $s_k$ from the traveling velocity DB 253.

At step S68, the traveling velocity extraction unit 242 calculates a traveling time $T_k$ in traveling on the link $L_k$. Here, when the link length of the link $L_k$ is $X_k$, the traveling time $T_k$ for the link $L_k$ is calculated from the product of the link traveling velocity $V(L_k, t_k, w_k, s_k)$ and the link length $X_k$. After the process at step S68 ends, the process returns to the process at step S65.

Figure 10:
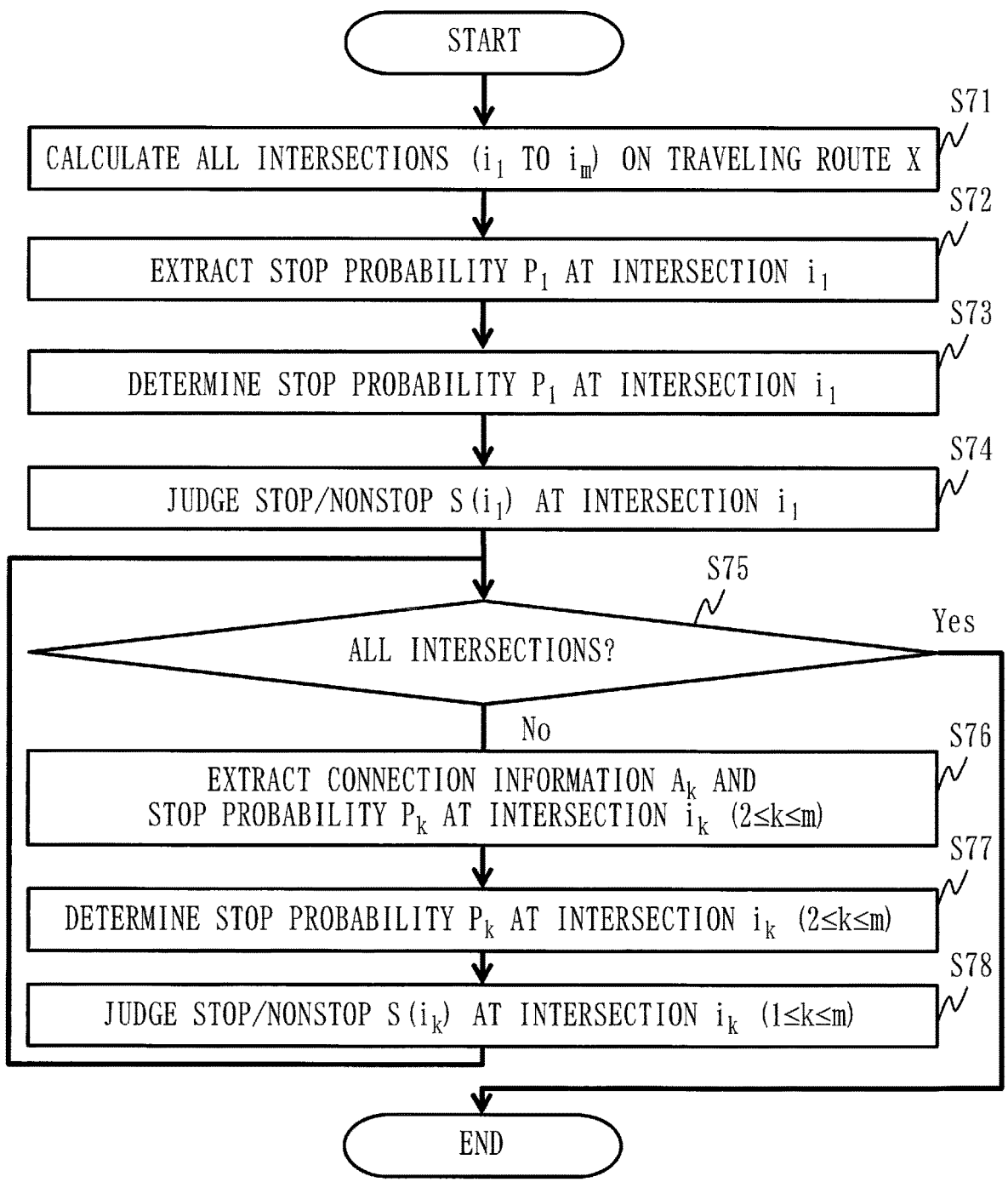
FIG. 10 is a flowchart of a stop judgment unit 243 according to Embodiment 1.

FIG. 10 is a flowchart of the stop judgment unit 243 according to the present embodiment. FIG. 10 illustrates details of the process of step S54 of FIG. 8.

At step S71, the stop judgment unit 243 calculates all intersections ($i_1$ to $i_m$) on the traveling route X calculated by the traveling route calculation unit 241. Here, in calculating all intersections on the traveling route, the stop judgment unit 243 performs extraction based on the cartographic information 450, and takes the intersections as $i_2, \ldots, i_m$ in the order of passing.

At step S72, the stop judgment unit 243 extracts a stop probability $P_1$ at the intersection $i_1$ to be passed first on the traveling route X from the stop probability DB 255. Here, the stop judgment unit 243 extracts, as the stop probability $P_1$, a stop probability at a passage date and time of passing the intersection $i_1$ from the stop probability DB 255. Here, as for the date and time of passing the intersection $i_1$, a time of inflow to the link $L_2$ calculated at the traveling velocity extraction unit 242 (time $t_2$, day of the week $w_2$, season $s_2$) is the date and time of passing the intersection $i_1$. That is, when the date and time of passing the intersection $i_1$ is a time $t'_1$, day of the week $w'_1$, and season $s'_1$, ($t'_1=t_2$, $w'_1=w_2$, $s'_1=s_2$) holds.

At step S73, the stop judgment unit 243 extracts a stop probability $P(i_1, t'_1, w'_1, s'_1)$ from the stop probability DB 255 as a stop probability at the intersection $i_1$, and determines it as a stop probability $P_1$ at the intersection $i_1$.

At step S74, the stop judgment unit 243 judges a stop/nonstop $S(i_1)$ of the intersection $i_1$. For the stop/nonstop $S(i_1)$ of the intersection $i_1$, a judgment is made by using $P_1$ as in the following expression (5).

FORMULA 5

$$S(i_1) = \begin{cases} \text{stop} & (P \mid P_1) \\ \text{pass} & (P \mid 1-P_1) \end{cases} \quad (P_1 = P(i_1, t'_1, w'_1, s'_1)) \tag{5}$$

At step S75, the stop judgment unit 243 judges whether stop judgments have been completed for all intersections. If stop judgments have been completed for all intersections, that is, when k=m, the process ends. On the other hand, if stop judgments have not been completed for all intersections, that is, when k<m, the process proceeds to step S76.

At step S76, the stop judgment unit 243 extracts connection information $A_k$ for an intersection $i_k$ ($2 \leq k \leq m$) from the connection DB 254, and extracts a stop probability $P_k$ at the intersection $i_k$ ($2 \leq k \leq m$) from the stop probability DB 255. The stop judgment unit 243 extracts the connection information and the stop probability at a passage date and time of passing the intersection $i_k$ from the storage unit 25, and takes them as the connection information $A_k$ and the stop probability $P_k$. The passage date and time of passing the intersection $i_k$ is a time of inflow to the link $L_{k+1}$ (time $t_{k+1}$, day of the week $w_{k+1}$, season $s_{k+1}$) calculated by the traveling velocity extraction unit 242. Therefore, when the passage date and time of the intersection $i_k$ is taken as time $t'_k$, day of the week $w'_k$, and season $s'_k$, ($t'_k=t_{k+1}$, $w'_k=w_{k+1}$, $s'_k=s_{k+1}$) holds.

At step S76, the stop judgment unit 243 extracts, as connection information for the intersection $i_k$, connection information $A(i_k, t'_k, w'_k, s'_k)$ from the connection DB 254, and takes it as connection information $A_k$ for the intersection $i_k$. Also, the stop judgment unit 243 extracts, as a stop probability at the intersection $i_k$, a stop probability $P(i_k, t'_k, w'_k, s'_k)$ from the stop probability DB 255, and takes it as a stop probability $P_k$ at the intersection $i_k$.

At step S77, the stop judgment unit 243 determines the stop probability $P_k$ at the intersection $i_k$ ($2 \leq k \leq m$). First, the stop judgment unit 243 calculates a stop probability $P'(i_k)$ in consideration of the connection information for the intersection $i_k$ and an intersection $i_{k-1}$. Here, to calculate the stop probability $P'(i_k)$ in consideration of the connection information for the intersection $i_k$ and the intersection $i_{k-1}$, the connection information $A(i_k, t'_k, w'_k, s'_k)$ for the intersection $i_k$ and the stop probability $P(i_k, t'_k, w'_k, s'_k)$ at the intersection $i_k$ extracted at step S76 and a stop probability $P_{k-1}$ at the intersection $i_{k-1}$ calculated in a previous process are used to perform calculation as in an expression (6).

FORMULA 6

$$P_k = A(i_k, t'_k, w'_k, s'_k) \begin{pmatrix} P(i_k, t'_k, w'_k, s') \\ \vdots \\ 0 \\ \vdots \\ P_{k-1} \\ \vdots \\ 0 \end{pmatrix} + \left\{ 1 - A(i_k, t'_k, w'_k, s'_k) \begin{pmatrix} 0 \\ \vdots \\ 0 \\ \vdots \\ 1 \\ \vdots \\ 0 \end{pmatrix} \right\} P(i_k, t'_k, w'_k, s') \quad (6)$$

In the expression (6), if the intersection $i_k$ and the intersection are connectively operated, the stop probability $P_k$ is a sum of $P_{k-1}$ and $P(i_k, t'_k, w'_k, s'_k)$ in consideration of connection with the intersection $i_{k-1}$. If the intersection $i_k$ and the intersection $i_{k-1}$ are not connectively operated, the result is acquired such that the stop probability $P_k$ is still $P(i_k, t'_k, w'_k, s'_k)$.

At step S78, the stop judgment unit 243 judges a stop/nonstop $S(i_k)$ for the intersection $i_k$. The stop judgment unit 243 uses the stop probability $P_k$ in consideration of the connection information calculated by the expression (6) to judge the stop/nonstop $S(i_k)$ for the intersection $i_k$ as in the expression (7).

FORMULA 7

$$S(i_k) = \begin{cases} \text{stop} & (P \mid P_k) \\ \text{pass} & (P \mid 1 - P_k) \end{cases} \quad (7)$$

After the process at step S78 ends, the process returns to step S75.

Figure 11:
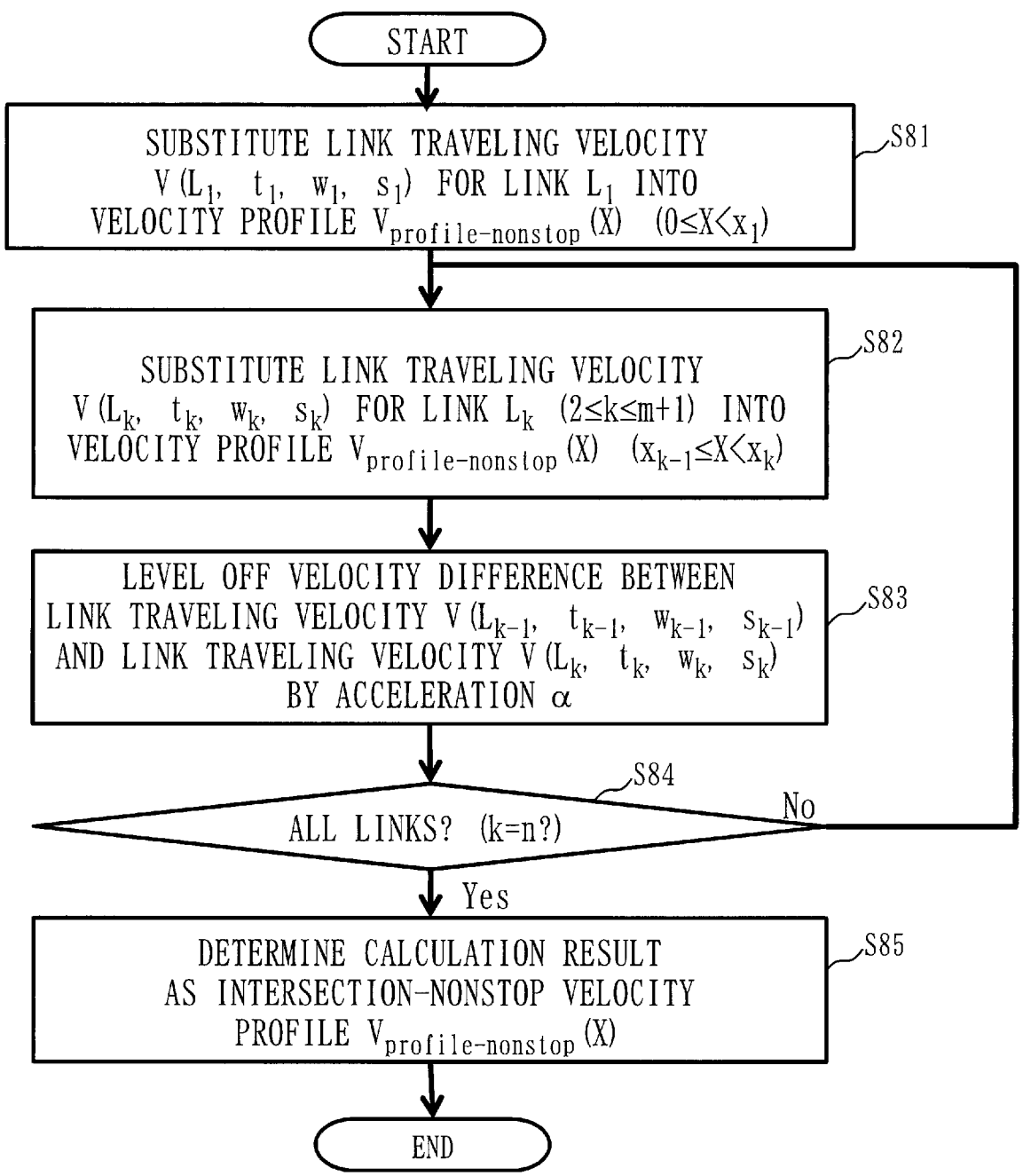
FIG. 11 is a flowchart of a velocity profile generation unit 244 according to Embodiment 1.

FIG. 11 is a flowchart of the velocity profile generation unit 244 according to the present embodiment. FIG. 11 illustrates details of the process at step S55 of FIG. 8.

At step S81, the velocity profile generation unit 244 substitutes the link traveling velocity $V(L_1, t_1, w_1, s_1)$ for the link $L_1$ into the velocity profile $V_{profile-nonstop}(X)$ corresponding to $0 \leq X < x_1$. Here, $x_1$ indicates a cumulative value of the traveling distance to the link $L_1$, that is, $x_1 = X_1$.

Next at step S82, the velocity profile generation unit 244 substitutes the link traveling velocity $V(L_k, t_k, w_k, s_k)$ for the link $L_k$ ($2 \leq k \leq m+1$) into the velocity profile $V_{profile-nonstop}(X)$ corresponding to $x_{k-1} \leq X < x_k$. Here, $x_k$ indicates a cumulative value of the traveling distance to the link $L_k$, that is, $x_k = X_1 + X_2 + \ldots + X_k$.

Next at step S83, the velocity profile generation unit 244 performs process of levelling off a velocity difference between the link traveling velocity $V(L_{k-1}, t_{k-1}, w_{k-1}, s_{k-1})$ and the link traveling velocity $V(L_k, t_k, w_k, s_k)$ occurring at a position $x_{k-1}$ from the starting position of the traveling route X, that is, $V_{profile-nonstop}(x_{k-1})$, by an acceleration $\alpha$. Here, the acceleration $\alpha$ is set in advance by an administrator of the fuel efficiency estimation device 200. In setting the acceleration $\alpha$, setting is appropriately performed in consideration of a general change in acceleration/deceleration at the time of motor-vehicle traveling.

Next at step S84, the velocity profile generation unit 244 judges whether substitutions of the link traveling velocity into the velocity profile $V_{profile-nonstop}(X)$ have been completed for all links. If the processes for all links have been completed, the process proceeds to step S85. If the processes for all links have not been completed, the process returns to step S82.

When judging that the processes for all links have been completed in the process at step S84, the velocity profile generation unit 244 determines the velocity profile $V_{profile-nonstop}(X)$ as an intersection-nonstop velocity profile at step S85.

The processes from step S81 to step S85 are organized as in an expression (8).

FORMULA 8

$$V_{profile-nonstop}(X) = \begin{cases} V(L_1, t_1, w_1, s_1) & (0 \leq X < x_1) \\ V(L_2, t_2, w_2, s_2) & (x_1 \leq X < x_2) \\ \vdots \\ V(L_n, t_n, w_n, s_n) & (x_{n-1} \leq X \leq x_n) \end{cases} \quad (8)$$

Figure 12:
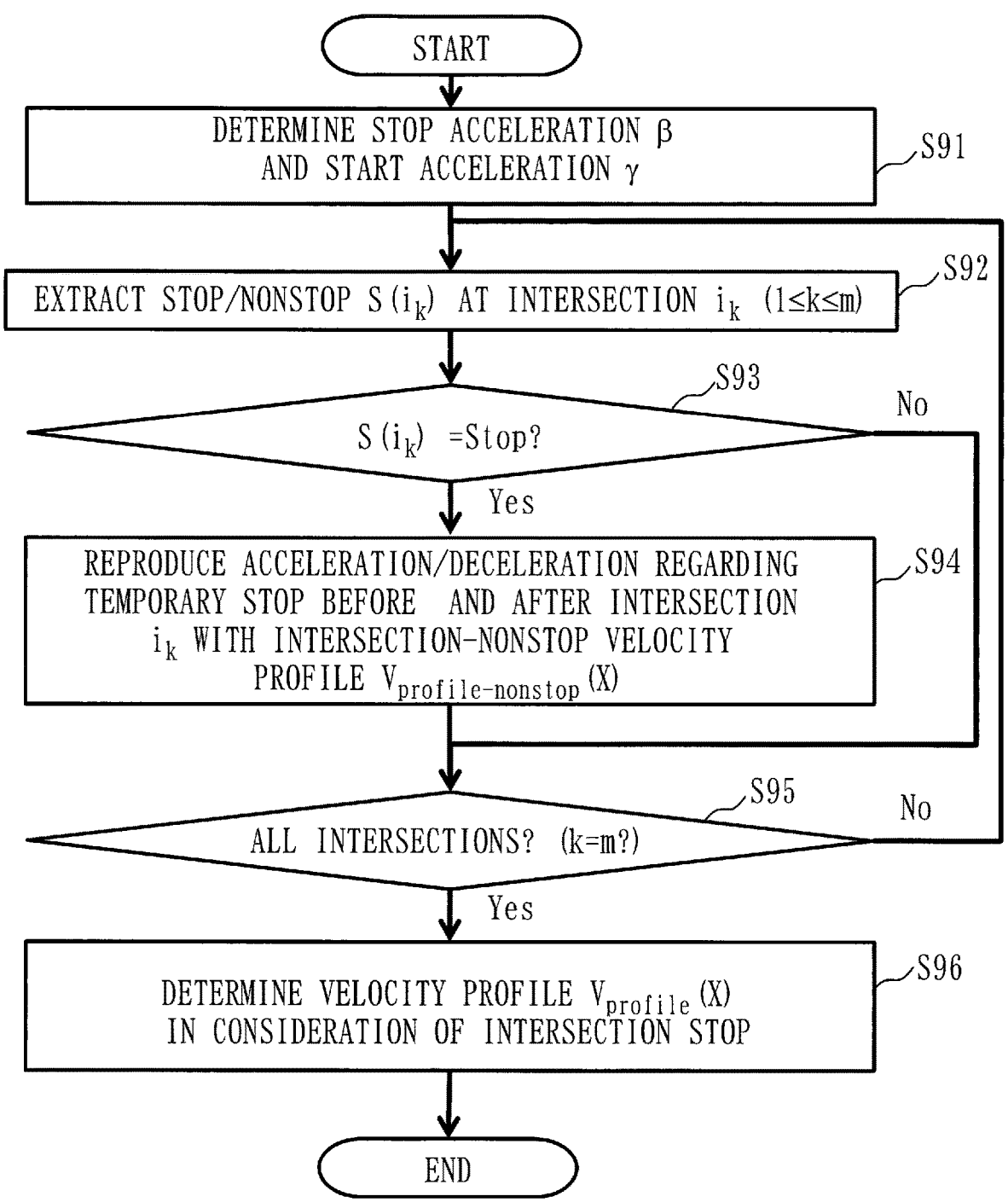
FIG. 12 is a flowchart of a velocity correction unit 245 according to Embodiment 1.

FIG. 12 is a flowchart of the velocity correction unit 245 according to the present embodiment. FIG. 12 illustrates details of the process at step S56 of FIG. 8.

First at step S91, the velocity correction unit 245 determines an acceleration $\beta$ for stopping and an acceleration $\gamma$ for starting moving at intersection stop. Here, in determining the acceleration $\beta$ and the acceleration $\gamma$, they are appropriately set in consideration of a change in acceleration/deceleration for a general stop and start at the time of motor-vehicle traveling.

Next at step S92, the velocity correction unit 245 extracts a stop/nonstop $S(i_k)$ at the intersection $i_k$ ($1 \leq k \leq m$).

Next at step S93, in traveling the traveling route X, the velocity correction unit 245 judges whether the motor vehicle stops at the intersection $i_k$ based on the stop/nonstop $S(i_k)$. When a stop is made at the intersection $i_k$ ($S(i_k)$=Stop), the process proceeds to step S94. On the other hand, when a stop is not made at the intersection $i_k$ ($S(i_k)$=Pass), the process proceeds to step S95.

At step S94, when a stop is made at the intersection $i_k$, the velocity correction unit 245 reproduces acceleration/deceleration regarding a temporary stop before and after the intersection $i_k$ with the intersection-nonstop velocity profile $V_{profile-nonstop}(X)$. As reproduction of acceleration/deceleration, the velocity correction unit 245 calculates a change in velocity based on the stop acceleration β and the start acceleration γ determined at step S91 so that the velocity becomes 0 at a position of the intersection $i_k$. $V_{profile-nonstop}(X)$ is overwritten with the calculation result.

Next at step S95, the velocity correction unit 245 judges whether judgments regarding intersection stop/nonstop and acceleration/deceleration reproduction regarding intersection stop have been completed for all intersections. If the processes for all intersections have been completed, the process proceeds to step S96. If the processes for all intersections have not been completed, the process returns to step S92.

If the processes for all intersections have been completed, at step S96, the velocity correction unit 245 determines $V_{profile-nonstop}(X)$ overwritten with the result of acceleration/deceleration reproduction based on intersection stop/nonstop as the velocity profile $V_{profile}(X)$ in consideration of intersection stop.

Figure 13:
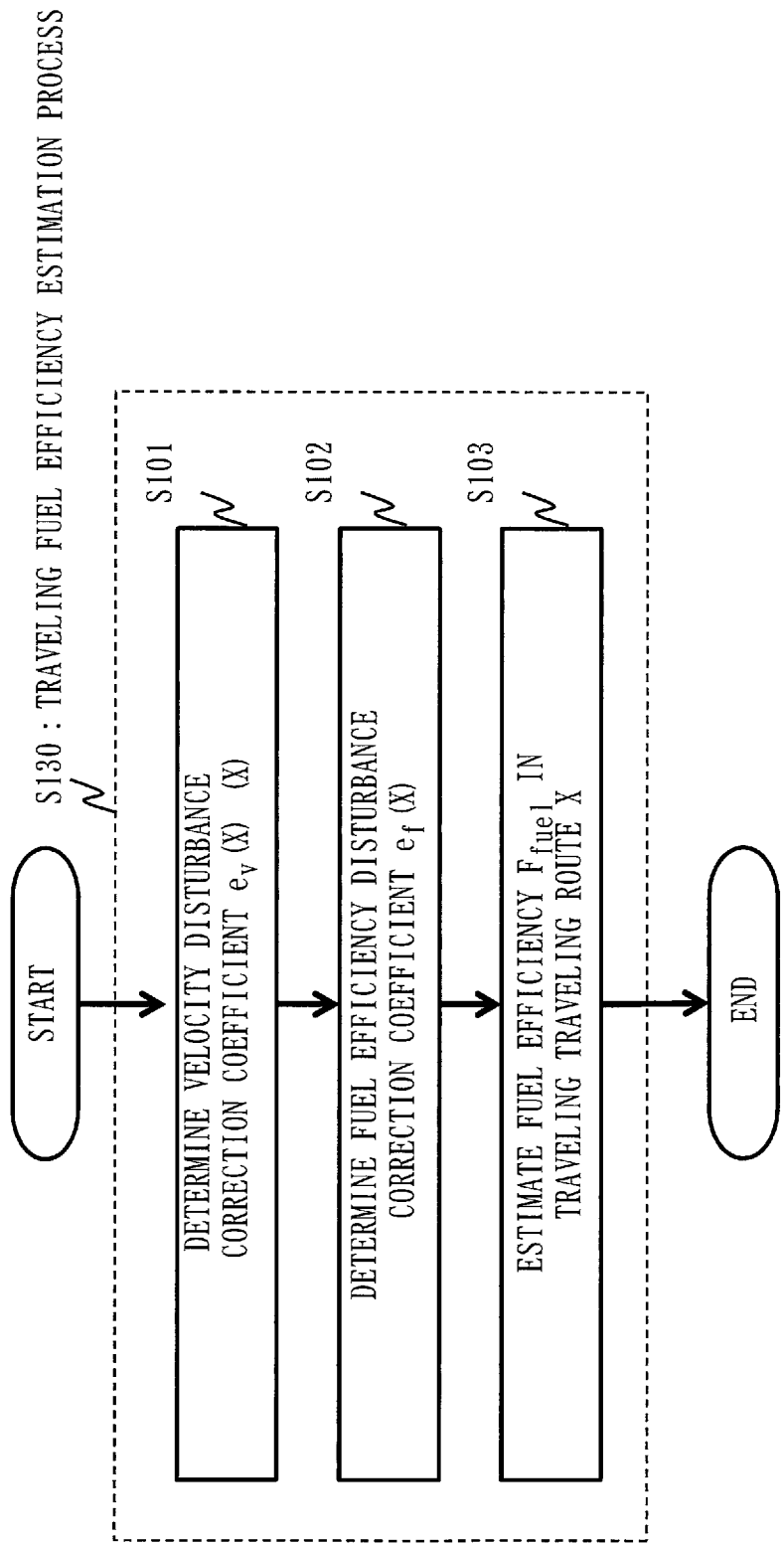
FIG. 13 is a flowchart of a traveling fuel efficiency estimation process S130 by a traveling fuel efficiency estimation unit 26 of the fuel efficiency estimation device 200 according to Embodiment 1.

FIG. 13 is a flowchart of a traveling fuel efficiency estimation process S130 by the traveling fuel efficiency estimation unit 26 of the fuel efficiency estimation device 200 according to the present embodiment.

At step S101, the velocity correction determination unit 261 determines a velocity disturbance correction coefficient $e_v(X)$ in traveling the traveling route X. The velocity disturbance correction coefficient is determined by a velocity $e_{traffic}$ determined by the road congestion information b and the event information c for each link. When the road congestion information is $b_k$ and the event information is $c_k$ for the link $L_k$ (1≤k≤n) at the time of traveling the traveling route X, the velocity disturbance correction coefficient $e_v(X)$ is as in an expression (9).

FORMULA 9

$$e_v(X) = \begin{cases} e_{traffic}(L_1, b_1, c_1) & (0 \le X < x_1) \\ e_{traffic}(L_2, b_2, c_2) & (x_1 \le X < x_2) \\ \vdots \\ e_{traffic}(L_n, b_n, c_n) & (x_{n-1} \le X \le x_n) \end{cases} \quad (9)$$

Next at step S102, the fuel efficiency correction determination unit 262 determines a fuel efficiency disturbance correction coefficient $e_f(X)$ in traveling the traveling route X. The fuel efficiency disturbance correction coefficient is determined by a fuel efficiency disturbance correction coefficient $e_{weather}$ determined by the weather information d and the warning alert information g at the calculation date and time for each link. When the weather information is $d_k$ and the warning alert information is $g_k$ for the link $L_k$ (1≤k≤n) at the time of traveling the traveling route X, the fuel efficiency disturbance correction coefficient $e_f(X)$ is as in an expression (10).

FORMULA 10

$$e_f(X) = \begin{cases} e_{weather}(L_1, d_1, g_1) & (0 \le X < x_1) \\ e_{weather}(L_2, d_2, g_2) & (x_1 \le X < x_2) \\ \vdots \\ e_{weather}(L_n, d_n, g_n) & (x_{n-1} \le X \le x_n) \end{cases} \quad (10)$$

Lastly at step S103, the fuel efficiency calculation unit 263 estimates a traveling fuel efficiency $F_{fuel}$ of the motor vehicle in traveling the traveling route X based on the velocity profile $V_{profile}(X)$ in consideration of intersection stop, the velocity disturbance correction coefficient $e_v(X)$, and the fuel efficiency disturbance correction coefficient $e_f(X)$. Here, when a relational expression of the traveling fuel efficiency $F_{fuel}$ of the motor vehicle and the traveling velocity (velocity profile $V_{profile}$) is represented by $f_{fuel}(V)$, the fuel efficiency $F_{fuel}$ can be found as in an expression (11).

FORMULA 11

$$F_{fuel} = \int_X f_{fuel}(V_{profile}(X) \cdot e_v(X)) \cdot e_f(X) dX \quad (11)$$

The fuel efficiency calculation unit 263 outputs the calculated fuel efficiency $F_{fuel}$ as the fuel efficiency estimation result 461 to the information transmission unit 22. The information transmission unit 22 transmits the fuel efficiency estimation result 461 to the motor vehicle device 100 mounted on the motor vehicle 1.

By performing the above processes, regarding estimation of motor-vehicle traveling fuel efficiency, motor-vehicle traveling fuel efficiency estimation with high accuracy can be achieved also in consideration of disturbance influences such as road congestion and weather.

\*\*\*Other Structures\*\*\*

Also in the present embodiment, each function of the motor vehicle device 100 and the fuel efficiency estimation device 200 is implemented by software. As a modification example, each function of the motor vehicle device 100 and the fuel efficiency estimation device 200 may be implemented by hardware.

Figure 14:
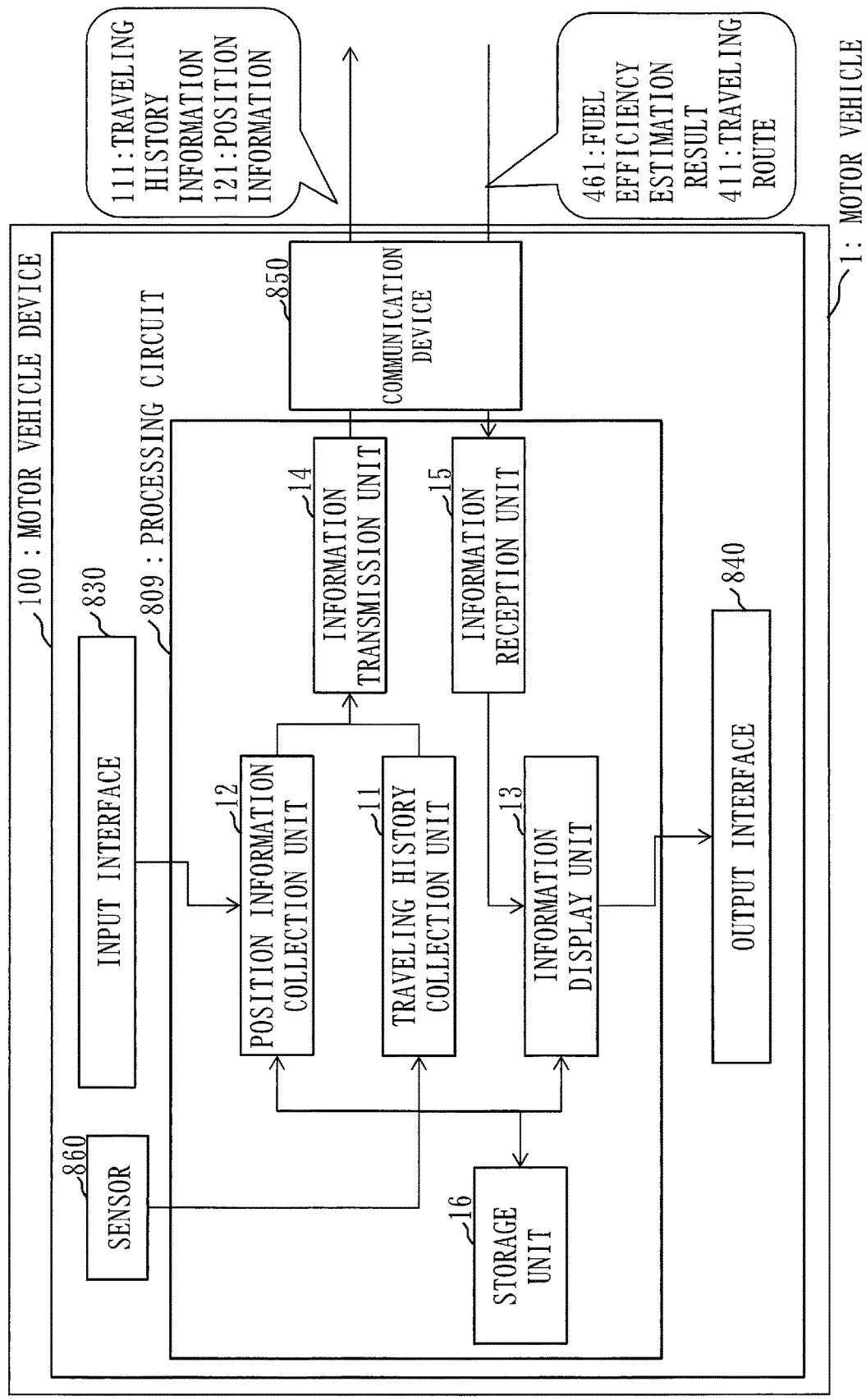
FIG. 14 illustrates a structure of the motor vehicle device 100 according to a modification example of Embodiment 1.

FIG. 14 illustrates a structure of the motor vehicle device 100 according to a modification example of the present embodiment. Also, FIG. 15 illustrates a structure of the fuel efficiency estimation device 200 according to a modification example of the present embodiment.

Figure 15:
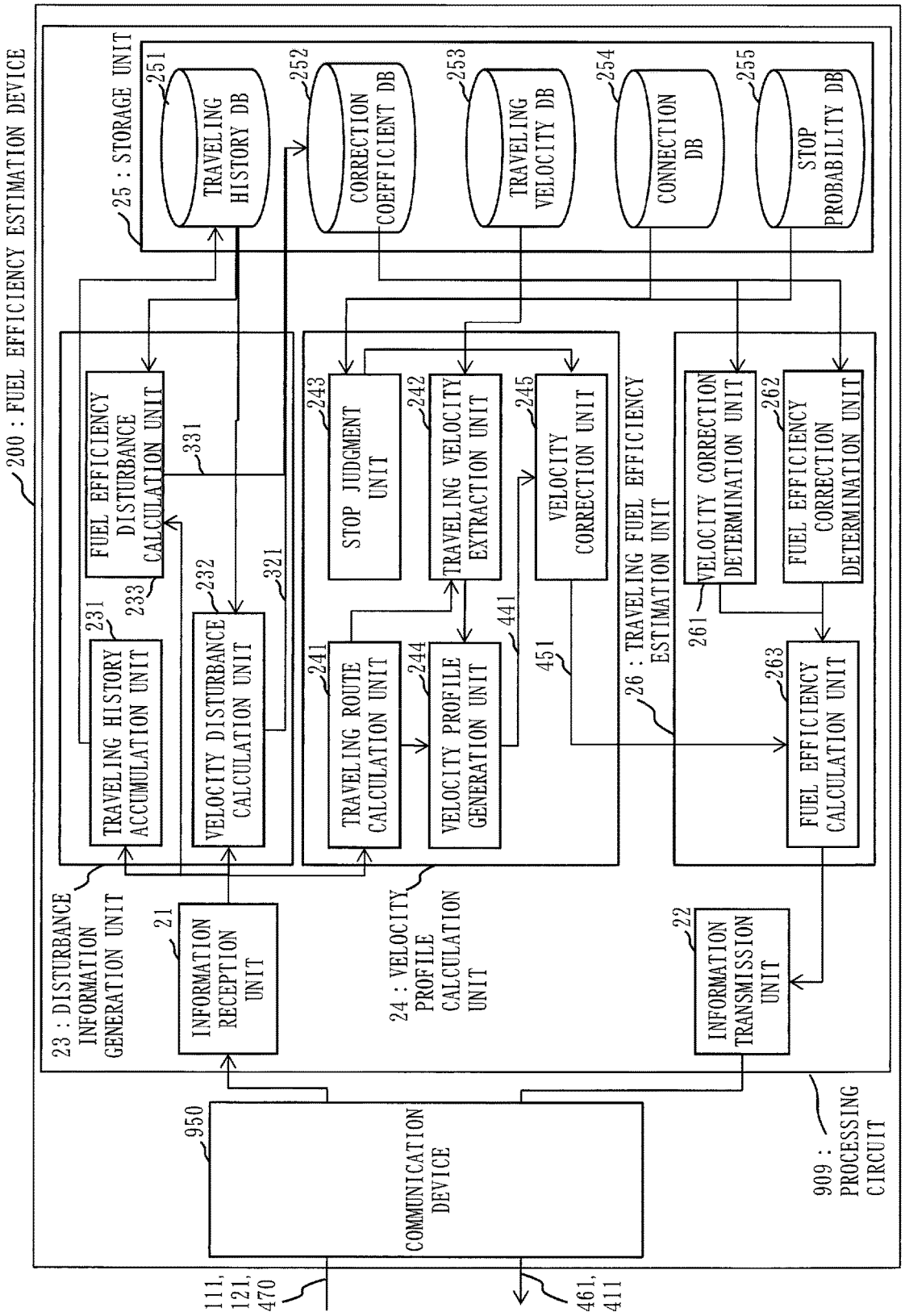
FIG. 15 illustrates a structure of a fuel efficiency estimation device 200 according to a modification example of Embodiment 1.

As illustrated in FIG. 14 and FIG. 15, each of the motor vehicle device 100 and the fuel efficiency estimation device 200 includes hardware such as processing circuit 809, 909, the input interface 830, the output interface 840, and the communication device 850, 950.

The processing circuit 809, 909 is a dedicated electronic circuit for achieving the functions of the "units" and the storage unit described above. The processing circuit 809, 909 is specifically a single circuit, composite circuit, programmed processor, parallel programmed processor, logic IC, GA (Gate Array), ASIC (Application Specific Integrated Circuit), or FPGA (Field-Programmable Gate Array).

Each of the motor vehicle device 100 and the fuel efficiency estimation device 200 may include a plurality of processing circuits replacing the processing circuit 809, 909. The plurality of these processing circuits achieve the functions of the "units" as a whole. Each of these processing circuits is a dedicated electronic circuit, like the processing circuit 809, 909.

As another modification example, each function of the motor vehicle device 100 and the fuel efficiency estimation device 200 may be implemented by a combination of software and hardware. That is, part of the functions of each of the motor vehicle device 100 and the fuel efficiency estimation device 200 may be implemented by dedicated hardware, and the remaining functions may be implemented by software.

The processor 810, 910, the storage device 820, 920, and the processing circuit 809, 909 are collectively referred to as "processing circuitry". That is, if the structure of each of the motor vehicle device 100 and the fuel efficiency estimation device 200 is any of those illustrated in FIGS. 2, 3, 14, and 15, the functions of the "units" and the storage unit are achieved by the processing circuitry.

The "units" may be read as "steps", "procedures", or "processes". Also, the functions of the "units" may be achieved by firmware.

Description of Effects of Present Embodiment

As described above, the fuel efficiency estimation system 500 according to the present embodiment includes the disturbance information generation unit which calculates a disturbance influence derived from road congestion, event, weather, and warning and alert for each road link as a correction coefficient. Also, the fuel efficiency estimation system 500 includes the traveling fuel efficiency estimation unit which calculates a velocity profile indicating a situation of a change in velocity at the time of traveling in consideration of intersection stop for a specific traveling route and then estimates traveling fuel efficiency corrected in consideration of the disturbance influence.

Also, as for calculation of disturbance correction coefficients, the fuel efficiency estimation system 500 according to the present embodiment takes s statistical value of s traveling velocity attenuation factor calculated based on the traveling history information, the congestion information, and the event information as road congestion and event disturbance, and uses them for disturbance correction of a velocity profile for use in calculation of traveling fuel efficiency. This allows an improvement in fuel efficiency estimation accuracy.

Furthermore, the fuel efficiency estimation system 500 according to the present embodiment takes s statistical value of traveling fuel efficiency deterioration ratio calculated based on the traveling history information, the weather information, and the warning alert information as weather disturbance, and uses this for disturbance correction of a relational expression between the traveling velocity and traveling fuel efficiency, thereby allowing an improvement in fuel efficiency estimation accuracy.

Still further, the fuel efficiency estimation system 500 according to the present embodiment divides the traveling history information by type of each piece of disturbance information for statistical process, thereby allowing an improvement in fuel efficiency estimation accuracy appropriately in consideration of the disturbance influence in accordance with the condition at the time of traveling of the motor vehicle.

Still further, the fuel efficiency estimation system 500 according to the present embodiment divides processes for velocity profile generation and fuel efficiency estimation and performs disturbance correction only in fuel efficiency estimation, thereby allowing an improvement in fuel efficiency estimation accuracy without influencing velocity profile generation process.

As described above, the fuel efficiency estimation system 500 according to the present embodiment can represent a disturbance influence on the traveling route by a ratio such as a traveling velocity attenuation factor or a fuel efficiency deterioration ratio. Thus, differences in the degree of disturbance influence due to the vehicle type and a detailed geographic influence can be absorbed, and information collected from all motor vehicles traveling the traveling route can be similarly handled for statistical process.

By performing the above processes, regarding estimation of motor-vehicle traveling fuel efficiency, the estimation of motor-vehicle traveling fuel efficiency with high accuracy can be achieved also in consideration of disturbance influences such as road congestion and weather. Also, the fuel efficiency estimation system 500 reflects the geographic features of the road onto statistical information to reduce the process load regarding fuel efficiency calculation. Furthermore, by correcting fuel efficiency calculation by statistical information based on previous traveling history, the estimation of the motor-vehicle traveling fuel efficiency is achieved with high accuracy.

Embodiment 2

In the present embodiment, differences from Embodiment 1 are mainly described.

In the present embodiment, a structure similar to the structure described in Embodiment 1 is provided with a same reference character, and its description is omitted.

\*\*\*Description of Structure\*\*\*

The fuel efficiency estimation system 500 according to Embodiment 1 includes the motor vehicle device 100 mounted on the motor vehicle 1 and the fuel efficiency estimation device 200 implemented by a central server in the cloud or the like. The motor vehicle device 100 collects the traveling history information 111, and requests the fuel efficiency estimation device 200 to calculate traveling fuel efficiency in a traveling route of the motor vehicle 1. The fuel efficiency estimation device 200 calculates a disturbance correction coefficient, generates a velocity profile for the traveling route, and calculates traveling fuel efficiency of the motor vehicle 1 on the traveling route in consideration of the disturbance correction coefficient.

In the present embodiment, a fuel efficiency estimation system 500a is described which generates a velocity profile of the traveling route for each motor vehicle and estimates traveling fuel efficiency of the motor vehicle 1a in the traveling route in consideration of the velocity disturbance correction coefficient and the fuel efficiency disturbance correction coefficient.

Figure 16:
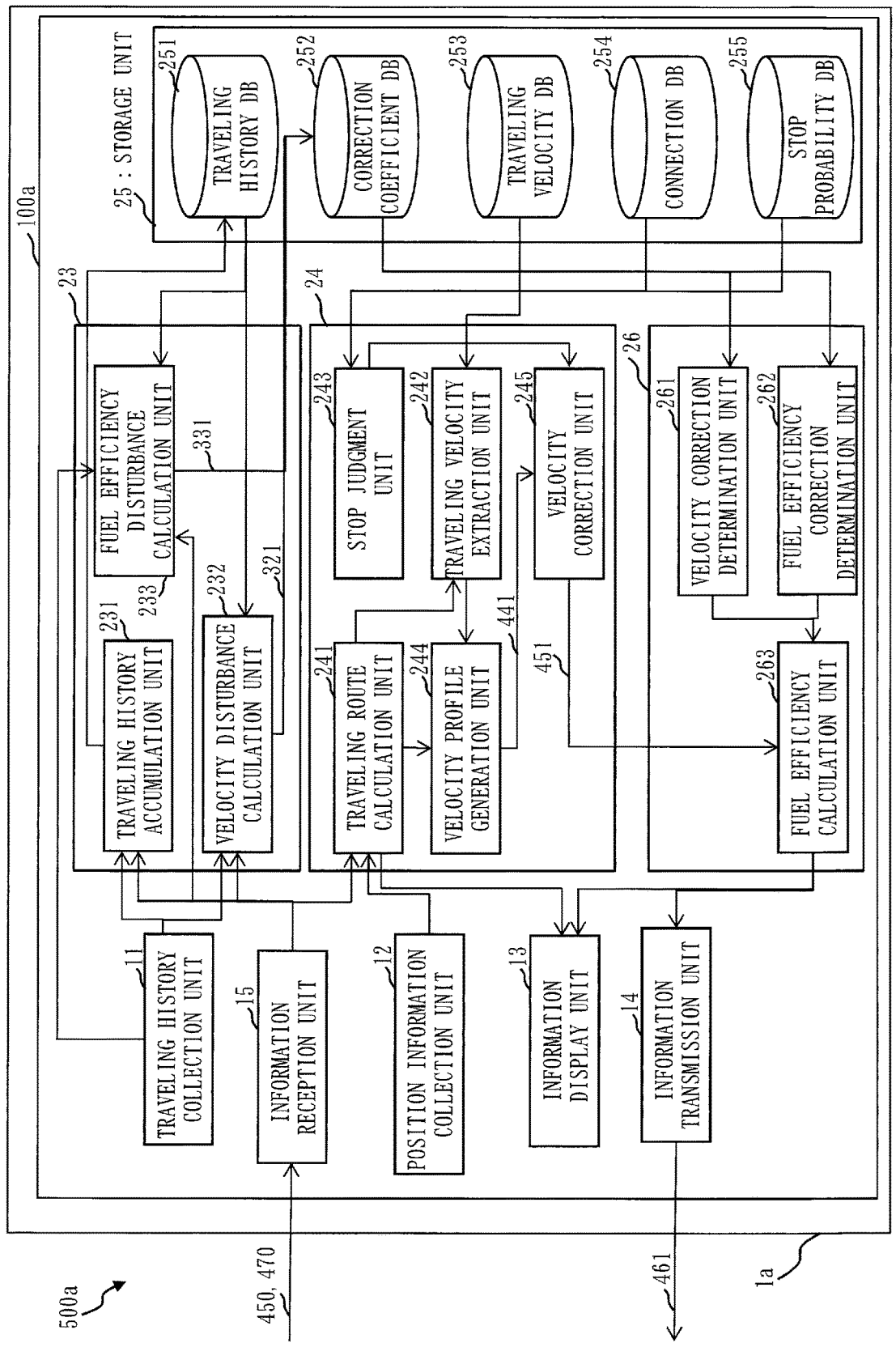
FIG. 16 illustrates a functional structure of a fuel efficiency estimation system 500a according to Embodiment 2.
Figure 17:
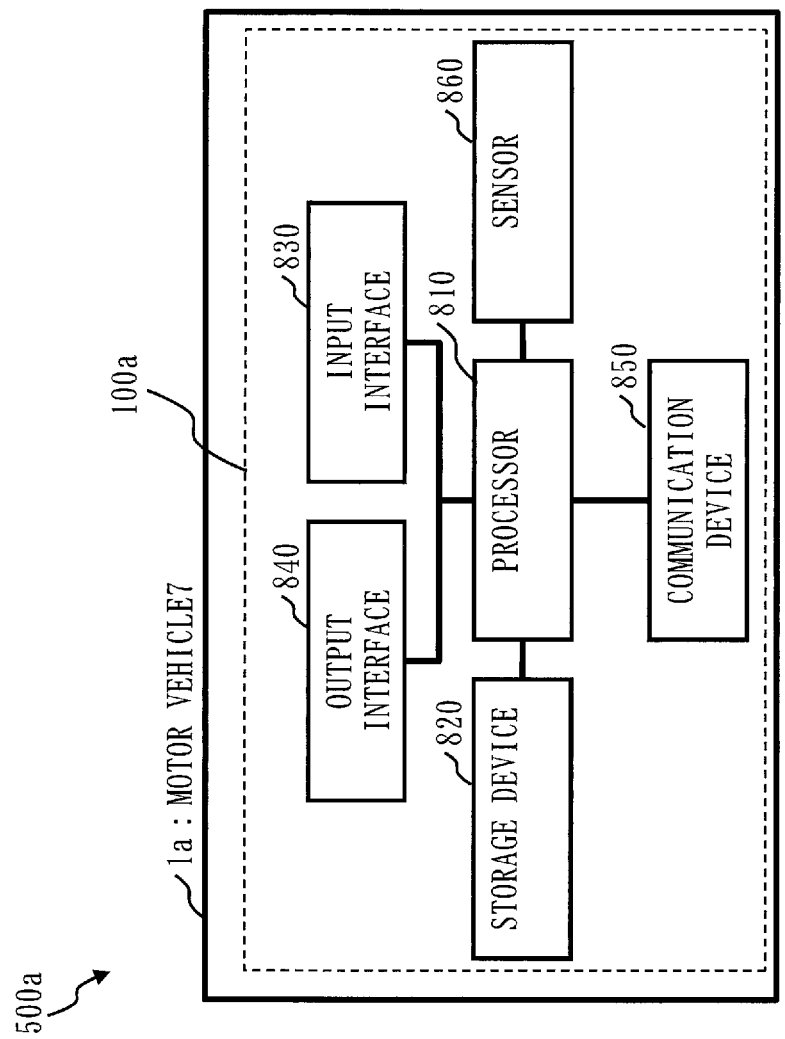
FIG. 17 illustrates a hardware structure of the fuel efficiency estimation system 500a according to Embodiment 2.

FIG. 16 illustrates a functional structure of the fuel efficiency estimation system 500a according to the present embodiment. Also, FIG. 17 illustrates a hardware structure of the fuel efficiency estimation system 500a according to the present embodiment.

In the present embodiment, the functional structure diagram and the hardware structure diagram of the fuel efficiency estimation system 500a are described as separate diagrams. However, a structure similar to the structure described in Embodiment 1 is provided with a same reference character and its description may be omitted.

The fuel efficiency estimation system 500a according to the present embodiment is configured only of a motor vehicle device 100a mounted on a motor vehicle 1a.

The motor vehicle device 100a of the motor vehicle 1a includes, as functional structures, the traveling history collection unit 11, the position information collection unit 12, the information display unit 13, the information transmission unit 14, the information reception unit 15, the disturbance information generation unit 23, the velocity profile calculation unit 24, and the traveling fuel efficiency estimation unit 26.

The functional structure of each of the traveling history collection unit 11, the position information collection unit 12, the information display unit 13, the information transmission unit 14, and the information reception unit 15 is similar to the functional structure of the motor vehicle device 100 of Embodiment 1.

Also, the functional structure of each of the disturbance information generation unit 23, the velocity profile calculation unit 24, and the traveling fuel efficiency estimation unit 26 is similar to the functional structure of the fuel efficiency estimation device 200 described in Embodiment 1.

*Description of Functional Structure*

Next, in the respective functional structures of the motor vehicle device 100a of the motor vehicle 1a, differences from Embodiment 1 are described.

The traveling history collection unit 11 outputs the traveling history information 111 collected by using the sensor 860 directly to the traveling history accumulation unit 231, the velocity disturbance calculation unit 232, and the fuel efficiency disturbance calculation unit 233. The traveling history accumulation unit 231, the velocity disturbance calculation unit 232, and the fuel efficiency disturbance calculation unit 233 each directly acquire the traveling history information 111 from the traveling history collection unit 11.

The position information collection unit 12 outputs the position information 121 inputted via the input interface 830 directly to the traveling route calculation unit 241 of the velocity profile calculation unit 24. The traveling route calculation unit 241 directly acquires the position information 121 from the position information collection unit 12.

As described above, the motor vehicle 1a has the functional structure of the motor vehicle device 100 and the functional structure of the fuel efficiency estimation device 200 described in Embodiment 1. The traveling history collection unit 11, the position information collection unit 12, the information display unit 13, the information transmission unit 14, and the information reception unit 15 correspond to the functions of the motor vehicle device 100. Also, the disturbance information generation unit 23, the velocity profile calculation unit 24, the traveling fuel efficiency estimation unit 26, and the storage unit 25 correspond to the functional structure of the fuel efficiency estimation device 200.

Note that the functions of the information reception unit 21 and the information transmission unit 22 of the fuel efficiency estimation device 200 described in Embodiment 1 are assumed to be included in the functions of the information transmission unit 14 and the information reception unit 15 of the motor vehicle device 100a described above. Also, the function of the storage unit 16 of the motor vehicle device 100 described in Embodiment 1 is assumed to be included in the function of the storage unit 25 of the motor vehicle device 100a described above.

Next, as for the hardware structure of the motor vehicle device 100a of the motor vehicle 1a configuring the fuel efficiency estimation system 500a, differences from Embodiment 1 are described.

The processor 810 performs processes of the motor vehicle device 100a, such as an instruction for displaying various types of information to be displayed on the display, a process of collecting the traveling history information 111 and the position information 121, a process of accumulating the traveling history information 111, a process of calculating a velocity disturbance correction coefficient and a fuel efficiency disturbance correction coefficient, a process of calculating a velocity profile, and a process of estimating traveling fuel efficiency.

Also, the storage device 820 achieves the functions of the storage unit 16 and the storage unit 25 described in Embodiment 1.

Furthermore, the communication device 850 achieves the functions of the information transmission unit 14 and the information reception unit 15 and the functions of the information transmission unit 22 and the information reception unit 21 described in Embodiment 1.

Next, operation is described.

Embodiment 2 is different from Embodiment 1 in that the disturbance information generation unit 23, velocity profile calculation unit 24, and the traveling fuel efficiency estimation unit 26 are mounted on the motor vehicle 1a. However, as for the operation of each unit, the disturbance information generation unit 23, the velocity profile calculation unit 24, and the traveling fuel efficiency estimation unit 26 in Embodiment 1 and the disturbance information generation unit 23, the velocity profile calculation unit 24, and the traveling fuel efficiency estimation unit 26 in Embodiment 2 perform similar operations. Detailed inner operations are also similar, and therefore description of operation is omitted.

*Other Structures*

In the present embodiment, the motor vehicle device 100a having the functions of the motor vehicle device 100 and the functions of the fuel efficiency estimation device 200 described in Embodiment 1 is mounted on the motor vehicle 1a. Here, while description has been made to the case in which the motor vehicle device 100a is a single computer in FIG. 16, the structure is not limited to the structure of FIG. 16. For example, the functions corresponding to the motor vehicle device 100 and the functions corresponding to the fuel efficiency estimation device 200 may be mounted on separate vehicle-mounted devices. Also, units included in the functions corresponding to the motor vehicle device 100 and the functions corresponding to the fuel efficiency estimation device 200 may be combined in any manner and be mounted on a plurality of vehicle-mounted devices.

Description of Effects According to Present Embodiment

As described above, according to the fuel efficiency estimation system 500a of the present embodiment, the traveling history information is accumulated for each motor vehicle, a disturbance correction coefficient is calculated for each motor vehicle, a velocity profile is calculated for each motor vehicle, and traveling fuel efficiency is estimated for each motor vehicle. Therefore, it is possible to estimate traveling fuel efficiency with high accuracy for each motor vehicle.

Embodiment 3

In the present embodiment, differences from Embodiments 1 and 2 are mainly described.

In the present embodiment, a structure similar to the structure described in Embodiments 1 and 2 is provided with a same reference character and its description is omitted.

*Description of Structure*

In the fuel efficiency estimation system 500 according to Embodiment 1, the process of collecting and transmitting the traveling history information and the process of collecting and transmitting the position information are performed at the motor vehicle device 100. Also, the traveling history accumulation process, the disturbance information generation process, the velocity profile calculation process, and the traveling fuel efficiency estimation process are performed at the fuel efficiency estimation device 200 as a central server. Furthermore, in the fuel efficiency estimation system 500a according to Embodiment 2, the process of the motor vehicle device 100 and the process of the fuel efficiency estimation device 200 in Embodiment 1 are all converged into the motor vehicle device 100a of the motor vehicle 1a.

In the present embodiment, for process load distribution, a structure is taken in which separate servers are prepared for the traveling history accumulation process, the disturbance information generation process, and the fuel efficiency calculation process including the velocity profile calculation process and the traveling fuel efficiency estimation process, respectively, among the processes of the fuel efficiency estimation device 200 for performing the processes. This allows a reduction in the amount of processing at each server, thereby making it possible to increase the processing speed. Note that the processes to be performed on a motor vehicle side are identical to those of Embodiment 1.

Figure 18:
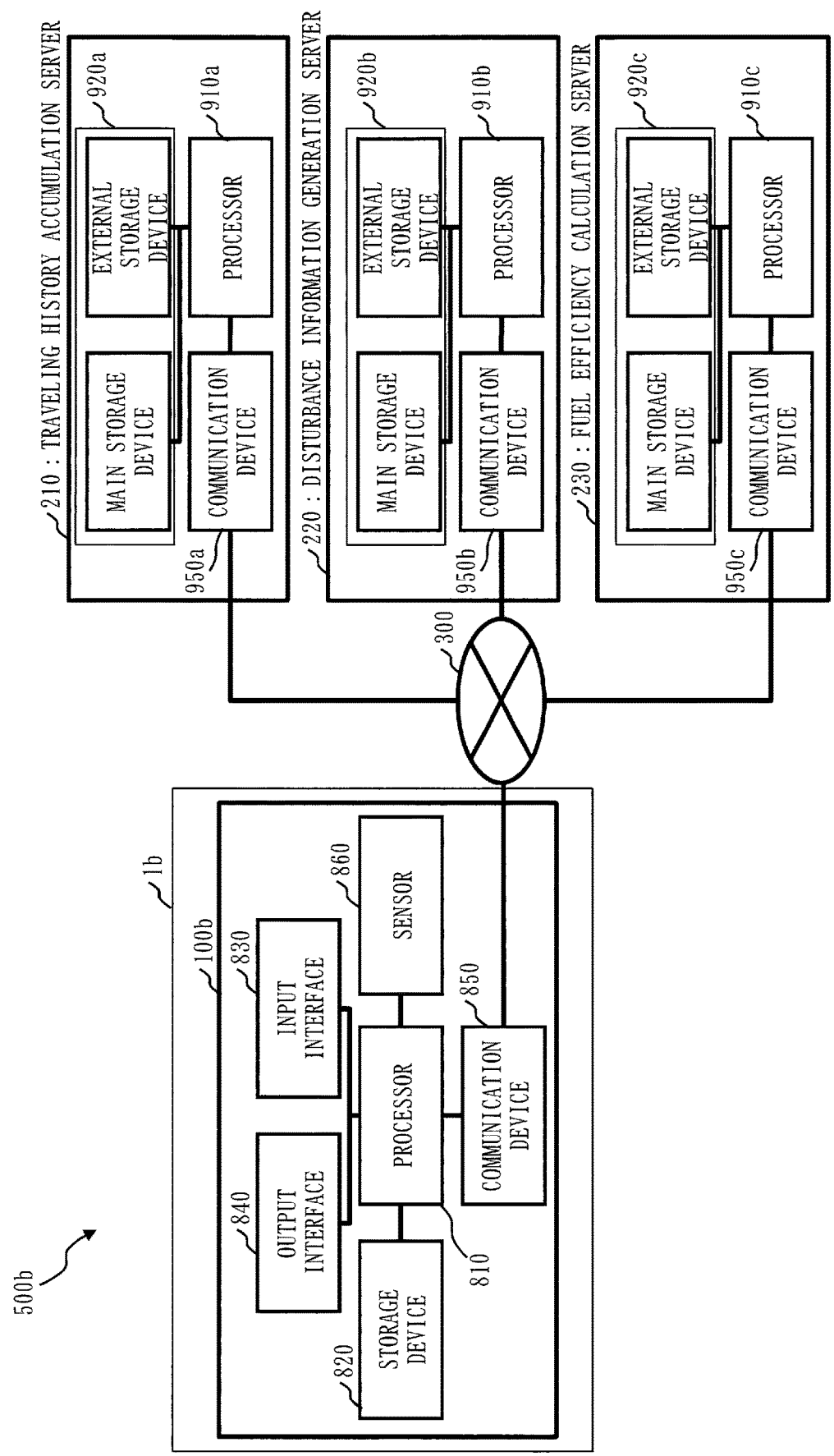
FIG. 18 illustrates a system structure of a fuel efficiency estimation system 500b according to Embodiment 3.

FIG. 18 illustrates a system structure of a fuel efficiency estimation system 500b according to the present embodiment. FIG. 18 illustrates a hardware structure of each device configuring the fuel efficiency estimation system 500b.

As illustrated in FIG. 18, the fuel efficiency estimation system 500b includes a motor vehicle 1b, a traveling history accumulation server 210, a disturbance information generation server 220, and a fuel efficiency calculation server 230. The motor vehicle 1b, the traveling history accumulation server 210, the disturbance information generation server 220, and the fuel efficiency calculation server 230 communicate via the network 300.

The traveling history accumulation server 210, the disturbance information generation server 220, and the fuel efficiency calculation server 230 each may be a substantial data server or may be configured in the cloud.

The hardware structure of the motor vehicle device 100b of the motor vehicle 1b is similar to that described in Embodiment 1.

Each of the traveling history accumulation server 210, the disturbance information generation server 220, and the fuel efficiency calculation server 230 is a computer.

The traveling history accumulation server 210, the disturbance information generation server 220, and the fuel efficiency calculation server 230 each include the processor 910, the storage device 920, and the communication device 950. Basic functions of the processor 910, the storage device 920, and the communication device 950 in each server are similar to those described in Embodiment 1. As illustrated in FIG. 18, the hardware pieces in each server are described as being distinguished with a subscript a, b, or c added to the reference numeral of each hardware piece.

The traveling history accumulation server 210 is described. A storage device 920a includes a main storage device which temporarily stores the process result regarding the traveling history accumulation process and an external storage device which stores the traveling history information. A processor 910a performs arithmetic operation process regarding the traveling history accumulation process. A communication device 950a transmits and receives the traveling history information 111 and the cartographic information 450.

The disturbance information generation server 220 is described. A storage device 920b includes a main storage device which temporarily stores the process result regarding calculation of the velocity disturbance correction coefficient 321 and the fuel efficiency disturbance correction coefficient 331 and an external storage device which stores the velocity disturbance correction coefficient 321 and the fuel efficiency disturbance correction coefficient 331 for each link. A processor 910b performs arithmetic operation process regarding calculation of the velocity disturbance correction coefficient 321 and the fuel efficiency disturbance correction coefficient 331. A communication device 950b transmits and receives information such as the traveling history information 111, the infrastructure information 470, the velocity disturbance correction coefficient 321, and the fuel efficiency disturbance correction coefficient 331.

The fuel efficiency calculation server 230 is described. A storage device 920c includes a main storage device which temporarily stores values and results of the respective arithmetic operation processes regarding fuel efficiency estimation. The storage device 920c may include an external storage device. A processor 910c performs the respective arithmetic operation processes regarding fuel efficiency estimation. A communication device 950c transmits and receives information such as the traveling route 411, the position information 121, the link traveling velocity, the infrastructure information 470, the velocity disturbance correction coefficient 321, the fuel efficiency disturbance correction coefficient 331, and the fuel efficiency estimation result 461.

Figure 19:
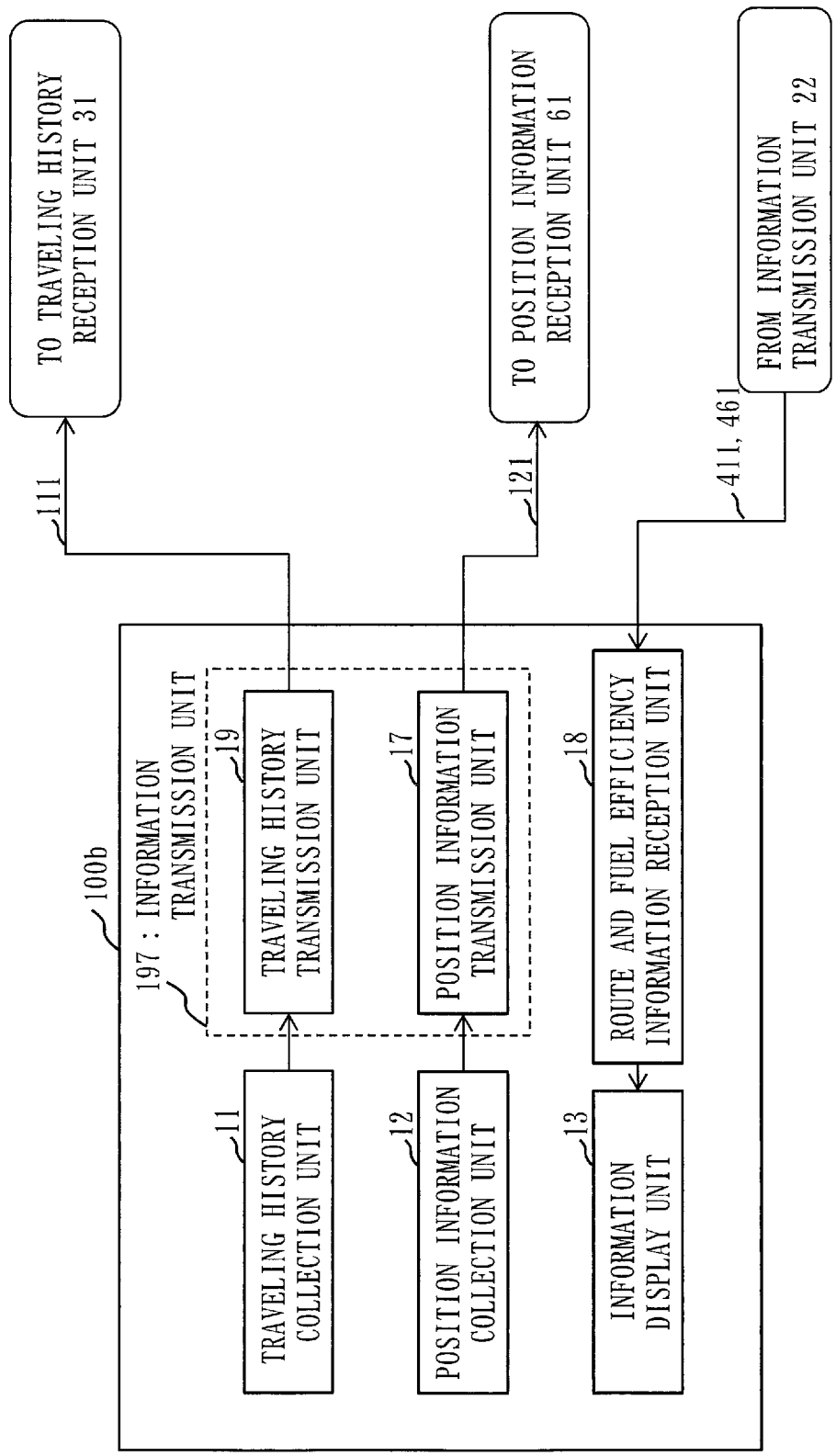
FIG. 19 illustrates a functional structure of a motor vehicle device 100b according to Embodiment 3.
Figure 20:
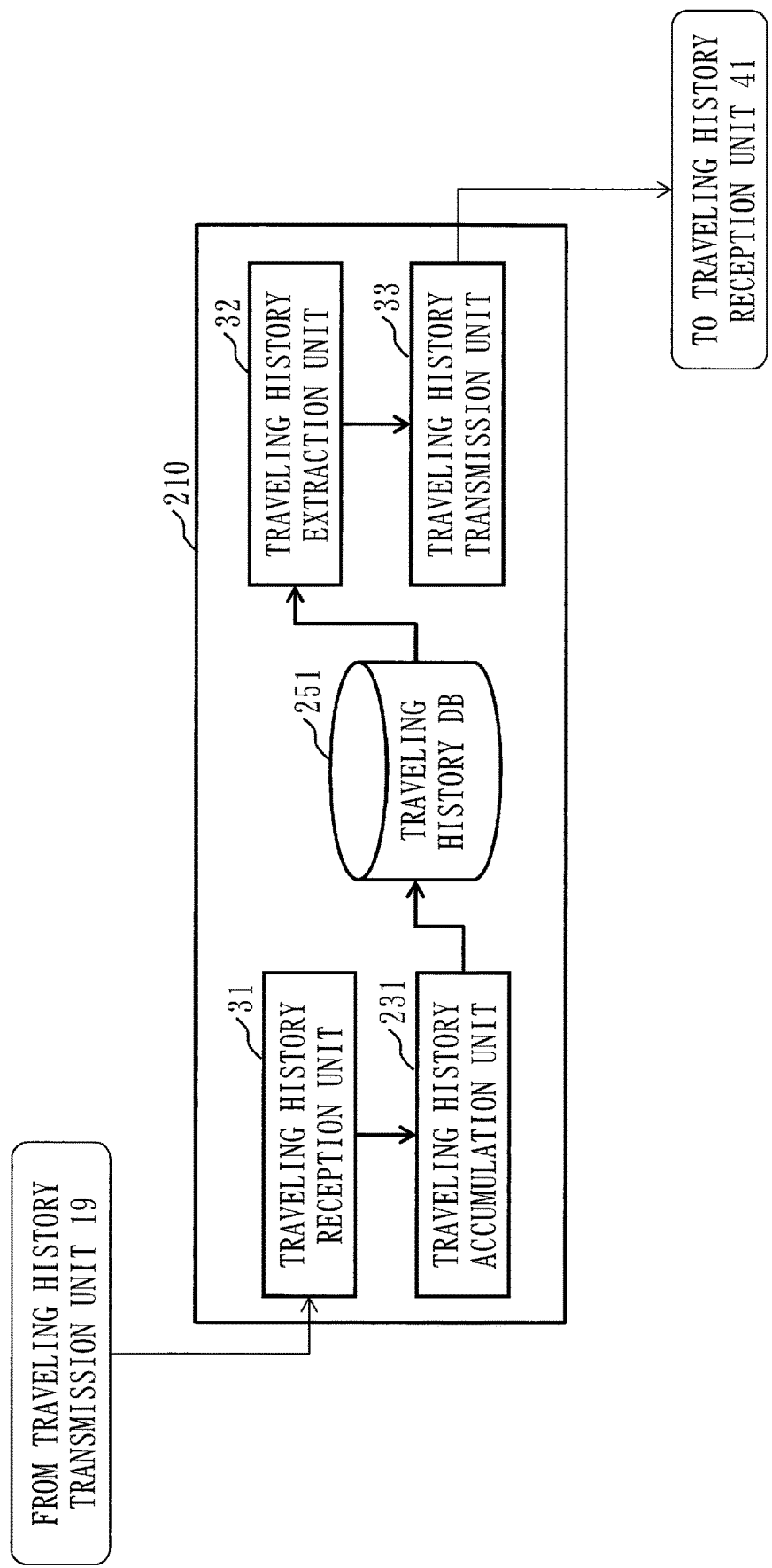
FIG. 20 illustrates a functional structure of a traveling history accumulation server 210 according to Embodiment 3.
Figure 21:
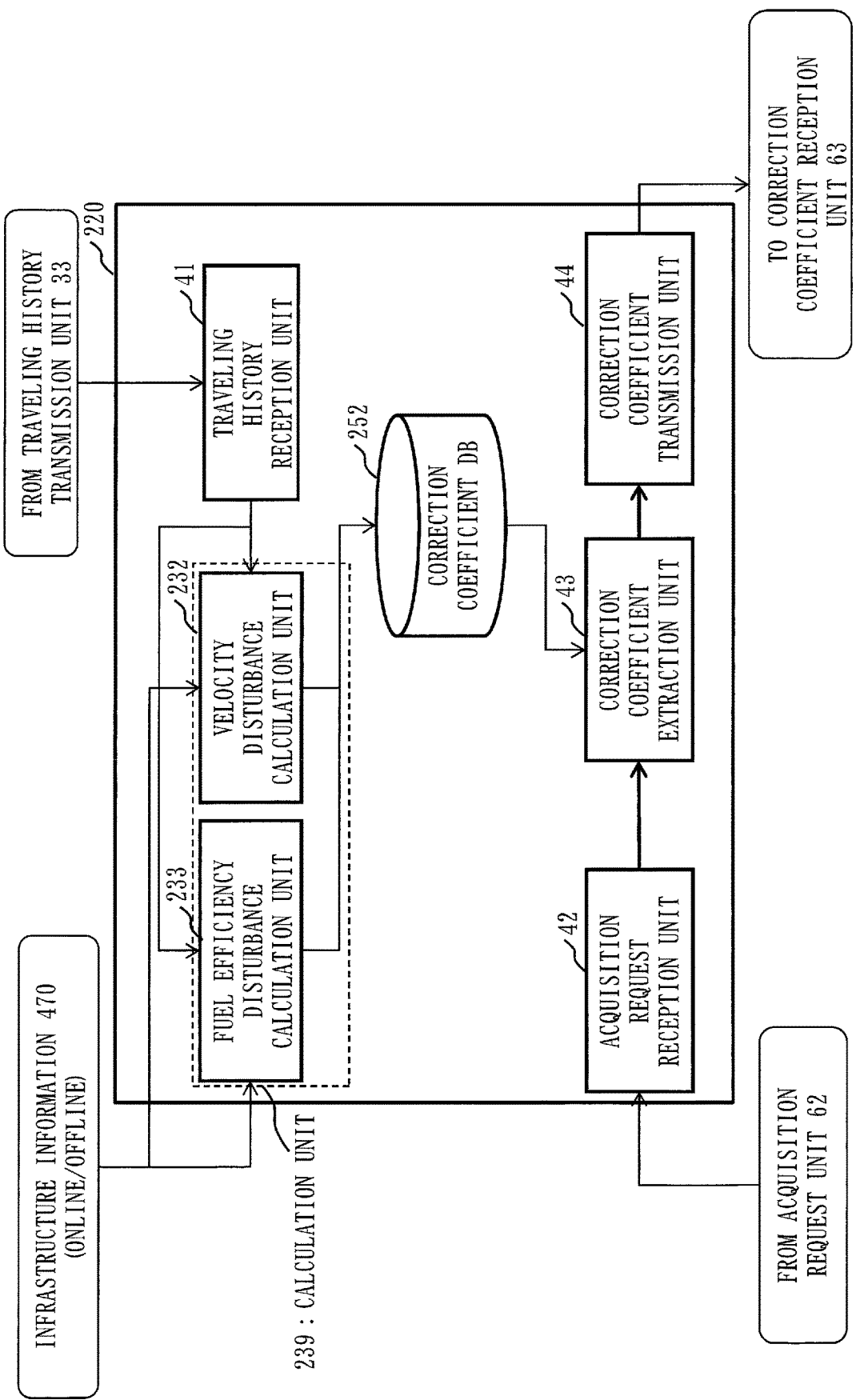
FIG. 21 illustrates a functional structure of a disturbance information generation server 220 according to Embodiment 3.
Figure 22:
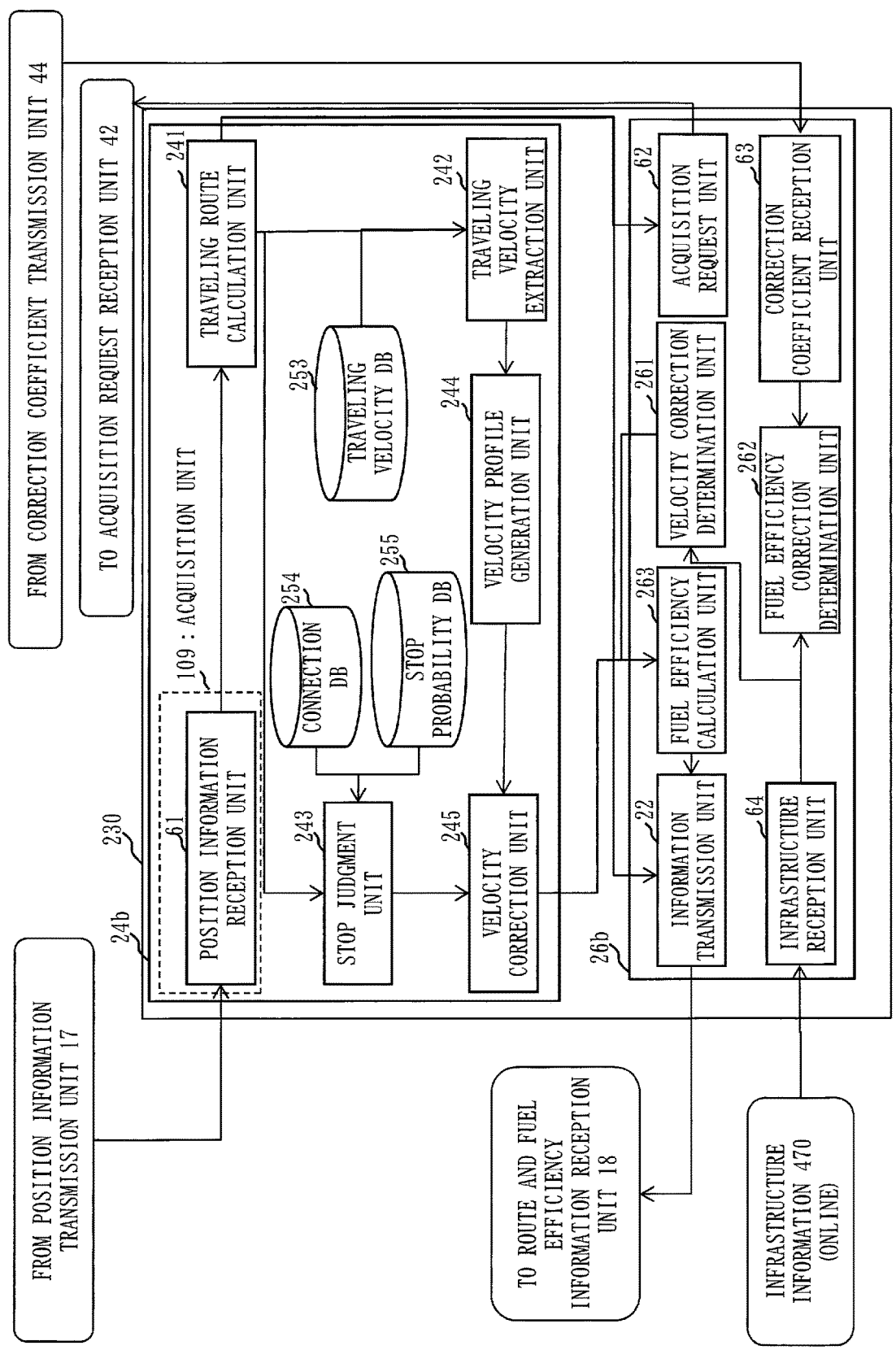
FIG. 22 illustrates a functional structure of a fuel efficiency calculation server 230 according to Embodiment 3.

Also, FIG. 19 illustrates a functional structure of the motor vehicle device 100b according to the present embodiment. FIG. 20 illustrates a functional structure of the traveling history accumulation server 210 according to the present embodiment. FIG. 21 illustrates a functional structure of the disturbance information generation server 220 according to the present embodiment. FIG. 22 illustrates a functional structure of the fuel efficiency calculation server 230 according to the present embodiment.

In the present embodiment, the functional structure diagram and the hardware structure diagram of each device of the fuel efficiency estimation system 500b are described as separate diagrams. However, a structure similar to the structure described in Embodiment 1 is provided with a same reference character and its description may be omitted.

The motor vehicle 1b includes the motor vehicle device 100b mounted on the motor vehicle 1b as a vehicle-mounted device. The motor vehicle device 100b is mounted on the motor vehicle 1b traveling the traveling route 411, and includes an information transmission unit 197 which transmits the position information 121 and the traveling history information 111 indicating traveling history of the motor vehicle 1b. The motor vehicle device 100b includes, in addition to the traveling history collection unit 11, the position information collection unit 12, and the information display unit 13 described in Embodiment 1, a traveling history transmission unit 19, a position information transmission unit 17, and a route and fuel efficiency information reception unit 18. That is, the functions of the "units" of the motor vehicle device 100b are the functions of the traveling history collection unit 11, the position information collection unit 12, the information display unit 13, the traveling history transmission unit 19, the position information transmission unit 17, and the route and fuel efficiency information reception unit 18. The information transmission unit 197 includes the traveling history transmission unit 19 and the position information transmission unit 17.

The traveling history transmission unit 19 transmits the traveling history information 111 to the traveling history accumulation server 210 via the communication device 850. The position information transmission unit 17 transmits the position information 121 including the origin and the destination to the fuel efficiency calculation server 230 via the communication device 850. The traveling history transmission unit 19 and the position information transmission unit 17 are an example of an information transmission unit which transmits the position information 121 and the traveling history information 111 indicating traveling history of the motor vehicle 1b. The route and fuel efficiency information reception unit 18 receives, via the communication device 850, the traveling route 411 and the fuel efficiency estimation result 461 calculated by the fuel efficiency calculation server 230.

The traveling history accumulation server 210 includes, in addition to the traveling history accumulation unit 231 and the traveling history DB 251 described in Embodiment 1, a traveling history reception unit 31, a traveling history extraction unit 32, and a traveling history transmission unit 33. The traveling history reception unit 31 receives the traveling history information 111 transmitted from the motor vehicle 1b. The traveling history extraction unit 32 extracts necessary traveling history information 111 from the traveling history DB 251. The traveling history transmission unit 33 transmits the extracted traveling history information 111 to the disturbance information generation server 220. The functions of the other structure units are similar to those described in Embodiment 1.

The disturbance information generation server 220 includes, in addition to the velocity disturbance calculation unit 232, the fuel efficiency disturbance calculation unit 233, and the correction coefficient DB 252 described in Embodiment 1, a traveling history reception unit 41, an acquisition request reception unit 42, a correction coefficient extraction unit 43, and a correction coefficient transmission unit 44. The traveling history reception unit 41 receives the traveling history information 111 from the traveling history accumulation server 210. The acquisition request reception unit 42 accepts an acquisition request for a disturbance correction coefficient from the fuel efficiency calculation server 230. The correction coefficient extraction unit 43 extracts the disturbance correction coefficients requested for acquisition from the correction coefficient DB 252. The correction coefficient transmission unit 44 transmits the extracted disturbance correction coefficients to the fuel efficiency calculation server 230. The functions of the other structure units are similar to those described in Embodiment 1. Note that the velocity disturbance calculation unit 232 and the fuel efficiency disturbance calculation unit 233 are a calculation unit 239 which calculates a velocity disturbance correction coefficient and a fuel efficiency disturbance correction coefficient based on the traveling history information 111 and disturbance information. The infrastructure information 470 to be used by the velocity disturbance calculation unit 232 and the fuel efficiency disturbance calculation unit 233 may be acquired online or may be acquired offline from information stored in advance in the disturbance information generation server 220.

The fuel efficiency calculation server 230 has a velocity profile calculation unit 24b and a traveling fuel efficiency estimation unit 26b corresponding to the velocity profile calculation unit 24 and the traveling fuel efficiency estimation unit 26 described in Embodiment 1.

The velocity profile calculation unit 24b includes the traveling route calculation unit 241, the traveling velocity extraction unit 242, the stop judgment unit 243, the velocity profile generation unit 244, the velocity correction unit 245, the traveling velocity DB 253, the connection DB 254, and the stop probability DB 255 described in Embodiment 1. Also, the velocity profile calculation unit 24b includes, in addition to the above structure units, a position information reception unit 61 which receives the position information 121 from the motor vehicle device 100b as the acquisition unit 109. The position information reception unit 61 receives the position information 121 received from the motor vehicle 1b, and passes it to the traveling route calculation unit 241. The functions of the other structure units are similar to those described in Embodiment 1.

The traveling fuel efficiency estimation unit 26b includes the information transmission unit 22, the velocity correction determination unit 261, the fuel efficiency correction determination unit 262, and the fuel efficiency calculation unit 263 described in Embodiment 1. Also, the traveling fuel efficiency estimation unit 26b includes, in addition to the above structure units, an acquisition request unit 62, a correction coefficient reception unit 63, and an infrastructure reception unit 64. The acquisition request unit 62 transmits, to the disturbance information generation server 220, acquisition requests for disturbance correction coefficients required for traveling fuel efficiency estimation. The correction coefficient reception unit 63 receives a velocity disturbance correction coefficient and a fuel efficiency disturbance correction coefficient from the disturbance information generation server 220. In estimating traveling fuel efficiency for the velocity profile calculated at the velocity profile calculation unit 24b, the infrastructure reception unit 64 receives, as infrastructure information at an estimation date and time, cartographic information, road congestion information, event information, weather information, and warning alert information. The functions of the other structure units are similar to those described in Embodiment 1.

*Description of Operation*

Next, operation is described.

The present embodiment is different from Embodiment 1 and Embodiment 2 in that the traveling history accumulation process, the disturbance information generation process, and the fuel efficiency calculation process including the velocity profile calculation process and the traveling fuel efficiency estimation process are each processed at independent servers. Therefore, in the present embodiment, the process at each server may be independently performed without each requiring a synchronization process.

Figure 23:
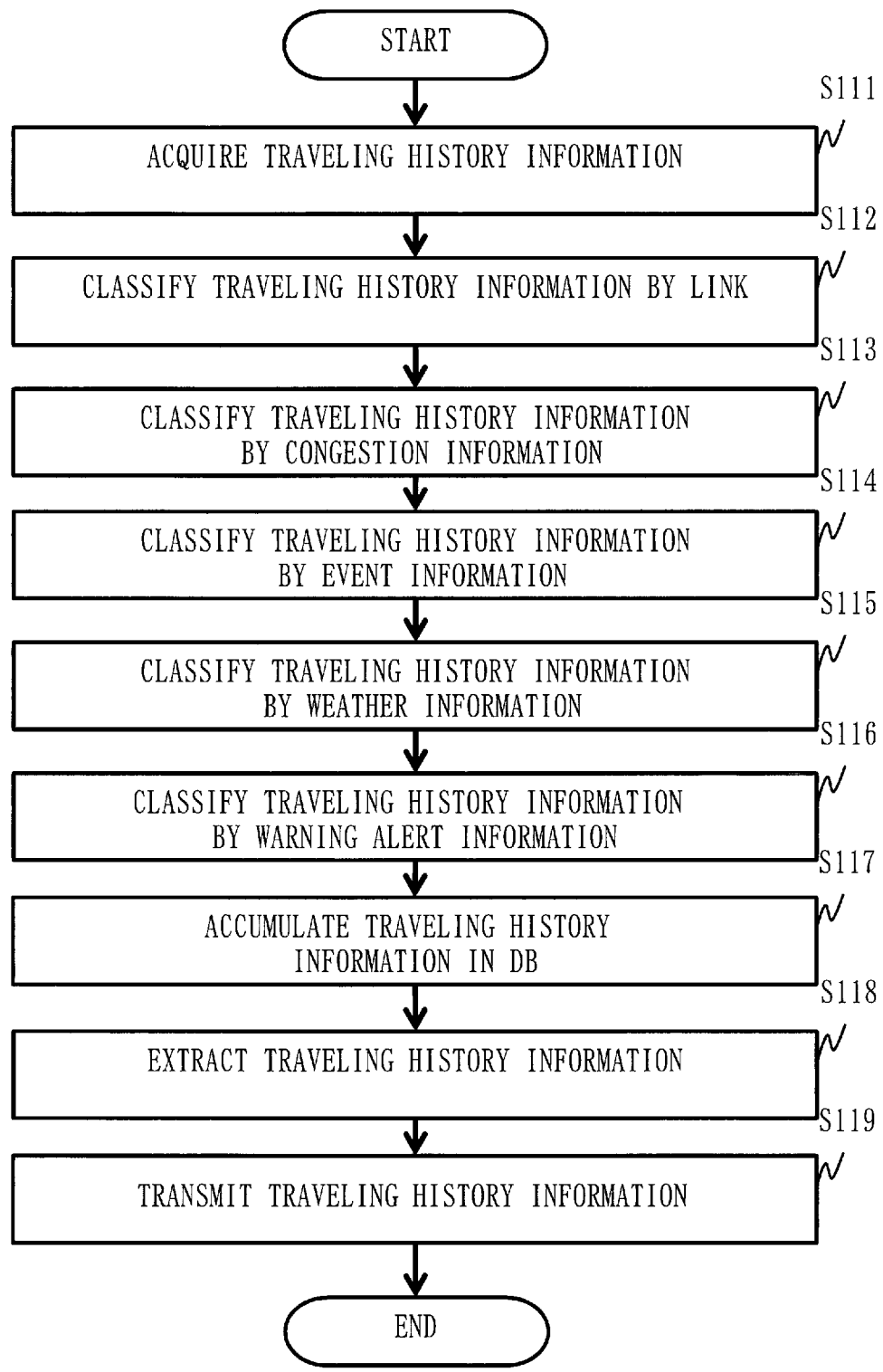
FIG. 23 is a flowchart of the traveling history accumulation server 210 according to Embodiment 3.

FIG. 23 is a flowchart of the traveling history accumulation server 210 according to the present embodiment.

First, the traveling history reception unit 31 acquires the traveling history information 111 (step S111). Here, it is assumed that the traveling history information 111 has at least a traveling position, traveling velocity, traveling direction, and traveling date and time information and the traveling history information 111 can be information-divided by link and by date and time. Also, the traveling history information 111 may have a traveling link, acceleration, gradient, weather at the time of traveling, road congestion situation at the time of traveling, and so forth. Furthermore, the traveling history information 111 may include therein road congestion information, event information, weather information, and warning alert information at the same time as the time of the traveling history information 111. Alternatively, simultaneously with reception of the traveling history information 111, the traveling history reception unit 31 may acquire the road congestion information, the event information, the weather information, and the warning alert information at the same time as the time of the traveling history information 111 from the infrastructure information 470.

Next, the traveling history accumulation unit 231 classifies the traveling history information 111 by link (step S112), by congestion information (step S113), by event information (step S114), by weather information (step S115), and by warning alert information (step S116). The traveling history accumulation unit 231 stores the classified traveling history information 111 in the traveling history DB 251 (step S117). The processes from step S112 to step S117 are similar to the processes from step S22 to step S27 of FIG. 5, and therefore detailed description is omitted.

Next, the traveling history extraction unit 32 extracts the traveling history information 111 for passing to the disturbance information generation server 220 from the traveling history DB 251 (step S118). Here, as for extraction of the traveling history information 111, the traveling history information 111 may be extracted at predetermined intervals, such as once a day, or a scheme may be taken in which extraction is made only upon request from the fuel efficiency calculation server 230.

Lastly, the traveling history transmission unit 33 transmits the extracted traveling history information 111 to the disturbance information generation server 220 (step S119).

Figure 24:
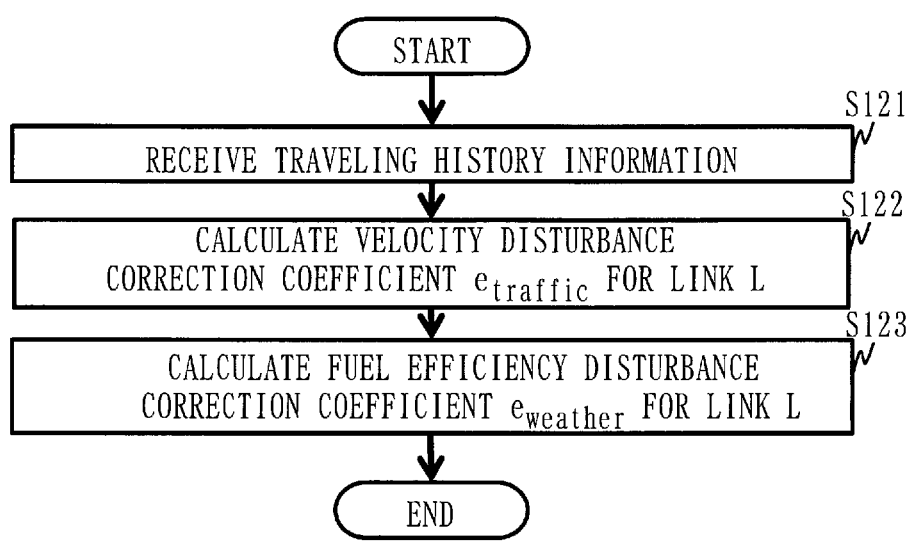
FIG. 24 is a flowchart of a correction coefficient calculation process of the disturbance information generation server 220 according to Embodiment 3.

FIG. 24 is a flowchart of a correction coefficient calculation process of the disturbance information generation server 220 according to the present embodiment. Here, description is made to the case in which the disturbance correction coefficient for the link L is calculated.

First, the traveling history reception unit 41 receives the traveling history information 111 related to the link L (step S121). Next, the velocity disturbance calculation unit 232 calculates a velocity disturbance correction coefficient $e_{traffic}$ for the link L (step S122). Lastly, the fuel efficiency disturbance calculation unit 233 calculates a fuel efficiency disturbance correction coefficient $e_{weather}$ for the link L.

Here, details of the process at step S122 are similar to the processes at step S31 to step S34 of FIG. 6. Also, details of the process at step S123 are similar to the processes at step S41 to step S44 of FIG. 7. Thus, detailed description of the processes at step S122 and step S123 is omitted.

Figure 25:
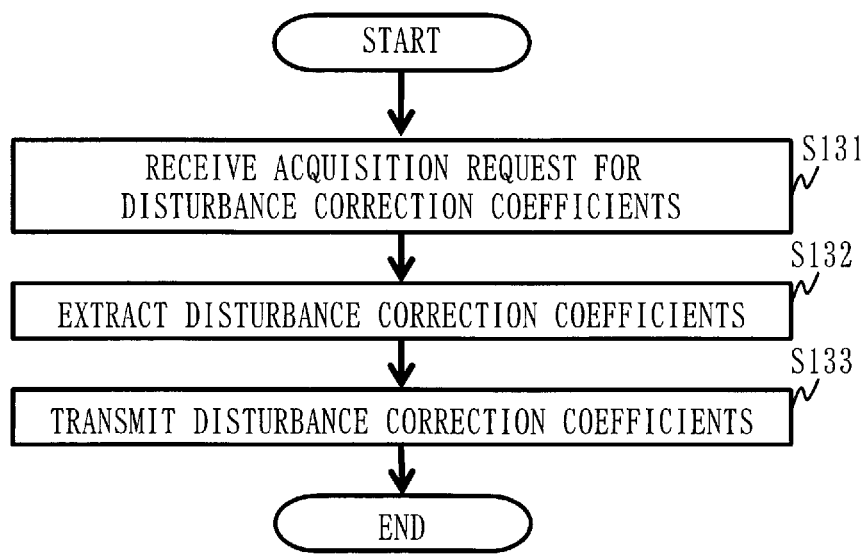
FIG. 25 is a flowchart of a correction coefficient extraction process of the disturbance information generation server 220 according to Embodiment 3.

FIG. 25 is a flowchart of a correction coefficient extraction process of the disturbance information generation server 220 according to the present embodiment. The correction coefficient extraction process of the disturbance information generation server 220 is a process of extracting a disturbance correction coefficient when a request for acquiring the disturbance correction coefficient is received from the fuel efficiency calculation server 230.

First, the acquisition request reception unit 42 receives an acquisition request for disturbance correction coefficients from the fuel efficiency calculation server 230 (step S131). Here, acquisition requests for disturbance correction coefficients for a plurality of links can be collectively received and processed. In the following, description is made to the case in which an acquisition request for disturbance correction coefficients is made for the link L at the extraction date and time when the road congestion information is $b_0$, the event information is $c_0$, the weather information is $d_0$, and the warning alert information is $g_0$.

Next, the correction coefficient extraction unit 43 extracts, from the correction coefficient DB 252, a velocity disturbance correction coefficient $e_{traffic}(L, b_0, c_0)$ for the link L when the road congestion information is $b_0$ and the event information is $c_0$ and a fuel efficiency disturbance correction coefficient $e_{weather}(L, d_0, g_0)$ for the link L when the weather information is $d_0$ and the warning alert information is $g_0$ (step S132).

Lastly, the correction coefficient transmission unit 44 transmits the extracted velocity disturbance correction coefficient $e_{traffic}(L, b_0, c_0)$ and fuel efficiency disturbance correction coefficient $e_{weather}(L, d_0, g_0)$ to the fuel efficiency calculation server 230 (step S133).

Figure 26:
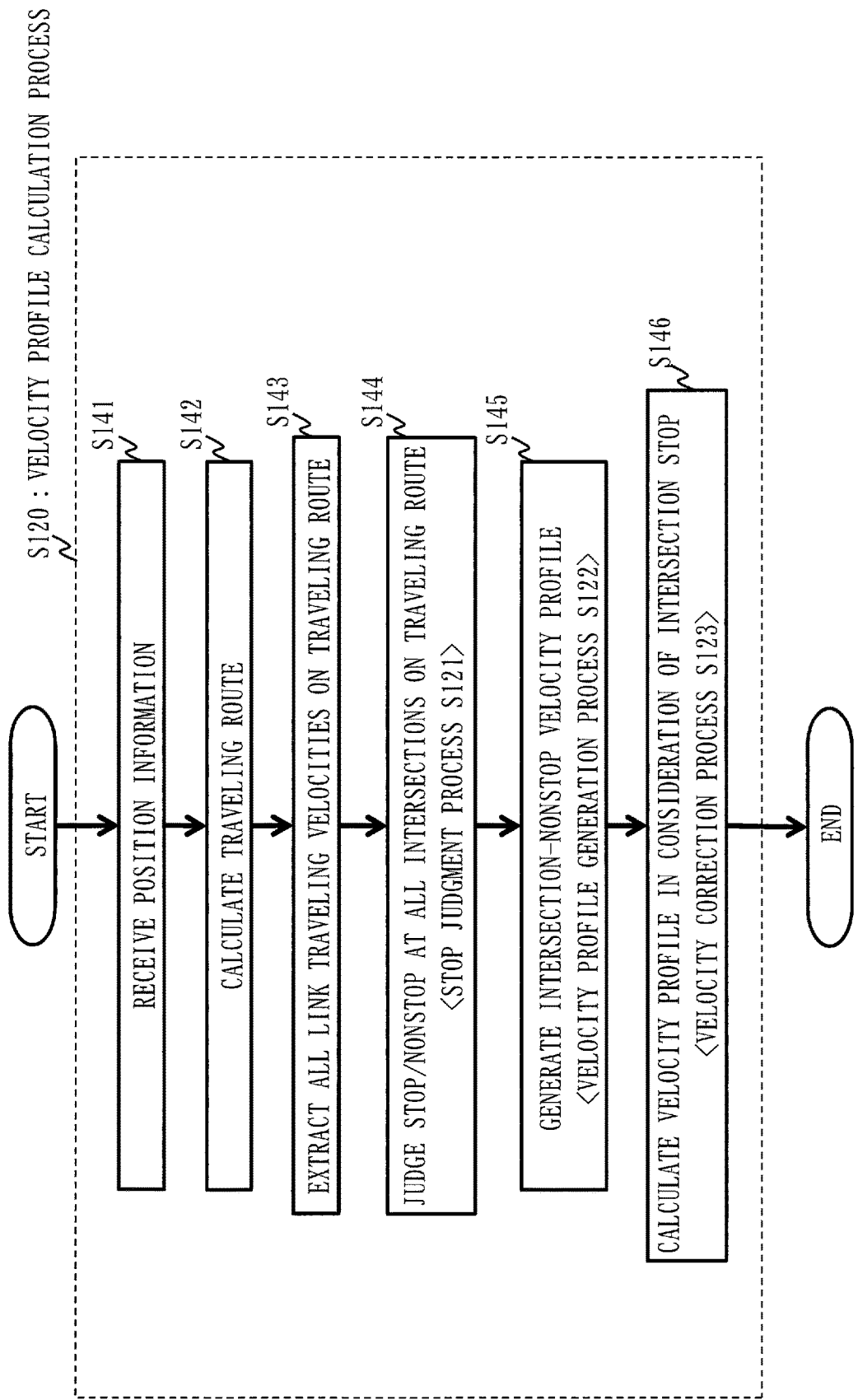
FIG. 26 is a flowchart of a velocity profile calculation process S120 of the fuel efficiency calculation server 230 according to Embodiment 3.

FIG. 26 is a flowchart of the velocity profile calculation process S120 of the fuel efficiency calculation server 230 according to the present embodiment. In the following, description is made to the case in which a date and time for estimation of motor-vehicle traveling fuel efficiency is a date and time (time $t_0$, day of the week $w_0$, season $s_0$) when the position information reception unit 61 receives the position information 121.

First, the position information reception unit 61 receives the position information 121 from the motor vehicle device 100b (step S141). Next, the traveling route calculation unit 241 calculates the traveling route X of the motor vehicle based on the position information 121 received from the motor vehicle device 100b (step S142). Next, the traveling velocity extraction unit 242 extracts the link traveling velocity $V(L_k, t_k, w_k, s_k)$ ($1 \leq k \leq n+1$) for all passage links on the traveling route X (step S143). Next, the stop judgment unit 243 judges intersection stop/nonstop $S(i_1)$ to $S(i_m)$ for all intersections $i_1$ to $i_m$ on the traveling route X (step S144). Next, by using the link traveling velocity $V(L_k, t_k, w_k, s_k)$ ($1 \leq k \leq n+1$) extracted by the traveling velocity extraction unit 242, the velocity profile generation unit 244 generates an intersection-nonstop velocity profile $V_{profile-nonstop}(X)$ in traveling the traveling route X (step S145). Lastly, the velocity correction unit 245 reproduces, on the intersection-nonstop velocity profile $V_{profile-nonstop}(X)$ generated by the velocity profile generation unit 244, an acceleration/deceleration occurring due to the intersection stop by the intersection stop/nonstop $S(i_1)$ to $S(i_m)$ judged by the stop judgment unit 243, and calculates the velocity profile $V_{profile}(X)$ in consideration of intersection stop (step S146).

Here, the processes from step S142 to step S146 are similar to the processes from step S52 to step S56 of FIG. 8, and therefore detailed description is omitted.

Figure 27:
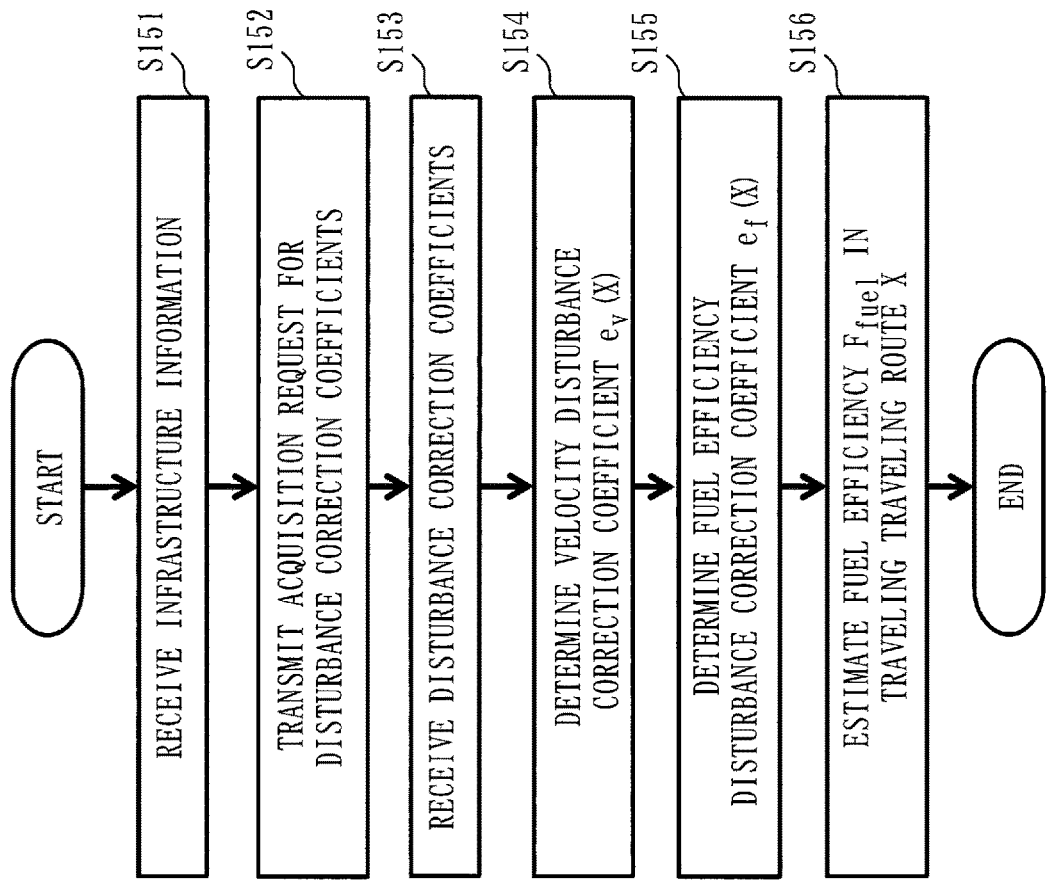
FIG. 27 is a flowchart of a traveling fuel efficiency estimation process of the fuel efficiency calculation server 230 according to Embodiment 3.

FIG. 27 is a flowchart of a traveling fuel efficiency estimation process of the fuel efficiency calculation server 230 according to the present embodiment.

First, the infrastructure reception unit 64 receives road congestion information, event information, weather information, and warning alert information as infrastructure information at the estimation date and time (step S151). Next, the acquisition request unit 62 transmits, to the disturbance information generation server 220, an acquisition request for disturbance correction coefficients for all passage links in traveling the traveling route X calculated by the velocity profile calculation unit 24b (step S152). Next, the correction coefficient reception unit 63 receives the disturbance correction coefficients requested for acquisition (step S153).

In the processes at step S152 and step S153, disturbance correction coefficients for a plurality of links can be simultaneously requested for acquisition and also can be simultaneously received.

Next, the velocity correction determination unit 261 determines the velocity disturbance correction coefficient $e_v(X)$ in traveling the traveling route X (step S154). Next, the fuel efficiency correction determination unit 262 determines the fuel efficiency disturbance correction coefficient $e_f(X)$ in traveling the traveling route X (step S155). Lastly, the fuel efficiency calculation unit 263 estimates a motor-vehicle traveling fuel efficiency $F_{fuel}$ in traveling the traveling route X based on the velocity profile $V_{profile}(X)$ in consideration of intersection stop and the velocity disturbance correction coefficient $e_v(X)$ and the fuel efficiency disturbance correction coefficient $e_f(x)$ (step S156). Here, the processes from step S154 to step S156 are similar to the processes from step S101 to step S103 of FIG. 13, and therefore detailed description is omitted.

Description of Effects According to Present Embodiment

As described above, according to the fuel efficiency estimation system 500b of the present embodiment, the servers are distributed to allow the loads of the respective processes to be distributed. This can provide support without consideration of influences of load on another process when, for example, a large amount of traveling history information will be gathered in the future or it is desired to increase the frequency of calculation and updating of the intersection stop probability to enhance reproduction accuracy.

Embodiment 4

In the present embodiment, differences from Embodiments 1 to 3 are mainly described.

In the present embodiment, a structure similar to the structure described in Embodiments 1 to 3 is provided with a same reference character and its description is omitted.

*Description of Structure*

In Embodiments 1 to 3, the structure is such that processing is performed only at the motor vehicle and the central server. However, as for generation of disturbance information, calculation can be made intrinsically for each link, and processing by edge computing can be performed.

Figure 28:
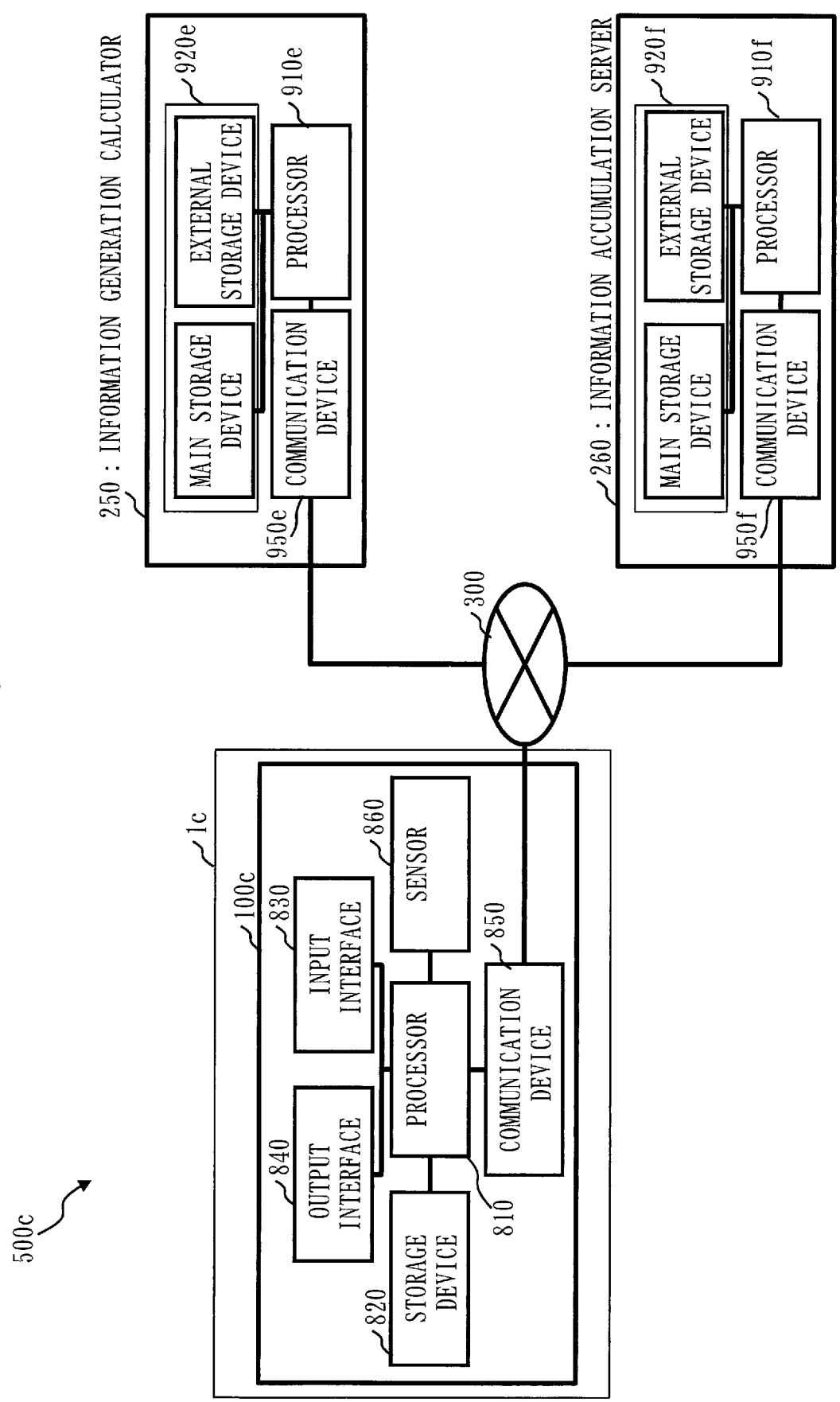
FIG. 28 illustrates a system structure of a fuel efficiency estimation system 500c according to Embodiment 4.

FIG. 28 illustrates a system structure of a fuel efficiency estimation system 500c according to the present embodiment. FIG. 28 illustrates a hardware structure of each device configuring the fuel efficiency estimation system 500c.

In FIG. 28, the fuel efficiency estimation system 500c is configured of a motor vehicle device 100c mounted on a motor vehicle 1c, an information generation calculator 250, and an information accumulation server 260. Here, it is configured that one information generation calculator 250 is installed to each link on the roads nationwide. The information generation calculator 250 is also referred to as a disturbance information generation calculator 250.

The motor vehicle device 100c, the information generation calculator 250, and the information accumulation server 260 communicate with each other via the network 300.

Figure 29:
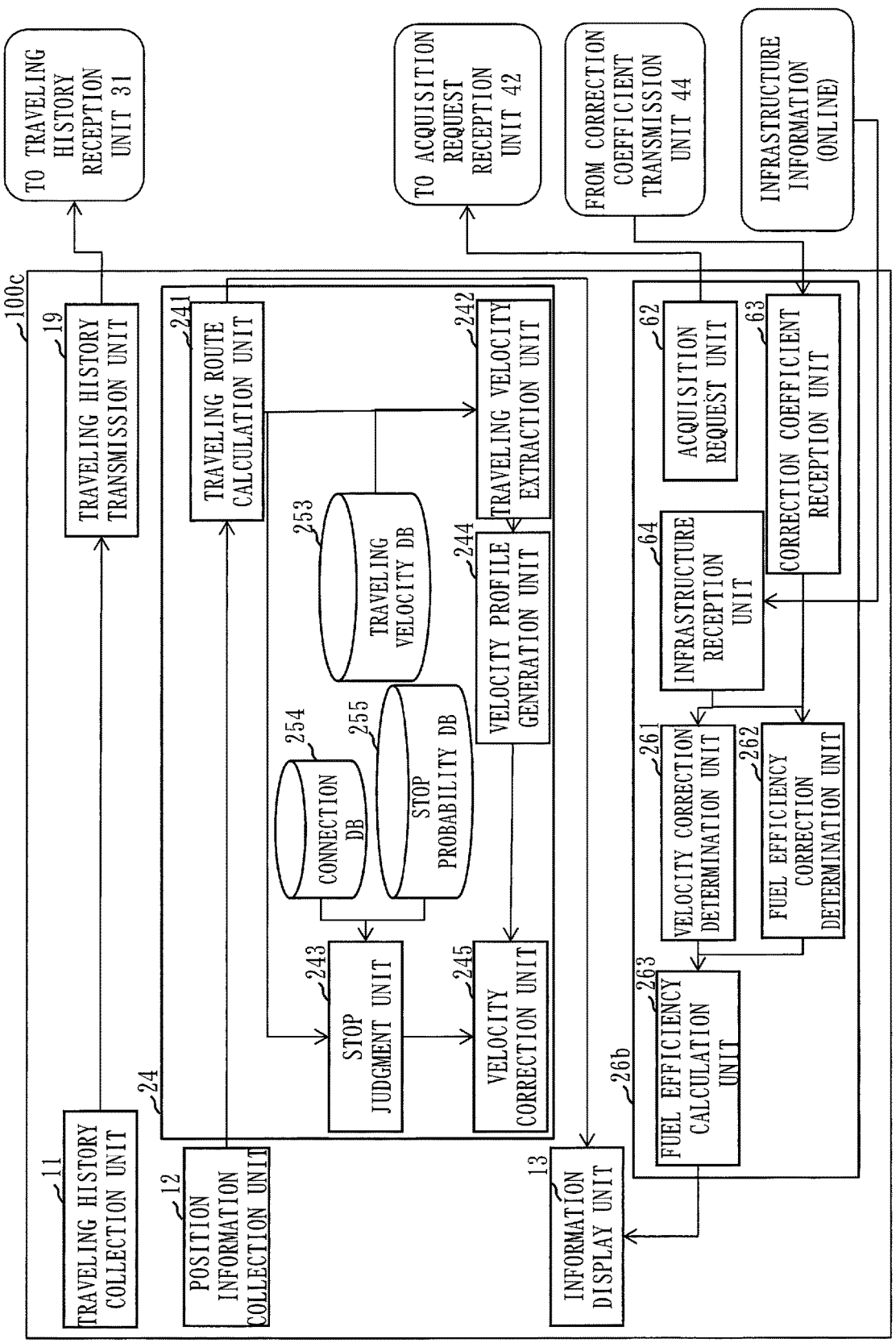
FIG. 29 illustrates a functional structure of a motor vehicle device 100c according to Embodiment 4.
Figure 30:
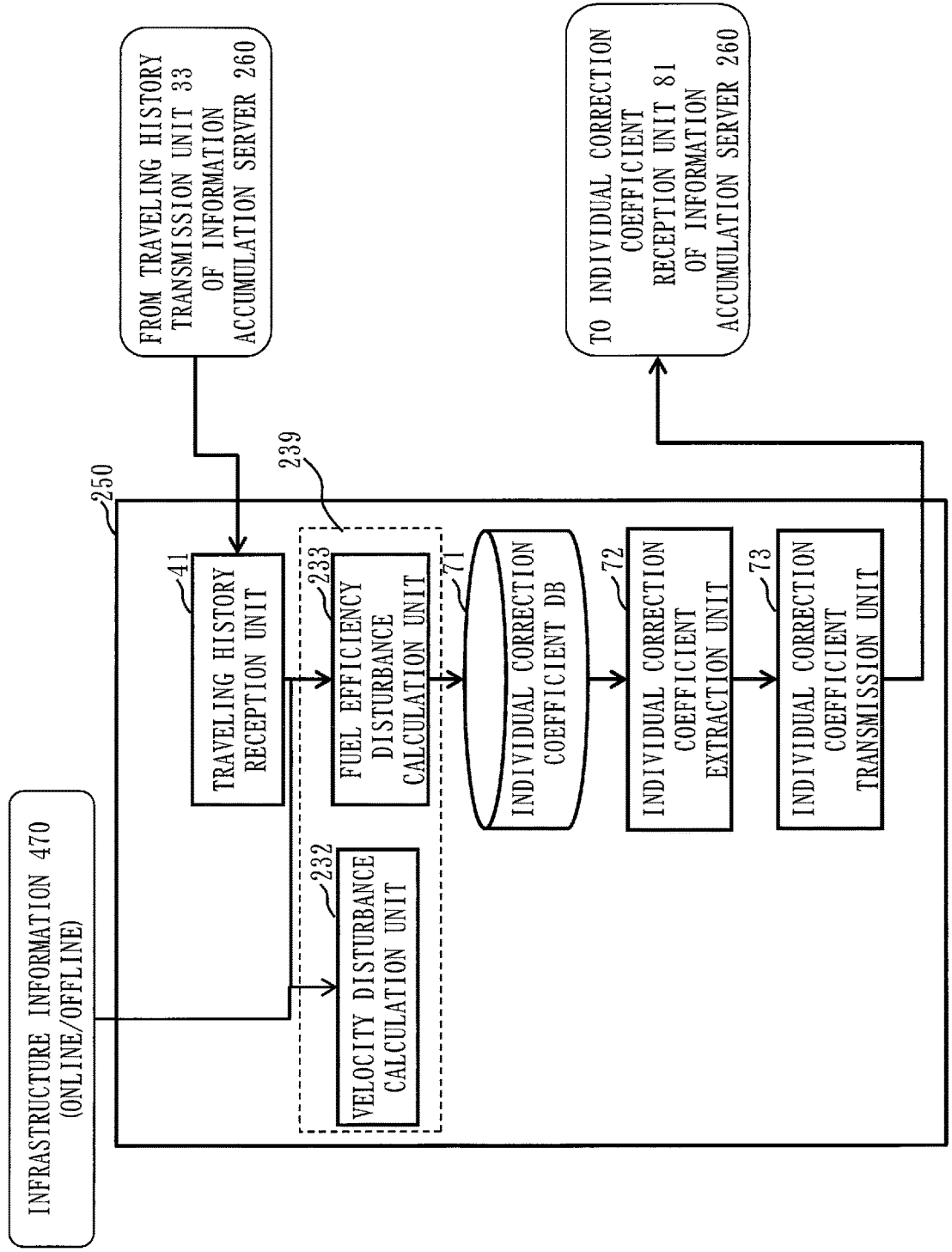
FIG. 30 illustrates a functional structure of an information generation calculator 250 according to Embodiment 4.
Figure 31:
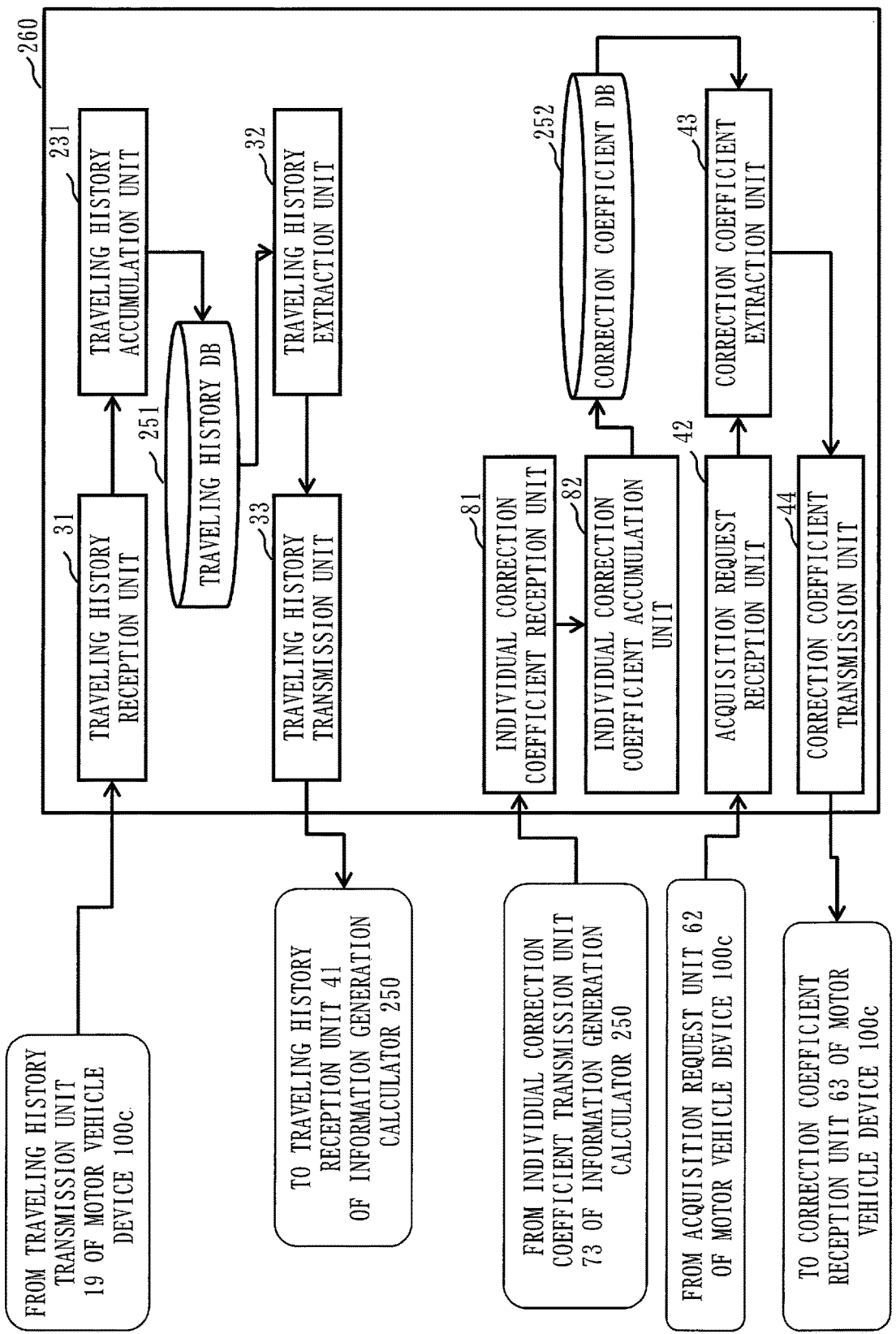
FIG. 31 illustrates a functional structure of an information accumulation server 260 according to Embodiment 4.

FIG. 29 illustrates a functional structure of the motor vehicle device 100c according to the present embodiment. FIG. 30 illustrates a functional structure of the information generation calculator 250 according to the present embodiment. FIG. 31 illustrates a functional structure of the information accumulation server 260 according to the present embodiment.

The motor vehicle device 100c includes the traveling history collection unit 11, the position information collection unit 12, and the information display unit 13. The motor vehicle device 100c also includes the traveling history transmission unit 19 which transmits the traveling history information 111 to the information accumulation server 260, the velocity profile calculation unit 24, and the traveling fuel efficiency estimation unit 26b.

The velocity profile calculation unit 24 performs calculation of the traveling route 411 and calculation of a velocity profile in traveling the traveling route 411 based on the position information 121 and the cartographic information 450. The functional structure of the velocity profile calculation unit 24 is similar to that of the velocity profile calculation unit 24 described in Embodiment 2.

The traveling fuel efficiency estimation unit 26b calculates, as the fuel efficiency estimation result 461, estimated fuel efficiency in traveling the traveling route 411, based on the velocity profile calculated by the velocity profile calculation unit 24 and the disturbance correction coefficients acquired from the information accumulation server 260. The functional structure of the traveling fuel efficiency estimation unit 26b is similar to that of the traveling fuel efficiency estimation unit 26b described in Embodiment 3. However, in the present embodiment, the traveling fuel efficiency estimation unit 26b does not have the information transmission unit 22, and the fuel efficiency calculation unit 263 outputs the fuel efficiency estimation result 461 directly to the information display unit 13. Also in the present embodiment, the correction coefficient reception unit 63 receives a velocity disturbance correction coefficient and a fuel efficiency disturbance correction coefficient from the information accumulation server 260.

The information generation calculator 250 is provided for each link as a road section that is present on the traveling route. The information generation calculator 250 includes the calculation unit 239 which calculates a velocity disturbance correction coefficient and a fuel efficiency disturbance correction coefficient based on the traveling history information 111 and disturbance information. The information generation calculator 250 includes the velocity disturbance calculation unit 232, the fuel efficiency disturbance calculation unit 233, and the traveling history reception unit 41 described in Embodiments 1 to 3. The velocity disturbance calculation unit 232 and the fuel efficiency disturbance calculation unit 233 are the calculation unit 239.

The information generation calculator 250 includes, in addition to the above structure units, an individual correction coefficient DB 71, an individual correction coefficient extraction unit 72, and an individual correction coefficient transmission unit 73. The individual correction coefficient DB 71 accumulates the velocity disturbance correction coefficient 321 for a specific link calculated by the velocity disturbance calculation unit 232. Also, the individual correction coefficient DB 71 accumulates the fuel efficiency disturbance correction coefficient 331 for the specific link calculated by the fuel efficiency disturbance calculation unit 233. The specific link is a link where the information generation calculator 250 is installed. The individual correction coefficient extraction unit 72 extracts a disturbance correction coefficient for the specific link from the individual correction coefficient DB 71. The individual correction coefficient transmission unit 73 transmits the extracted disturbance correction coefficient to the information accumulation server 260.

The information accumulation server 260 includes the following structure units described in Embodiments 1 to 3. The information accumulation server 260 includes the traveling history reception unit 31 which receives the traveling history information 111 transmitted from the motor vehicle device 100c, the traveling history accumulation unit 231 which accumulates the traveling history information 111 in the traveling history DB 251, and the traveling history extraction unit 32 which extracts the required traveling history information 111 from the traveling history DB 251. Also, the information accumulation server 260 includes the traveling history transmission unit 33 which transmits the extracted traveling history information 111 to the information generation calculator 250 of an individual link. Furthermore, the information accumulation server 260 includes the correction coefficient DB 252 which accumulates a disturbance correction coefficient corresponding to each link on the roads nationwide and the acquisition request reception unit 42 which accepts an acquisition request for a disturbance correction coefficient from the motor vehicle device 100c. Still further, the information accumulation server 260 includes the correction coefficient extraction unit 43 which extracts the disturbance correction coefficient requested for acquisition from the correction coefficient DB 252 and a correction coefficient transmission unit 44 which transmits the extracted disturbance correction coefficient to the motor vehicle device 100c.

The information accumulation server 260 includes, in addition to the above structure units, an individual correction coefficient reception unit 81 which receives the velocity disturbance correction coefficient and the fuel efficiency disturbance correction coefficient as disturbance correction coefficients transmitted from the information generation calculator 250 corresponding to each link on the roads nationwide. Also, the information accumulation server 260 includes an individual correction coefficient accumulation unit 82 which accumulates the velocity disturbance correction coefficient and the fuel efficiency disturbance correction coefficient as the received disturbance correction coefficients in the correction coefficient DB 252.

By using FIG. 28, the hardware structure in the present embodiment is described.

In the fuel efficiency estimation system 500c according to the present embodiment, each of the motor vehicle device 100c mounted on the motor vehicle 1c, the information generation calculator 250, and the information accumulation server 260 is a computer. Here, one information generation calculator 250 is held for each of the links nationwide. Also, the information accumulation server 260 may be a substantial data server or may be configured in the cloud.

The hardware structure of the motor vehicle device 100c of the motor vehicle 1c is similar to that described in Embodiments 1 to 3.

The information generation calculator 250 and the information accumulation server 260 each include the processor 910, the storage device 920, and the communication device 950. Basic functions of the processor 910, the storage device 920, and the communication device 950 in each server are similar to those described in Embodiments 1 to 3. As illustrated in FIG. 28, the hardware pieces in each of the information generation calculator 250 and the information accumulation server 260 are described as being distinguished with a subscript e or f added to the reference numeral of each hardware piece.

The information generation calculator 250 is described. A storage device 920e includes a main storage device which temporarily stores the process result regarding generation of disturbance correction coefficients and an external storage device which stores a disturbance correction coefficient for each link. A processor 910e performs arithmetic operation process regarding generation of disturbance correction coefficients. A communication device 950e transmits and receives the traveling history information, the infrastructure information, the disturbance correction coefficients, and so forth.

The information accumulation server 260 is described. A storage device 920f includes a main storage device which temporarily stores the process result regarding accumulation and extraction of the traveling history information and disturbance correction coefficients and an external storage device which stores the traveling history information and the disturbance correction coefficients. A processor 910f performs arithmetic operation process regarding accumulation and extraction of the traveling history information and the disturbance correction coefficients. A communication device 950f transmits and receives the traveling history information, the disturbance correction coefficients, acquisition requests, and so forth.

As described above, in the present embodiment, the structure is adopted in which the process of estimating the motor-vehicle traveling fuel efficiency is performed on a motor vehicle side and the disturbance correction coefficients required for estimation are acquired from the information accumulation server 260. Also, the structure is adopted in which the process calculator is held for each link, and the process of generating disturbance correction coefficients is individually performed for each link. This allows separation of the process of generating disturbance correction coefficients required for improving estimation accuracy of motor-vehicle traveling fuel efficiency, the process of estimating the motor-vehicle traveling fuel efficiency, and the information accumulation process to reduce the process load. In particular, with the process calculator held for each link, the process per process calculator can be reduced, and the size of the process calculator itself can be decreased.

\*\*\*Description of Operation\*\*\*

Next, the operation is described.

In the present embodiment, the traveling fuel efficiency estimation process is performed at the motor vehicle 1c, the disturbance correction coefficient generation process is performed at the information generation calculator 250, and the traveling history accumulation process and the correction coefficient accumulation process are performed at the information accumulation server 260. The operation of each device may be independently performed.

The traveling history accumulation process in the information accumulation server 260 is performed by the traveling history reception unit 31, the traveling history accumulation unit 231, the traveling history DB 251, the traveling history extraction unit 32, and the traveling history transmission unit 33 of the information accumulation server 260. The present process is similar to the process of the traveling history accumulation server 210 in Embodiment 3 illustrated in FIG. 20, and therefore its description is omitted.

Figure 32:
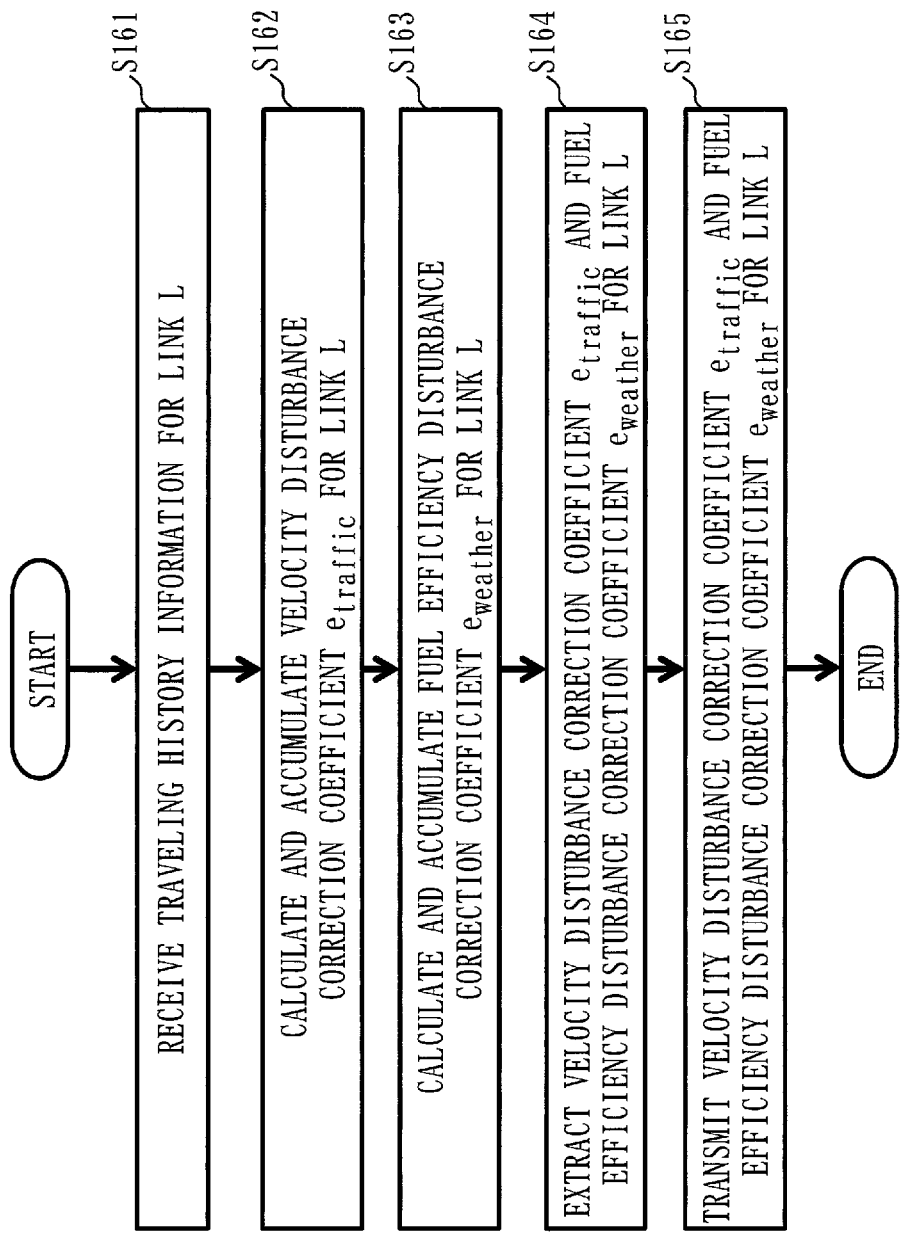
FIG. 32 is a flowchart of an individual disturbance generation process of an information generation calculator 250 according to Embodiment 4.

FIG. 32 is a flowchart of an individual disturbance calculation process of the information generation calculator 250 according to the present embodiment.

First, the traveling history reception unit 41 receives the traveling history information 111 for a specific link L from the information accumulation server 260 (step S161). Next, the velocity disturbance calculation unit 232 calculates a velocity disturbance correction coefficient based on the received traveling history information 111, the congestion information, and the event information, and accumulates the velocity disturbance correction coefficient in the individual correction coefficient DB 71 (step S162). Next, the fuel efficiency disturbance calculation unit 233 calculates a fuel efficiency disturbance correction coefficient based on the received traveling history information 111, the weather information, and the warning alert information, and accumulates the fuel efficiency disturbance correction coefficient in the individual correction coefficient DB 71 (step S163).

Here, the process at step S162 is similar to the process at step S13 of FIG. 4, and the process at step S163 is similar to the process at step S14 of FIG. 4, and therefore detailed description is omitted.

Next, the individual correction coefficient extraction unit 72 extracts the disturbance correction coefficients for the specific link L accumulated in the individual correction coefficient DB 71 (step S164). Lastly, the individual correction coefficient transmission unit 73 transmits the extracted disturbance correction coefficients for the link L to the information accumulation server 260 (step S165).

Here, the processes from step S164 and step S165 may be independent from the processes at step S161 to step S163.

Figure 33:
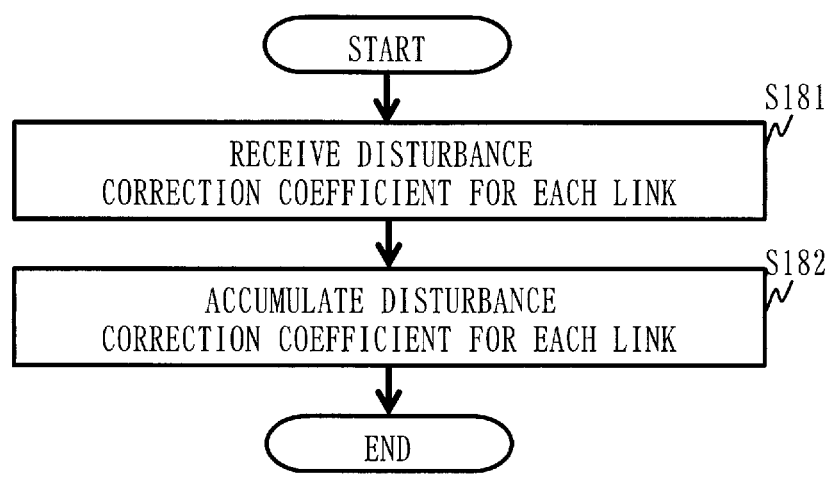
FIG. 33 is a flowchart of a correction coefficient accumulation process of the information accumulation server 260 according to Embodiment 4.

FIG. 33 is a flowchart of a correction coefficient accumulation process of the information accumulation server 260 according to the present embodiment. The present process may be in a form of being performed with a timing when the information accumulation server 260 receives the disturbance correction coefficient, or may be in a form of being performed as scheduled, such as once a day.

First, the individual correction coefficient reception unit 81 receives a disturbance correction coefficient for each link transmitted from the information generation calculator 250 corresponding to each link on the roads nationwide (step S181). Next, the individual correction coefficient accumulation unit 82 accumulates the received disturbance correction coefficient for each link in the correction coefficient DB 252 (step S182). Here, the information accumulation server 260 may collectively receive and process disturbance correction coefficients for a plurality of links.

Figure 34:
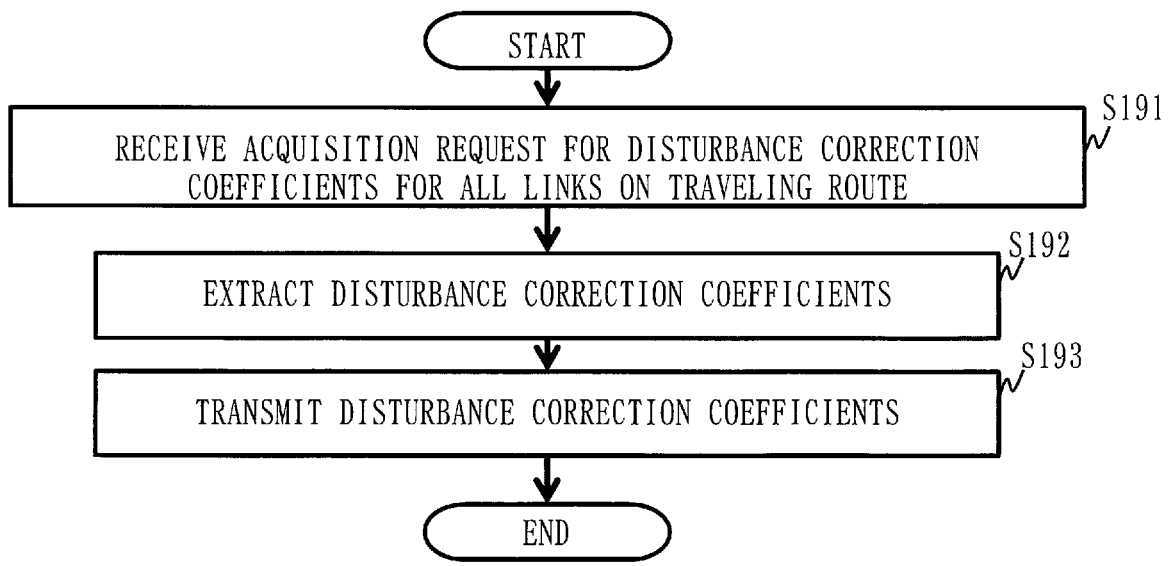
FIG. 34 is a flowchart of a correction coefficient extraction process of the information accumulation server 260 according to Embodiment 4.

FIG. 34 is a flowchart of a correction coefficient extraction process of the information accumulation server 260 according to the present embodiment.

First, the acquisition request reception unit 42 receives an acquisition request for a disturbance correction coefficient regarding a specific link from the motor vehicle device 100c (step S191). Here, it is assumed that acquisition requests for disturbance correction coefficients for a plurality of links can be simultaneously received and processed.

Next, the correction coefficient extraction unit 43 extracts the disturbance correction coefficients for a specific link requested for acquisition from the correction coefficient DB 252 (step S192).

Lastly, the correction coefficient transmission unit 44 transmits the extracted disturbance correction coefficients for the specific link to the motor vehicle device 100c (step S193). Here, the information accumulation server 260 may collectively process and transmit disturbance correction coefficients for a plurality of links.

The fuel efficiency estimation process at the motor vehicle 1c is performed at the velocity profile calculation unit 24 and the traveling fuel efficiency estimation unit 26b. The fuel efficiency estimation process is sequentially performed when the position information collection unit 12 receives the position information 121 including the origin and the destination from the driver. The subsequent processes of the velocity profile calculation unit 24 are similar to the processes of the velocity profile calculation unit 24 described in Embodiment 1. Also, the subsequent processes of the traveling fuel efficiency estimation unit 26b are similar to the processes of the traveling fuel efficiency estimation unit 26b described in Embodiment 3. Therefore, description of the processes of the velocity profile calculation unit 24 and the traveling fuel efficiency estimation unit 26b is omitted.

Description of Effects According to Present Embodiment

In the fuel efficiency estimation system 500c according to the present embodiment, the process calculator can be installed for each link to distribute the processes. This allows the process at each process unit to be minimized, and the process load at one calculator can be reduced.

While Embodiments 1 to 4 of the present invention have been described in the foregoing, among the "units" in the description of these embodiments, only one may be adopted, or any combination of several units may be adopted. That is, any functional block of the fuel efficiency estimation system that can achieve the function described in the above embodiments can be taken. The fuel efficiency estimation system may be configured by any combination of these functional blocks or by any functional blocks.

Also, while Embodiments 1 to 4 have been described, a plurality of embodiments among these embodiments may be combined for implementation. Also, among these embodiments, a plurality of portions may be combined for implementation. Alternatively, among these embodiments, one portion may be implemented. In addition, the details of these embodiments may be entirely or partially implemented in any combination.

Note that the above embodiments are intrinsically preferable examples, are not intended to limit the scope of the present invention, its applications, and its use purposes, and can be variously modified as required. The above embodiments are to help understanding the present scheme and are not to limit the invention.

REFERENCE SIGNS LIST 1, 1a, 1b, 1c: motor vehicle; 100, 100a, 100b, 100c: motor vehicle device; 11: traveling history collection unit; 12: position information collection unit; 13: information display unit; 14: information transmission unit; 15: information reception unit; 16: storage unit; 17: position information transmission unit; 18: route and fuel efficiency information reception unit; 19: traveling history transmission unit; 109: acquisition unit; 111: traveling history information; 121: position information; 411: traveling route; 450: cartographic information; 461: fuel efficiency estimation result; 470: infrastructure information; 472: congestion information; 473: event information; 474: weather information; 475: warning alert information; 210: traveling history accumulation server; 31: traveling history reception unit; 32: traveling history extraction unit; 33: traveling history transmission unit; 220: disturbance information generation server; 41: traveling history reception unit; 42: acquisition request reception unit; 43: correction coefficient extraction unit; 44: correction coefficient transmission unit; 230: fuel efficiency calculation server; 61: position information reception unit; 62: acquisition request unit; 63: correction coefficient reception unit; 64: infrastructure reception unit; 71: individual correction coefficient DB; 72: individual correction coefficient extraction unit; 73: individual correction coefficient transmission unit; 81: individual correction coefficient reception unit; 82: individual correction coefficient accumulation unit; 250: information generation calculator; 260: information accumulation server; 200: fuel efficiency estimation device; 21: information reception unit; 22, 197: information transmission unit; 23: disturbance information generation unit; 24, 24b: velocity profile calculation unit; 25: storage unit; 26, 26b: traveling fuel efficiency estimation unit; 231: traveling history accumulation unit; 232: velocity disturbance calculation unit; 233: fuel efficiency disturbance calculation unit; 239: calculation unit; 321: velocity disturbance correction coefficient; 331: fuel efficiency disturbance correction coefficient; 241: traveling route calculation unit; 243: stop judgment unit; 242: traveling velocity extraction unit; 244: velocity profile generation unit; 245: velocity correction unit; 261: velocity correction determination unit; 262: fuel efficiency correction determination unit; 263: fuel efficiency calculation unit; 441, 451: velocity profile; 251: traveling history DB; 252: correction coefficient DB; 253:

traveling velocity DB; 254: connection DB; 255: stop probability DB; 300: network; 500, 500*a*, 500*b*, 500*c*: fuel efficiency estimation system; 510: fuel efficiency estimation method; 520: fuel efficiency estimation program; 809, 909: processing circuit; 810, 910, 910*a*, 910*b*, 910*c*, 910*e*, 910*f*: processor; 820, 920, 920*a*, 920*b*, 920*c*, 920*e*, 920*f*: storage device; 830: input interface; 840: output interface; 850, 950, 950*a*, 950*b*, 950*c*, 950*e*, 950*f*: communication device; 860: sensor; S130: traveling fuel efficiency estimation process; S121: stop judgment process; S122: velocity profile generation process; S123: velocity correction process; S301: velocity disturbance calculation process; S302: fuel efficiency disturbance calculation process; S120: velocity profile calculation process; 2510: traveling history storage unit; 2520: correction coefficient storage unit; 2530: traveling velocity storage unit; 2540: connection storage unit; 2550: stop probability storage unit

The invention claimed is:

1. A fuel efficiency estimation system for calculating a fuel efficiency of a motor vehicle traveling a traveling route, comprising:
a receiver/transmitter for communicating with a motor vehicle device provided in the motor vehicle; and
processing circuitry configured to
calculate a velocity profile indicating a change in velocity of a motor vehicle traveling a traveling route,
calculate, based on traveling history information received from the motor vehicle device and collected from the motor vehicle traveling the traveling route for each of a plurality of pieces of disturbance information indicating a plurality of disturbance events occurring on the traveling route, an attenuation factor, which is a ratio of attenuation of the velocity of the motor vehicle traveling the traveling route, for each of the plurality of pieces of disturbance information and to calculate an average value of a plurality of said attenuation factors each acquired for each of the plurality of pieces of disturbance information as a velocity disturbance correction coefficient,
calculate fuel efficiency of the motor vehicle traveling the traveling route using the velocity profile and the velocity disturbance correction coefficient, and
tranmitting the calculated fuel efficiency to the motor vehicle device for display along with the traveling route.

2. The fuel efficiency estimation system according to claim 1, wherein
the processing circuitry calculates the velocity disturbance correction coefficient based on at least congestion information indicating a congestion situation of the traveling route as the disturbance information.

3. The fuel efficiency estimation system according to claim 2, wherein
the processing circuitry calculates the velocity disturbance correction coefficient based on at least the congestion information and event information indicating an event occurring on the traveling route as the disturbance information.

4. The fuel efficiency estimation system according to claim 1, wherein the processing circuitry
calculates a deterioration ratio, which is a ratio of deterioration of the fuel efficiency of the motor vehicle traveling the traveling route, as a fuel efficiency disturbance correction coefficient, based on the disturbance information and the traveling history information, and
estimates the fuel efficiency of the motor vehicle traveling the traveling route by using the velocity profile, the velocity disturbance correction coefficient, and the fuel efficiency disturbance correction coefficient.

5. The fuel efficiency estimation system according to claim 4, wherein
the processing circuitry calculates the fuel efficiency disturbance correction coefficient based on at least weather information indicating weather on the traveling route as the disturbance information.

6. The fuel efficiency estimation system according to claim 5, wherein
the processing circuitry calculates the fuel efficiency disturbance correction coefficient based on at least the weather information and warning alert information indicating a warning or an alert for the traveling route as the disturbance information.

7. The fuel efficiency estimation system according to claim 4, wherein the processing circuitry
stores the traveling history information as being classified by the disturbance event, and
calculates the velocity disturbance correction coefficient based on the traveling history information classified by the disturbance event and stored, and the disturbance information.

8. The fuel efficiency estimation system according to claim 7, wherein
the processing circuitry calculates the fuel efficiency disturbance correction coefficient based on the traveling history information classified by the disturbance event and stored, and the disturbance information.

9. The fuel efficiency estimation system according to claim 7, wherein the processing circuitry
acquires position information including an origin and a destination, and
calculates the velocity profile based on an acquisition date and time when the position information is acquired and a traveling velocity for each of road sections configuring the traveling route when the traveling route is traveled with date and time attributes of the acquisition date and time.

10. The fuel efficiency estimation system according to claim 9, comprising:
a motor vehicle device mounted on the motor vehicle traveling the traveling route and a fuel efficiency estimation device to communicate with the motor vehicle device, wherein
the processing circuitry of the motor vehicle device transmits the position information to the fuel efficiency estimation device, and
the processing circuitry of the fuel efficiency estimation device calculates the traveling route based on the position information.

11. The fuel efficiency estimation system according to claim 10, wherein
the processing circuitry of the motor vehicle device further transmits the traveling history information indicating traveling history of the motor vehicle to the fuel efficiency estimation device, and
the processing circuitry of the fuel efficiency estimation device classifies the traveling history information for each road section, then classifies the traveling history information by the disturbance event, and accumulates the traveling history information.

12. The fuel efficiency estimation system according to claim 11, wherein
the processing circuitry of the fuel efficiency estimation device
calculates the velocity profile indicating the change in velocity of the motor vehicle traveling the traveling route,
calculates, based on the traveling history information collected from the motor vehicle traveling the traveling route for each of the plurality of pieces of disturbance information indicating the plurality of disturbance events occurring on the traveling route, the attenuation factor, which is the ratio of attenuation of the velocity of the motor vehicle traveling the traveling route, for each of the plurality of pieces of disturbance information, and calculates the average value of the plurality of said attenuation factors each acquired for each of the plurality of pieces of disturbance information as the velocity disturbance correction coefficient,
calculates the deterioration ratio, which is the ratio of deterioration of the fuel efficiency of the motor vehicle traveling the traveling route, as the fuel efficiency disturbance correction coefficient, based on the disturbance information and the traveling history information, and
calculates the fuel efficiency of the motor vehicle traveling the traveling route by using the velocity profile and the velocity disturbance correction coefficient.

13. The fuel efficiency estimation system according to claim 9, comprising:
a motor vehicle device mounted on the motor vehicle traveling the traveling route, wherein
the processing circuitry of the motor vehicle device
calculates the traveling route based on the position information,
collects the traveling history information indicating traveling history of the motor vehicle, and
classifies the traveling history information for each road section, then classifies the traveling history information by the disturbance event, and accumulates the traveling history information, and
the processing circuitry of the motor vehicle device further calculates, based on the traveling history information collected from the motor vehicle traveling the traveling route for each of the plurality of pieces of disturbance information indicating the plurality of disturbance events occurring on the traveling route, the attenuation factor, which is the ratio of attenuation of the velocity of the motor vehicle traveling the traveling route, for each of the plurality of pieces of disturbance information and calculates the average value of the plurality of said attenuation factors each acquired for each of the plurality of pieces of disturbance information as the velocity disturbance correction coefficient, calculates the deterioration ratio, which is the ratio of deterioration of the fuel efficiency of the motor vehicle traveling the traveling route, as the fuel efficiency disturbance correction coefficient, based on the disturbance information and the traveling history information, calculates the velocity profile indicating the change in velocity of the motor vehicle traveling the traveling route, and calculates the fuel efficiency of the motor vehicle traveling the traveling route by using the velocity profile and the velocity disturbance correction coefficient.

14. The fuel efficiency estimation system according to claim 9, comprising:
a motor vehicle device mounted on the motor vehicle traveling the traveling route, the processing circuitry of the motor vehicle device transmitting the position information and the traveling history information indicating the traveling history of the motor vehicle;
a traveling history accumulation server, the processing circuitry of the traveling history accumulation server receiving the traveling history information from the motor vehicle device, classifying the traveling history information for each road section, then classifying the traveling history information by the disturbance event, and accumulating the traveling history information;
a disturbance information generation server, the processing circuitry of the disturbance information generation server receiving the traveling history information from the traveling history accumulation server and calculating the velocity disturbance correction coefficient and the fuel efficiency disturbance correction coefficient based on the traveling history information and the disturbance information; and
a fuel efficiency calculation server, the processing circuitry of the fuel efficiency calculation server receiving the position information from the motor vehicle device, receiving the velocity disturbance correction coefficient and the fuel efficiency disturbance correction coefficient from the disturbance information generation server, and calculating fuel efficiency of the motor vehicle traveling the traveling route by using the velocity profile and the velocity disturbance correction coefficient.

15. The fuel efficiency estimation system according to claim 9, comprising:
a motor vehicle device mounted on the motor vehicle traveling the traveling route, the processing circuitry of the motor vehicle device transmitting the traveling history information indicating the traveling history of the motor vehicle;
an information generation calculator provided for each road section that is present on the traveling route, the processing circuitry of the information generation calculator calculating the velocity disturbance correction coefficient and the fuel efficiency disturbance correction coefficient based on the traveling history information and the disturbance information; and
an information accumulation server, the processing circuitry of the information accumulation server receiving the traveling history information from the motor vehicle device, classifying the traveling history information for each road section, then classifying the traveling history information by the disturbance event, and accumulating the traveling history information, receiving the velocity disturbance correction coefficient and the fuel efficiency disturbance correction coefficient from the information generation calculator, and storing the received velocity disturbance correction coefficient and fuel efficiency disturbance correction coefficient.

16. The fuel efficiency estimation system according to claim 15, wherein
the processing circuitry of the motor vehicle device calculates the traveling route based on the position information, and receives the velocity disturbance correction coefficient from the information accumulation server and the fuel efficiency disturbance correction coefficient.

17. A non-transitory computer readable medium storing a fuel efficiency estimation program that causes a computer to execute a process for calculating a fuel efficiency of a motor vehicle traveling a traveling route, the process comprising:

receiving, from a motor vehicle device provided in the motor vehicle, traveling history information collected from the motor vehicle traveling the traveling route for each of a plurality of pieces of disturbance information indicating a plurality of disturbance events occurring on the traveling route calculating, using server processing circuitry, a velocity profile indicating a change in velocity of a motor vehicle traveling a traveling route;

calculating, using server processing circuitry, an attenuation factor, based on the received traveling history information, the attenuation factor being a ratio of attenuation of the velocity of the motor vehicle traveling the traveling route, for each of the plurality of pieces of disturbance information, and calculating an average value of a plurality of said attenuation factors each acquired for each of the plurality of pieces of disturbance information as a velocity disturbance correction coefficient;

calculating, using the sever processing circuitry, fuel efficiency of the motor vehicle traveling the traveling route by using the velocity profile and the velocity disturbance correction coefficient; and transmitting, to the motor vehicle device, the calculated fuel efficiency to the motor vehicle device for display along with the traveling route.

18. A fuel efficiency estimation method for calculating a fuel efficiency of a motor vehicle traveling a traveling route, comprising:

receiving, from a motor vehicle device provided in the motor vehicle, traveling history information collected from the motor vehicle traveling the traveling route for each of a plurality of pieces of disturbance information indicating a plurality of disturbance events occurring on the traveling route;

calculating, using server processing circuitry, a velocity profile indicating a change in velocity of a motor vehicle traveling a traveling route;

calculating, using the server processing circuitry, an attenuation factor, based on the received traveling history information, the attenuation factor being a ratio of attenuation of the velocity of the motor vehicle traveling the traveling route, for each of the plurality of pieces of disturbance information, and calculating an average value of a plurality of said attenuation factors each acquired for each of the plurality of pieces of disturbance information as a velocity disturbance correction coefficient; and calculating, using the server processing circuitry, fuel efficiency of the motor vehicle traveling the traveling route by using the velocity profile and the velocity disturbance correction coefficient, and transmitting, to the motor vehicle device, the calculated fuel efficiency to the motor vehicle device for display along with the traveling route.

\* \* \* \* \*